(12) United States Patent
Garcia-Martinez

(10) Patent No.: US 8,932,974 B2
(45) Date of Patent: *Jan. 13, 2015

(54) MESOSTRUCTURED ZEOLITIC MATERIALS, AND METHODS OF MAKING AND USING THE SAME

(71) Applicant: Massachusetts Institute of Technology, Cambridge, MA (US)

(72) Inventor: Javier Garcia-Martinez, Alicante (ES)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/944,694

(22) Filed: Jul. 17, 2013

(65) Prior Publication Data

US 2013/0299389 A1    Nov. 14, 2013

Related U.S. Application Data

(60) Division of application No. 13/205,151, filed on Aug. 8, 2011, now Pat. No. 8,524,624, which is a division of application No. 11/578,869, filed on Oct. 20, 2006, now Pat. No. 8,008,223, which is a continuation-in-part of application No. 10/830,714, filed on Apr. 23, 2004, now Pat. No. 7,589,041.

(51) Int. Cl.

| | | |
|---|---|---|
| *B01J 29/06* | (2006.01) | |
| *B01J 27/00* | (2006.01) | |
| *B01J 29/40* | (2006.01) | |
| *B01J 20/18* | (2006.01) | |
| *B01J 29/00* | (2006.01) | |
| *B01J 29/04* | (2006.01) | |
| *B01J 29/08* | (2006.01) | |
| *B01J 29/10* | (2006.01) | |
| *B01J 29/18* | (2006.01) | |
| *B01J 29/80* | (2006.01) | |
| *B82Y 30/00* | (2011.01) | |
| *C01B 39/02* | (2006.01) | |
| *C01B 39/04* | (2006.01) | |
| *C10G 1/08* | (2006.01) | |
| *C10G 11/02* | (2006.01) | |
| *C10G 11/05* | (2006.01) | |
| *C10G 11/18* | (2006.01) | |
| *C10G 45/04* | (2006.01) | |
| *C10G 47/02* | (2006.01) | |
| *B01J 29/03* | (2006.01) | |

(52) U.S. Cl.
CPC *B01J 29/40* (2013.01); *B01J 20/18* (2013.01); *B01J 20/186* (2013.01); *B01J 29/005* (2013.01); *B01J 29/041* (2013.01); *B01J 29/084* (2013.01); *B01J 29/106* (2013.01); *B01J 29/18* (2013.01); *B01J 29/80* (2013.01); *B82Y 30/00* (2013.01); *C01B 39/02* (2013.01); *C01B 39/023* (2013.01); *C01B 39/026* (2013.01); *C01B 39/04* (2013.01); *C10G 1/086* (2013.01); *C10G 11/02* (2013.01); *C10G 11/05* (2013.01); *C10G 11/18* (2013.01); *C10G 45/04* (2013.01); *C10G 47/02* (2013.01); *B01J 29/0308* (2013.01); *B01J 2229/62* (2013.01); *C10G 2300/1033* (2013.01); *C10G 2300/1074* (2013.01); *C10G 2300/1096* (2013.01); *C10G 2400/02* (2013.01); *C10G 2400/20* (2013.01)
USPC ............. 502/60; 502/77; 502/78; 502/79; 502/208

(58) Field of Classification Search
USPC .................. 502/60, 77, 78, 79, 208
See application file for complete search history.

(56) References Cited

U.S. PATENT DOCUMENTS

| | | |
|---|---|---|
| 3,709,853 A | 1/1973 | Karapinka |
| 3,864,280 A | 2/1975 | Schneider |
| 4,016,218 A | 4/1977 | Haag et al. |
| 4,088,671 A | 5/1978 | Kobylinski |
| 4,196,182 A | 4/1980 | Willermet et al. |
| 4,205,055 A | 5/1980 | Maire et al. |
| 4,263,268 A | 4/1981 | Knox et al. |
| 4,318,824 A | 3/1982 | Turner |
| 4,439,349 A | 3/1984 | Everett et al. |
| 4,564,207 A | 1/1986 | Russ et al. |
| 4,609,972 A | 9/1986 | Edeling et al. |
| 4,637,623 A | 1/1987 | Bubik |
| 4,689,314 A | 8/1987 | Martinez et al. |
| 4,704,375 A | 11/1987 | Martinez et al. |
| 4,761,272 A | 8/1988 | Hucke |
| 4,775,655 A | 10/1988 | Edwards et al. |
| 4,806,689 A | 2/1989 | Gier et al. |
| 4,816,135 A | 3/1989 | Martinez et al. |

(Continued)

FOREIGN PATENT DOCUMENTS

| | | |
|---|---|---|
| FR | 2802120 | 6/2001 |
| JP | 2002128517 | 5/2002 |

(Continued)

OTHER PUBLICATIONS

Al-Khattaf, S. et al., The Role of Diffusion in Alkyl-Benzenes Catalytic Cracking, Appl. Catal. A: Gen. 226; 139-153, (2002).
Bagri, R. et al.; Catalytic Pyrolysis of Polyethylene; Anal. Pyrolysis, 63:29-41 (2002).
Conway, B.E., Electrochemical Supercapacitors, Kluwer Academic/Plenum Publishers, New York, 1999, pp. 11-22, 51-63, 125-135, 183-219, 221-224, 255, 335-338, 337-415, 417-440, 598, 602, 615, and 649-666.
Corma, A., From Microporous to Mesoporous Molecular Sieve Materials and Their Use in Catalysis, Chem. Rev., 97:2373-2419, (1997).

(Continued)

*Primary Examiner* — Elizabeth Wood
(74) *Attorney, Agent, or Firm* — Hovey Williams LLP

(57) ABSTRACT

One aspect of the present invention relates to mesostructured zeolites. The invention also relates to a method of preparing mesostructured zeolites, as well as using them as cracking catalysts for organic compounds and degradation catalysts for polymers.

9 Claims, 27 Drawing Sheets

(56) References Cited

U.S. PATENT DOCUMENTS

| | | | |
|---|---|---|---|
| 4,836,737 | A | 6/1989 | Holmes et al. |
| 4,857,494 | A | 8/1989 | Martinez et al. |
| 4,891,458 | A | 1/1990 | Innes et al. |
| 4,894,215 | A | 1/1990 | Kawakubo et al. |
| 4,894,354 | A | 1/1990 | Martinez et al. |
| 4,968,405 | A | 11/1990 | Wachter |
| 5,013,699 | A | 5/1991 | Vassilakis et al. |
| 5,051,385 | A | 9/1991 | Wachter |
| 5,057,296 | A | 10/1991 | Beck |
| 5,061,147 | A | 10/1991 | Nespor |
| 5,095,169 | A | 3/1992 | Skeels et al. |
| 5,102,643 | A | 4/1992 | Kresge et al. |
| 5,116,794 | A | 5/1992 | Skeels et al. |
| 5,134,242 | A | 7/1992 | Le et al. |
| 5,134,243 | A | 7/1992 | Bhore et al. |
| 5,160,033 | A | 11/1992 | Vassilakis et al. |
| 5,200,058 | A | 4/1993 | Beck et al. |
| 5,207,892 | A | 5/1993 | Vassilakis et al. |
| 5,208,197 | A | 5/1993 | Vassilakis et al. |
| 5,221,648 | A | 6/1993 | Wachter |
| 5,232,580 | A | 8/1993 | Le et al. |
| 5,254,327 | A | 10/1993 | Martinez et al. |
| 5,256,277 | A | 10/1993 | Del Rosi et al. |
| 5,258,570 | A | 11/1993 | Skeels et al. |
| 5,260,501 | A | 11/1993 | Bhore et al. |
| 5,288,393 | A | 2/1994 | Jessup et al. |
| 5,308,475 | A | 5/1994 | Degnan et al. |
| 5,344,553 | A | 9/1994 | Shih |
| 5,347,060 | A | 9/1994 | Hellring et al. |
| 5,360,774 | A | 11/1994 | Martinez et al. |
| 5,391,433 | A | 2/1995 | Kawakubo et al. |
| 5,393,718 | A | 2/1995 | Skeels et al. |
| 5,401,384 | A | 3/1995 | Martinez et al. |
| 5,458,929 | A | 10/1995 | Earls et al. |
| 5,510,431 | A | 4/1996 | Earls et al. |
| 5,538,710 | A | 7/1996 | Guo et al. |
| 5,601,798 | A | 2/1997 | Cooper et al. |
| 5,614,453 | A | 3/1997 | Occelli |
| 5,628,978 | A | 5/1997 | Tejada et al. |
| 5,636,437 | A | 6/1997 | Kaschmitter et al. |
| 5,659,099 | A | 8/1997 | Skeels et al. |
| 5,662,965 | A | 9/1997 | Duguchi et al. |
| 5,672,556 | A | 9/1997 | Pinnavaia et al. |
| 5,712,402 | A | 1/1998 | Pinnavaia et al. |
| 5,744,673 | A | 4/1998 | Skeels et al. |
| 5,770,040 | A | 6/1998 | Tejada et al. |
| 5,785,946 | A | 7/1998 | Pinnavaia et al. |
| 5,786,294 | A | 7/1998 | Sachtler et al. |
| 5,795,559 | A | 8/1998 | Pinnavaia et al. |
| 5,800,800 | A | 9/1998 | Pinnavaia et al. |
| 5,800,801 | A | 9/1998 | Tejada |
| 5,840,264 | A | 11/1998 | Pinnavaia et al. |
| 5,840,271 | A | 11/1998 | Carrazza et al. |
| 5,849,258 | A | 12/1998 | Lujano et al. |
| 5,855,864 | A | 1/1999 | Pinnavaia et al. |
| 5,858,457 | A | 1/1999 | Brinker et al. |
| 5,892,080 | A | 4/1999 | Alberti et al. |
| 5,902,564 | A | 5/1999 | Lujano et al. |
| 5,952,257 | A | 9/1999 | Tejada et al. |
| 5,958,367 | A | 9/1999 | Ying et al. |
| 5,958,624 | A | 9/1999 | Frech et al. |
| 5,961,817 | A | 10/1999 | Wachter et al. |
| 5,985,356 | A | 11/1999 | Schultz et al. |
| 5,993,768 | A | 11/1999 | Zappelli et al. |
| 6,004,617 | A | 12/1999 | Schultz et al. |
| 6,015,485 | A | 1/2000 | Shukis et al. |
| 6,022,471 | A | 2/2000 | Wachter et al. |
| 6,024,899 | A | 2/2000 | Peng et al. |
| 6,027,706 | A | 2/2000 | Pinavaia et al. |
| 6,087,044 | A | 7/2000 | Iwase et al. |
| 6,096,828 | A | 8/2000 | DePorter et al. |
| 6,106,802 | A | 8/2000 | Lujano et al. |
| 6,139,721 | A | 10/2000 | Baldiraghi et al. |
| 6,162,414 | A | 12/2000 | Pinnavaia et al. |
| 6,193,943 | B1 | 2/2001 | Pinnavaia et al. |
| 6,204,424 | B1 | 3/2001 | Yadav et al. |
| 6,248,691 | B1 | 6/2001 | Gadkaree et al. |
| 6,297,293 | B1 | 10/2001 | Bell et al. |
| 6,299,855 | B1 | 10/2001 | Lujano et al. |
| 6,319,872 | B1 | 11/2001 | Manzer et al. |
| 6,334,988 | B1 | 1/2002 | Gallis et al. |
| 6,391,278 | B1 | 5/2002 | Pinnavaia et al. |
| 6,410,473 | B1 | 6/2002 | Pinnavaia et al. |
| 6,413,489 | B1 | 7/2002 | Ying et al. |
| 6,413,902 | B1 | 7/2002 | Pinnavaia et al. |
| 6,419,820 | B1 | 7/2002 | Bogdan et al. |
| 6,476,085 | B2 | 11/2002 | Manzer et al. |
| 6,476,275 | B2 | 11/2002 | Schmidt et al. |
| 6,485,702 | B1 | 11/2002 | Lujano et al. |
| 6,489,168 | B1 | 12/2002 | Wang et al. |
| 6,495,487 | B1 | 12/2002 | Bogdan |
| 6,515,845 | B1 | 2/2003 | Oh et al. |
| 6,524,470 | B1 | 2/2003 | Kasztelan et al. |
| 6,538,169 | B1 | 3/2003 | Pittman et al. |
| 6,541,539 | B1 | 4/2003 | Yang et al. |
| 6,544,923 | B1 | 4/2003 | Ying et al. |
| 6,548,440 | B1 | 4/2003 | Pham et al. |
| 6,558,647 | B2 | 5/2003 | Lacombe et al. |
| 6,580,003 | B2 | 6/2003 | Deng et al. |
| 6,583,186 | B2 * | 6/2003 | Moore, Jr. ..................... 518/700 |
| 6,585,948 | B1 | 7/2003 | Ryoo |
| 6,585,952 | B1 | 7/2003 | Pinnavaia et al. |
| 6,592,764 | B1 | 7/2003 | Stucky et al. |
| 6,620,402 | B2 | 9/2003 | Jacobsen et al. |
| 6,623,967 | B1 | 9/2003 | Willson, III |
| 6,649,413 | B1 | 11/2003 | Schultz et al. |
| 6,656,443 | B2 | 12/2003 | Klett |
| 6,669,924 | B1 | 12/2003 | Kaliaguine et al. |
| 6,689,336 | B2 | 2/2004 | Kanno |
| 6,702,993 | B2 | 3/2004 | Pinnavaia et al. |
| 6,706,169 | B2 | 3/2004 | Pinnavaia et al. |
| 6,706,659 | B2 | 3/2004 | Gillespie et al. |
| 6,710,003 | B2 | 3/2004 | Jan et al. |
| 6,746,659 | B2 | 6/2004 | Pinnavaia et al. |
| 6,756,515 | B2 | 6/2004 | Rende et al. |
| 6,762,143 | B2 | 7/2004 | Shan et al. |
| 6,770,258 | B2 | 8/2004 | Pinnavaia et al. |
| 6,793,911 | B2 | 9/2004 | Koegler et al. |
| 6,797,153 | B1 | 9/2004 | Fukuyama et al. |
| 6,797,155 | B1 | 9/2004 | Chester et al. |
| 6,800,266 | B2 | 10/2004 | Pinnavaia et al. |
| 6,809,061 | B2 | 10/2004 | Bogdan et al. |
| 6,811,684 | B2 | 11/2004 | Mohr et al. |
| 6,814,943 | B2 | 11/2004 | Radcliffe et al. |
| 6,818,589 | B1 | 11/2004 | Gillespie |
| 6,833,012 | B2 | 12/2004 | Rogers |
| 6,841,143 | B2 | 1/2005 | Inagaki et al. |
| 6,843,906 | B1 | 1/2005 | Eng |
| 6,843,977 | B2 | 1/2005 | Pinnavaia et al. |
| 6,846,546 | B2 | 1/2005 | Kuroda et al. |
| 6,866,925 | B1 | 3/2005 | Chane-Ching |
| 6,869,906 | B2 | 3/2005 | Pinnavaia et al. |
| 6,936,234 | B2 | 8/2005 | Bilenko |
| 6,998,104 | B2 * | 2/2006 | Tao et al. ..................... 423/716 |
| 7,084,087 | B2 | 8/2006 | Shan et al. |
| 7,589,041 | B2 * | 9/2009 | Ying et al. ..................... 502/64 |
| 7,807,132 | B2 | 10/2010 | Garcia-Martinez ........... 423/716 |
| 7,976,696 | B2 | 7/2011 | Ying et al. |
| 8,007,663 | B2 | 8/2011 | Ying et al. |
| 8,008,223 | B2 | 8/2011 | Garcia-Martinez |
| 8,617,513 | B2 * | 12/2013 | Ying et al. ..................... 423/716 |
| 2001/0031241 | A1 | 10/2001 | Lacombe et al. |
| 2001/0042440 | A1 | 11/2001 | Miyazawa et al. |
| 2002/0018747 | A1 | 2/2002 | Pinnavaia et al. |
| 2002/0131930 | A1 | 9/2002 | Pinnavaia et al. |
| 2003/0054954 | A1 | 3/2003 | Chane-Ching et al. |
| 2003/0147805 | A1 | 8/2003 | Koegler et al. |
| 2004/0067842 | A1 | 4/2004 | Pinnavaia et al. |
| 2004/0138051 | A1 | 7/2004 | Shan et al. |
| 2004/0179996 | A1 | 9/2004 | Shan et al. |
| 2005/0074396 | A1 | 4/2005 | Takahashi et al. |
| 2005/0130827 | A1 | 6/2005 | Schunk |
| 2005/0214539 | A1 | 9/2005 | Ying et al. |
| 2006/0078487 | A1 | 4/2006 | Endo et al. |

(56) References Cited

U.S. PATENT DOCUMENTS

| | | | |
|---|---|---|---|
| 2007/0244347 | A1 | 10/2007 | Ying et al. |
| 2009/0110631 | A1 | 4/2009 | Garcia-Martinez |
| 2010/0190632 | A1 | 7/2010 | Dight |
| 2010/0196263 | A1 | 8/2010 | Garcia-Martinez |
| 2011/0118107 | A1 | 5/2011 | Garcia-Martinez |
| 2011/0171121 | A1 | 7/2011 | Senderov |

FOREIGN PATENT DOCUMENTS

| | | |
|---|---|---|
| JP | 2004143026 | 5/2004 |
| WO | 0117901 | 3/2001 |
| WO | 0138223 | 5/2001 |
| WO | WO 01/38223 | 5/2001 |
| WO | 2005102964 | 11/2005 |
| WO | 2006031259 | 3/2006 |
| WO | 2006/038912 | 4/2006 |

OTHER PUBLICATIONS

CSIC NM014—Method of Preparation of Mesoporous Alumina with High Thermal Stability, http://www.serina.es/escaparate/verproducto.cgi?idproducto=4980&refcompra=NULO, downloaded May 9, 2007, 2 pages.

Davis, M.E., Ordered Porous Materials for Emerging Applications, Nature, 417:813-821 (2002).

Davis, M.E., Zeolite and Molecular Sieve Synthesis, Chem. Mater., 4:756-768 (1992).

De Moor, P-P.E.A. et al., Imaging the Assembly Process of the Organic-Mediated Synthesis of a Zeolite, Chem. Eur. J., 5(7):2083-2088 (1999).

Degnan, T.F. et al., History of ZSM-5 Fluid Catalytic Cracking Additive Development at Mobile, Microporous Mesoporous Mater., 35-36:245-252 (2000).

De A.A. Soler-Illia, Galo, J. et al., Chemical Strategies to Design Textured Materials from Microporous and mesoporous Oxides to Nanonetworks and Hierarchial Structures, Chem. Rev. 102:4093-4138 (2002).

Galo, J. de A. A. et al., Chemical Strategies to Design Textured Materials: from Microporous and Mesoporous Oxides to Nanonetworks and Hierarchical Structures, Chern. Rev., 2002, 102, 4093-4138.

Geidel, E. et al., Characterization of Mesoporous Materials by Vibrational Spectroscopic Techniques, Microporous and Mesoporous Mater., 65:31-42 (2003).

Gonzalez-Pena, V. et al., Thermally Stable Mesoporous Alumina Synthesized with Non-ionic Surfaces in teh Presence of Amines, Microporous and Mesoporous Materials, 44-45, pp. 203-210 (2001).

Goto, Y., Mesoporous Material from Zeolite, Journal of Porous Materials, 9, 2002, pp. 43-48.

Grieken, Rafael et al., Supercritical Fluid Extraction of a Nonionic Surfactant Template from SBA-15 Materials and Consequences on the Porous Structure, Langmuir 2003, 19, 3966-3973, American Chemical Society, Rey Juan Carlos University, Madrid, Spain, University of California, Santa Barbara, California.

Grudzien, Rafal M. et al., Effective Method for Removal of Polymeric Template from SBA-16 Silica Combining Extraction and Temperaure-controlled Calcination, The Royal Society of Chemistry, 2006, J. Mater. Chem., 2006, 16, 819-823.

Harding, R.H. et al., New Developments in FCC Catalyst Technology, Appl. Catal. A:Gen. 221:389-396 (2001).

Huang, L. et al., Investigation of Synthesizing MCM-41/ZSM Composites, J. Phys. Chem. B. 104:2817-2823 (2000).

Iijima, S., Carbon Nanotubes: Past, Present, and Future, Physica B: Condensed Matter, www.elsevier.com/locate/physb, 2002, 323, pp. 1-5.

International Search Report and Written Opinion dated Nov. 7, 2005 from International Patent Application No. PCT/US2005/05918, filed Feb. 25, 2005.

Joo, S.H., et al., Ordered Nanoporous Arrays of Carbon Supporting High Dispersions of Platinum Nanoparticles, Letters to Nature, www.nature.com, Macmillan Magazines Ltd., Nature, vol. 412, Jul. 12, 2001, pp. 169-172.

Karlsson A. et al., Composites of Micro- and Mesoporous Materials: Simultaneous Syntheses of MFI/MCM-41 Like Phases by a Mixed Template Approach, Microporous and mesoporous Mater, 27: 181-192 (1999).

Kloestra, K.R. et al., Mesoporous Material Containing Framework Tectosilicate by Pore-Wall Recrystallization, Chem. Commun., 23:2281-2282 (1997).

Kyotani, T., Control of Pore Structure in Carbon, Carbon, Institute for Chemical Reaction Science, Tohoku University, 2-1-1, Kaiahira, Sendai 980-8577, Japan, Jun. 1, 1999, ElSevier Science Ltd., pp. 269-286.

Lee, H. et al., Materials Science: On the Synthesis of Zeolites, ScienceWeek, downloaded from http://www.scienceweek.com/2003/sa031031-1.htm on Apr. 23, 2005, 5 pages.

Lin, C. et al., Carbonization and Activation of Sol-gel Derived Carbon Xerogels, Carbon, Department of Chemical Engineering, University of South Carolina, Colombia, SC, Aug. 2, 1999, Elsevier Science Ltd., pp. 849-861.

Linssen, T. et al., Mesoporous Templated Silicates: An Overview of Their Synthesis, Catalytic Activation and Evaluation of the Stability, Advances in Colloid and Interface Science, 103:121-147 (2003).

Liu, Y. et al., Steam-Stable MSU-S Aluminosilicate Mesostructures Assembled from Zeolite ZSM-5 and Zeolite Beta Seeds, Angew. Chem. Int. Ed., 7:1255-1258 (2001).

Liu, Y. et al., Aluminosilicate Mesostructures with Improved Acidity and Hydrothermal Stability, J. Mater. Chem., 12:3179-3190 (2002).

Lyons, D.M. et al., Preparation of Ordered Mesoporous Ceria with Enhanced Thermal Stability, The Journal of Materials Chemistry, vol. 12, pp. 1207-1212 (2002).

Mendes, M.F. et al., Optimization of the Process of Concentration of Vitamin E from DDSO using Supercritical CO2, Brazilian Journal of Chemical Engineering, vol. 22, No. 01, pp. 83-91, Jan.-Mar. 2005.

Moller, K. et al., Synthesis of Ordered Mesoporous Methacrylate Hybrid Systems: Hosts for Molecular Polymer Composites, Department of Chemistry, Purdue University, West Lafayette, IN, American Chemical Society, Dec. 28, 1998, pp. 665-673.

Ogura, M. et al., Formation of Uniform Mesopores in ZSM-5 Zeolite through Treatment in Alkaline Solution, Chemistry Letters 2000, pp. 882-883.

On, D.T. et al., Large-Pore Mesoporous Materials with Semi-Crystalline Zeolitic Frameworks, Angew. Chem. Int. Ed., 17:3248-3251 (2001).

Park, D.W. et al., Catalytic Degration of Polyethylene Over Solid Acid Catalysts, Polym. Degrad. Stabil., 65:193-198 (1999).

Patarin, J. et al., Mild Methods for Removing Organic Templates from Inorganic Host Materials, Highlights, Angew. Chem. Int. Ed. 2004, 43:3878-3880.

Prokesova, P. et al., Preparation of Nanosized Micro/Mesoporous Composites via Simultaneous Synthesis of Beta/ MCM-48 Phases, Microporous and Mesoporous Materials 64 (2003) pp. 165-174.

Ryoo, R. et al., Synthesis of Highly Ordered Carbon Molecular Sieves via Template-Mediated Structural Transformation, The Journal of Physical Chemistry B, vol. 103, No. 38, Sep. 16, 1999, pp. 7743-7746.

Scherzer, J. et al., Octane-Enhancing Zeolitic FCC Catalysts—Scientific and Technical Aspects, Marcel Dekker, Inc., 42 pages, (1990).

Storck, S. et al., Characterization of Micro- and Mesoporous Solids by Physisorption Methods and Pore-Size Analysis, Applied Catalysts A: Gen. 17:137-146 (1998).

Tao et al., Mesopore-Modified Zeolites: Preparation, Characterization, and Applications, Chem. Rev., vol. 106, pp. 896-910 (2006).

Triantafyllidis K.S. et al., Gas-oil Cracking Activity of Hydrothermally Stable Aluminosilicate Mesostructures (MSU-S) Assembled from Zeolite Seeds: Effect of the Type of Framework Structure and Porosity, Catalyst Today, vol. 112, pp. 33-36 (2006).

Verhoef, M. J. et al., Partial Transformation of MCM-41 Material into Zeolites: Formation of Nanosized MFI Type Crystallites, Chemical Materials, 2001, vol. 13, pp. 683-687.

Yang, P. et al., Generalized Syntheses of Large-Pore Mesoporous Metal Oxides with Semicrystalline Frameworks, Nature, vol. 396, Nov. 12, 1998, pp. 152-155; www.nature.com.

(56) References Cited

OTHER PUBLICATIONS

Ying, J. Y. et al., Synthesis and Applications of Supramolecular-Templated Mesoporous Materials, Angew. Chem. Int. Ed., 38:56-77 (1999).

Zhang, Z. et al, Mesoporous Aluminosilicates with Ordered Hexagonal Structure, Strong Acidity, and Extraordinary Hydrothermal Stability at High Temperatures, J. of the American Chem. Society, 2001, vol. 123, pp. 5014-5021.

Bridgwater, A.V.; Catalysis in Thermal Biomass Conversion, Sep. 1993, 43 pages.

Groen, J.C.; On the Introduction of Intracrystalline Mesoporosity in Zeolites Upon Desilication in Alkaline Medium; Elsevier, Microporous and Mesoporous Materials 69 (2004) pp. 29-34.

Inagaki, et al.; An Ordered Mesoporous Organsilica Hybrid Material with a Crystal-like Wall Structure; Nature, vol. 416, Mar. 2002, pp. 304-307.

Lima et al.; Diesel-like Fuel Obtained by Pyrolysis of Vegetable Oils; Science Direct, Journal of Analytical and Applied Pyrolysis, Dec. 2003, pp. 987-996.

Parasad et al.; Catalytic Conversion of Canola Oil to Fuels and Chemical Feedstocks Part I. Effect of Process Conditions on the Performance of HZSM-5 Catalyst; University of Saskatchewan, The Canadian Journal of Chemical Engineering, vol. 64, Apr. 1986, pp. 278-284.

Weisz P.B. et al.; Catalytic Production of High-Grade Fuel (Gasoline) from Biomass Compounds by Shape-Selective Catalysis; AAAS, vol. 206, Oct. 1979, pp. 57-58.

Jacobsen et al.; Mesoporous Zeolite Single Crystals, J.Am. Chem. Soc., 2000, 122, 7116-7117.

Materials Science: On the Synthesis of Zeolites, ScienceWeek, downloaded from http://scienceweek.com/2003/sa031031-1.htm on Apr. 23, 2005 (5 pages).

Poladi, Raja H.P.R. et al., Synthesis, Characterization, and Catalytic Properties of a Microporous/Mesoporous Material, MMM-1, Journal of Solid State Chemistry, 2002, vol. 167, pp. 363-369.

Xia, Yongde et al., On the synthesis and characterization of ZSM-5/MCM-48 aluminosilicate composite materials, Journal of the Royal Society of Chemistry, 2004, pp. 863-870.

Guo et al., Characterization of Beta/MCM-41 Composite Molecular Sieve Compared with the Mechanical Mixture Microporous and Mesoporous Materials, vols. 44-45; pp. 427-434.

Tao et al., ZSM-5 Monolith of Uniform Mesoporous Channels, Material Sciences, Chiba University, J. AM. Chem. Soc., Japan 2003, pp. 6044-6045.

\* cited by examiner 1,3,5 TRIISOPB     1,3 DIISOPB

Higher Conversion

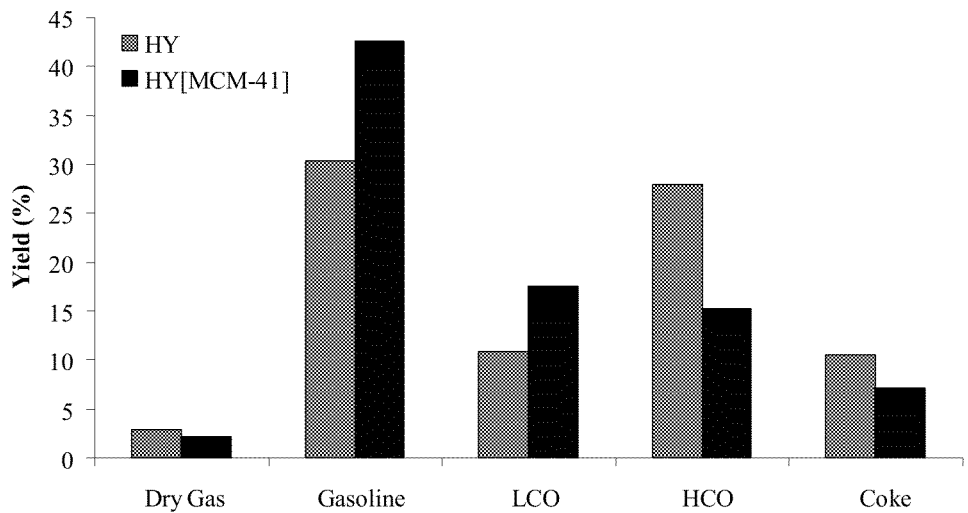

Figure 20B: depicts microactivity test (MAT) results of a conventional fully crystalline zeolite H-Y (Si/Al=15) and its fully crystalline mesostructured version H-Y[MCM-41].

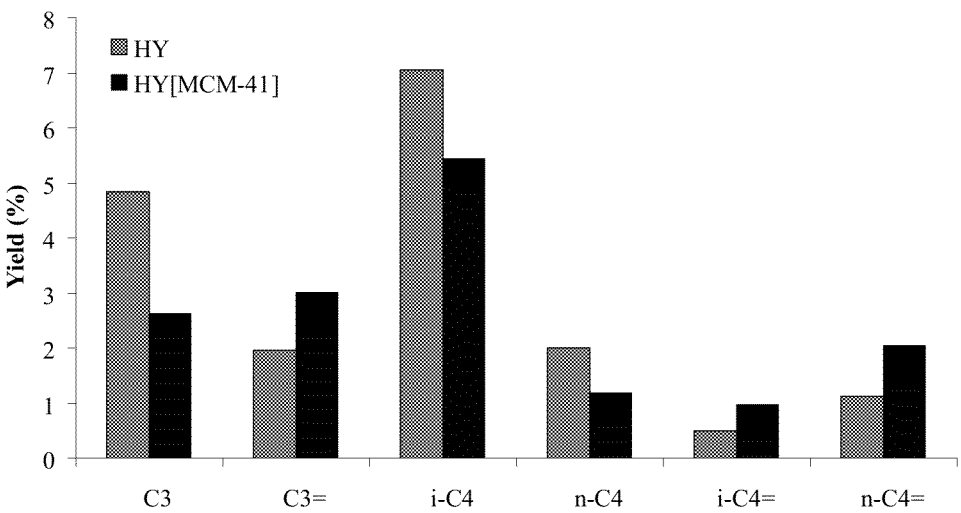

Figure 20C: depicts the composition of the LPG fraction obtained by Microactivity test (MAT) of a conventional fully crystalline zeolite H-Y (Si/Al=15) and its fully crystalline mesostructured version H-Y[MCM-41].

(A): no catalyst, (B): H-ZSM-5:PE 1:2, (C): H-ZSM-5[MCM-41]:PE 1:2, (D): H-ZSM-5:PE 1:1, (E): H-ZSM-5:PE 2:1,
(F): H-ZSM-5[MCM-41]:PE 1:1, (G) H-ZSM-5[MCM-41]:PE 2:1

ABSTRACT

MESOSTRUCTURED ZEOLITIC MATERIALS, AND METHODS OF MAKING AND USING THE SAME

RELATED APPLICATIONS

This application is a Division of U.S. patent application Ser. No. 13/205,151, filed on Aug. 8, 2011, now U.S. Pat. No. 8,524,624 which is a Divisional of U.S. patent application Ser. No. 11/578,869, filed on Oct. 20, 2006, now U.S. Pat. No. 8,008,223, which is a continuation in part of U.S. Ser. No. 10/830,714, filed on Apr. 23, 2004, now U.S. Pat. No. 7,589,041 and entitled "Mesostructured Zeolitic Materials, and Methods of Making and Using the Same" the contents of which are incorporated herein by reference in their entirety.

GOVERNMENT FUNDING

This invention was made with support under Grant Number DAAD 19-02-D0002, awarded by the Army Research Office; the government, therefore, has certain rights in the invention.

BACKGROUND OF THE INVENTION

Zeolites and related crystalline molecular sieves are widely used due to their regular microporous structure, strong acidity, and ion-exchange capability. van Bekkum, H., Flanigen, E. M., Jacobs, P. A., Jansen, J. C. (editors), Introduction to Zeolite Science and Practice, 2nd edition. Studies in Surface Science and Catalysis, Vol. 137 (2001); Corma, A., *Chem. Rev.*, 1997, 97, 2373-2419; Davis, M. E., *Nature*, 2002, 417, 813-821. However, their applications are limited by their small pore openings, which are typically narrower than 1 nm. The discovery of MCM-41, with tuneable mesopores of 2-10 nm, overcomes some of the limitations associated with zeolites. Corma, A., *Chem. Rev.*, 1997, 97, 2373-2419; Kresge, C. T., et al., *Nature*, 1992, 259, 710-712; Kosslick, H., et al., *Appl. Catal. A: Gen.*, 1999, 184, 49-60; Linssen, T., Cassiers, K., Cool, P., Vansant, E. F., *Adv. Coll. Interf. Sci.*, 2003, 103, 121-147. However, unlike zeolites, MCM-41-type materials are not crystalline, and do not possess strong acidity, high hydrothermal stability and high ion-exchange capability, which are important for certain catalytic applications. Corma, A., *Chem. Rev.*, 1997, 97, 2373-2419.

Over the past 10 years, a great deal of effort has been devoted to understanding and improving the structural characteristics of MCM-41. It was found that the properties of Al-MCM-41 could be improved through (i) surface silylation, (ii) Al grafting on the pore walls to increase acidity, (iii) salt addition during synthesis to facilitate the condensation of aluminosilicate groups, (iv) use of organics typically employed in zeolite synthesis to transform partially the MCM-41 wall to zeolite-like structures, (v) preparation of zeolite/MCM-41 composites, (vi) substitution of cationic surfactants by tri-block copolymers and Gemini amine surfactants to thicken the walls, and (vii) assembly of zeolite nanocrystals into an ordered mesoporous structure. Liu, Y., Pinnavaia, T. J., *J. Mater. Chem.*, 2002, 12, 3179-3190. In the latter approach, Liu et al. were able to prepare the first steam-stable hexagonal aluminosilicate (named MSU-S) using zeolite Y nanoclusters as building blocks. Pentasil zeolite nanoclusters were also used to produce MSU-S$_{(MFI)}$ and MSU-S$_{(BEA)}$.

U.S. Pat. No. 5,849,258 to Lujano et al. aggregates the nuclei of crystalline microporous molecular sieve material (e.g., the nuclei of zeolites) to provide a narrowed size distribution of mesopore-sized pore volumes, forming a polycrystalline material. FIG. 1A is a schematic illustration of a prior art amorphous mesoporous material 100, which is described by, for example, Lujano and Pinnavaia. U.S. Pat. No. 5,849,258 to Lujano et al. and Liu, Y., Pinnavaia, T. J., *J. Mater. Chem.*, 2002, 12, 3179-3190. As shown in FIG. 1A, zeolite nucleii 105a, 105b, 105c were aggregated around surfactant micelles under controlled conditions to form a solid. Thereafter, the aggregated nuclei 105a, 105b, 105c are washed in water and dried and the surfactant is extracted to provide a desired mesopore-sized pore volume 110, forming amorphous mesoporous zeolite nuclei material 100. Each of the zeolite nuclei, for example, 105a, 105b, 105c, is a nanosized crystal. When they are aggregated the material 100 is polycrystalline because the nuclei material is lacking the long-range regular lattice structure of the crystalline state (i.e., the aggregated nuclei are not fully crystalline or truly crystalline).

Some strategies have managed to improve appreciably the acidic properties of Al-MCM-41 materials. Liu, Y., Pinnavaia, T. J., *J. Mater. Chem.*, 2002, 12, 3179-3190; van Donk, S., et al., *Catal. Rev.*, 2003, 45, 297-319; Kloetstra, K. R., et al., *Chem. Commun.*, 1997, 23, 2281-2282; Corma, A., *Nature*, 1998, 396, 353-356; Karlsson, A., et al., *Microporous Mesoporous Mater.*, 1999, 27, 181-192; Jacobsen, C. J. H., et al., *J. Am. Chem. Soc.*, 2000, 122, 7116-7117; Huang L., et al., *J. Phys. Chem. B.*, 2000, 104, 2817-2823; On, D. T., et al., *Angew. Chem. Int. Ed.*, 2001, 17, 3248-3251; Liu, Y., et al., *Angew. Chem. Int. Ed.*, 2001, 7, 1255-1258. However, due to the lack of long-range crystallinity in these materials, their acidity was not as strong as those exhibited by zeolites. Corma, A., Chem. Rev., 1997, 97, 2373-2419. For example, semicrystalline mesoporous materials, such as nanocrystalline aluminosilicate PNAs and Al-MSU-S$_{(MFI)}$, even being more active than conventional Al-MCM-41, showed significantly lower activity than H-ZSM-5 for cumene cracking; the catalyst activity for this reaction has usually been correlated to the Bronsted acid strength of the catalyst. Corma, A., *Chem. Rev.*, 1997, 97, 2373-2419; Liu, Y., Pinnavaia, T. J., *J. Mater. Chem.*, 2002, 12, 3179-3190; Kloetstra, K. R., et al., *Chem. Commun.*, 1997, 23, 2281-2282; Jacobsen, C. J. H., et al., *J. Am. Chem. Soc.*, 2000, 122, 7116-7117.

Previous attempts to prepare mesostructured zeolitic materials have been ineffective, resulting in separate zeolitic and amorphous mesoporous phases. Karlsson, A., et al., *Microporous Mesoporous Mater.*, 1999, 27, 181-192; Huang L., et al., *J. Phys. Chem. B.*, 2000, 104, 2817-2823.

Moreover, some authors pointed out the difficulty of synthesizing thin-walled mesoporous materials, such as MCM-41, with zeolitic structure, due to the surface tension associated with the high curvature of the mesostructure. Liu, Y., Pinnavaia, T. J., *J. Mater. Chem.*, 2002, 12, 3179-3190. Thus, the need exists for zeolite single crystals with ordered mesoporosity, and methods of making and using them.

SUMMARY OF THE INVENTION

In one aspect, the present invention relates to a crystalline inorganic material organized in a mesostructure. In a further embodiment, the inorganic material is a metal oxide. In a further embodiment, the inorganic material is a zeolite. In a further embodiment, the inorganic material is a zeotype. In a further embodiment, the inorganic material has a faujasite, mordenite, or ZSM-5 (MFI) structure. In a further embodiment, the mesostructure has the hexagonal pore arrangement of MCM-41. In a further embodiment, the mesostructure has the cubic pore arrangement of MCM-48. In a further embodiment, the mesostructure has the lamellar pore arrangement of MCM-50. In a further embodiment, the mesostructure has pores organized in a foam arrangement. In a further embodiment, the mesostructure has randomly placed pores.

In a further embodiment, the mesostructure is a one dimensional nanostructure. In a further embodiment, the nanostructure is a nanotube, nanorod, or nanowire.

In a further embodiment, the mesostructure is a two dimensional nanostructure. In a further embodiment, the nanostructure is a nanoslab, nanolayer, or nanodisc.

In a further embodiment, the crystalline inorganic material is Y[MCM-41], MOR[MCM-41], or ZSM-5[MCM-41].

In a further embodiment, the mean pore diameter within the mesostructure is about 2 to about 5 nm. In a further embodiment, the mean pore diameter within the mesostructure is about 2 to about 3 nm. In a further embodiment, the wall thickness within the mesostructure is about 1 to about 5 nm. In a further embodiment, the wall thickness within the mesostructure is about 1 to about 3 nm.

In another aspect, the present invention relates to a method of preparing a mesostructured zeolite comprising: a) adding a zeolite to a medium comprising an acid or base, and optionally a surfactant; b) adding a surfactant to the medium from step a) if it is not there already; c) optionally adding a swelling agent to the medium from step b); d) optionally hydrothermally treating the medium from step b) or c); and e) washing and drying the resulting material.

In a further embodiment, the resulting material is further calcined at elevated temperatures. In a further embodiment, the calcination step is performed in air or oxygen. In a further embodiment, the calcination step is performed in an inert gas. In a further embodiment, the inert gas is $N_2$. In a further embodiment, the maximum elevated temperatures are at about 500 to 600° C. In a further embodiment, the maximum elevated temperatures are at about 550° C.

In a further embodiment, the zeolite is selected from the group consisting of faujasite (FAU), mordenite (MOR), and ZSM-5 (MFI). In a further embodiment, the medium in step a) comprises a base. In a further embodiment, the base is an alkali hydroxide, alkaline earth hydroxide, $NH_4OH$ or a tetralkylammonium hydroxide. In a further embodiment, the base is NaOH, $NH_4OH$, or tetramethylammonium hydroxide. In a further embodiment, the medium in step a) comprises an acid. In a further embodiment, the acid is HF. In a further embodiment, the surfactant is an alkylammonium halide. In a further embodiment, the surfactant is a cetyltrimethylammonium bromide (CTAB) surfactant. In a further embodiment, hydrothermally treating the medium from step b) or c) occurs at about 100 to about 200° C. In a further embodiment, hydrothermally treating the medium from step b) or c) occurs at about 120 to about 180° C. In a further embodiment, hydrothermally treating the medium from step b) or c) occurs at about 140 to about 160° C. In a further embodiment, hydrothermally treating the medium from step b) or c) occurs at about 150° C. In a further embodiment, hydrothermally treating the medium from step b) or c) takes place overnight. In a further embodiment, hydrothermally treating the medium from step b) or c) takes place over about 20 hours.

In another aspect, the present invention relates to a mesostructured zeolite prepared by any of the aforementioned methods.

In another aspect, the present invention relates to a method of preparing a mesostructured zeolite comprising: a) adding a zeolite in its acidic form to a medium comprising a base, and optionally a surfactant, in which the zeolite is partially dissolved to produce a suspension; b) adding a surfactant to the medium from step a) if it is not there already; c) optionally adding a swelling agent to the medium from step b); d) optionally hydrothermally treating the medium from step b) or c); e) washing and drying the resulting material; and f) removing the surfactant from the resulting material either by calcining at elevated temperatures, or by solvent extraction.

In another aspect, the present invention relates to a mesostructured zeolite prepared by the above method, wherein the mesostructured zeolite is in the form of a nanotube, nanorod, or nanowire.

In another aspect, the present invention relates to a mesostructured zeolite prepared by the above method, wherein the mesostructured zeolite is in the form of a nanoslab, nanolayer, or nanodisc.

In another aspect, the present invention relates to a method of anchoring a positively charged chemical species to a mesostructured zeolite comprising contacting the mesostructured zeolite and the positively charged species in a medium. In a further embodiment, the positively charged species is selected from the group consisting of cations of an element, quaternary amines, ammonium ions, pyridinium ions, phosphonium ions, and mixtures thereof.

In another aspect, the present invention relates to a method of anchoring a chemical species to a mesostructured zeolite comprising: contacting the mesostructured zeolite in its acidic form and a basic chemical species in a medium. In a further embodiment, the basic chemical species is an inorganic base or an organic base. In a further embodiment, the basic chemical species is selected from the group consisting of hydroxide, amine, pyridine, phosphine, and mixtures thereof.

In another aspect, the present invention relates to a method of anchoring a homogeneous catalyst on a mesostructured zeolite comprising: contacting a mesostructured zeolite comprising a chemical species anchored on it, and a homogeneous catalyst in a medium, wherein the anchored chemical species is capable of acting as a ligand to the homogeneous catalyst.

In another aspect, the present invention relates to a method of supporting a heterogeneous catalyst on a mesostructured zeolite comprising contacting the mesostructured zeolite and the heterogeneous catalyst by a method selected from the group consisting of physical mixture, dry impregnation, wet impregnation, incipient wet impregnation, ion-exchange, and vaporization. In a further embodiment, the heterogeneous catalyst comprises a metal or a mixture thereof. In a further embodiment, the heterogeneous catalyst comprises a metal oxide or a mixture thereof. In a further embodiment, the heterogenous catalyst comprises a nanoparticle, cluster, or colloid.

In another aspect, the present invention relates to a method of catalytically cracking an organic compound comprising contacting the organic compound with a mesostructured zeolite. In a further embodiment, the organic compound is a hydrocarbon. In a further embodiment, the organic compound is an unsaturated hydrocarbon. In a further embodiment, the organic compound is an aromatic hydrocarbon. In a further embodiment, the organic compound is an alkylated benzene. In a further embodiment, the organic compound is 1,3,5-triisopropyl benzene. In a further embodiment, the organic compound is crude oil. In a further embodiment, the organic compound is gas-oil. In a further embodiment, the organic compound is vacuum gas oil. In a further embodiment, the mesostructured zeolite has the zeolitic structure of a faujasite (FAU), mordenite (MOR), or ZSM-5 (MFI). In a further embodiment, the mesostructured zeolite has the hexagonal pore arrangement of MCM-41. In a further embodiment, the mesostructured zeolite is Y[MCM-41], MOR [MCM-41], or ZSM-5[MCM-41].

In another aspect, the present invention relates to a method of refining crude oil comprising contacting the crude oil with a mesostructured zeolite. In a further embodiment, the contacting of the oil with the mesostructured zeolite takes place within a Fluid Catalytic Cracking Unit. In a further embodiment, production of gasoline is increased relative to the amount of gasoline produced in the absence of the mesostructured zeolite. In a further embodiment, production of light olefins is increased relative to the amount of light olefins produced in the absence of the mesostructured zeolite.

In another aspect, the present invention relates to a method of catalytically degrading a polymer comprising contacting the polymer with a mesostructured zeolite. In a further embodiment, the polymer is a hydrocarbon polymer. In a further embodiment, the polymer is a poly(alkylene), poly(alkynyl) or poly(styrene). In a further embodiment, the polymer is polyethylene (PE). In a further embodiment, the mesostructured zeolite has the zeolitic structure of a faujasite (FAU), mordenite (MOR), or ZSM-5 (MFI). In a further embodiment, the mesostructured zeolite has the hexagonal pore arrangement of MCM-41. In a further embodiment, the mesopostructured zeolite is Y[MCM-41], MOR[MCM-41], or ZSM-5 [MCM-41].

In another aspect, the invention relates to an inorganic material having a fully crystalline mesostructure. The fully crystalline mesostructure includes mesopore surfaces defining a plurality of mesopores. A cross-sectional area of each of the plurality of mesopores is substantially the same. In one embodiment, the material has a pore volume. For example, the plurality of mesopores have a pore volume of the material and the pore volume of the plurality of mesopores is controlled. The pore volume can be from about 0.05 cc/g to about 2 cc/g, in another embodiment, the pore volume is from about 0.5 cc/g to about 1 cc/g. The fully crystalline inorganic material can be, for example, mono crystalline, multi crystalline, or single crystalline.

An area of each of the plurality of mesopores has a controlled cross sectional area range. The controlled cross sectional area has, for example, a controlled distribution range. Optionally, the controlled cross sectional area has a diameter and the diameter ranges from about 2 nm to about 60 nm. In one embodiment, each mesopore diameter has a controlled distribution range, for example, each mesopore diameter falls within a 1 nm distribution range. Alternatively, the controlled cross sectional area has a diameter ranging from about 2 nm to about 5 nm, or from about 2 nm to about 3 nm.

The inorganic material can have, for example, a 1D pore structure, a 2D pore structure, or a 3D pore structure prior to defining the plurality of mesopores. The material can be a metal oxide, a zeolite, a zeotype, aluminophosphate, gallophosphate, zincophosphate, titanophosphate, faujasite (FAU), mordenite (MOR), ZSM-5 (MFI), or CHA, or any combination thereof.

The fully crystalline mesostructure can have a controlled pore arrangement. The mesostructure pore arrangement can be: an organized pore arrangement, the hexagonal pore arrangement of MCM-41, the cubic pore arrangement of MCM-48, the lamellar pore arrangement of MCM-50, the hexagonal pore arrangement of SBA-15, or a foam-like arrangement. Alternatively, the mesostructure can have randomly placed pores. The fully crystalline mesostructure can be, for example, Y[MCM-41], MOR[MCM-41], ZSM-5 [MCM-41],Y[MCM-48], MOR[MCM-48], ZSM-5[MCM-48], Y[MCM-50], MOR[MCM-50], or ZSM-5[MCM-50]. A wall thickness between adjacent mesopores can measure about 1 nm to about 5 nm, or about 1 nm to about 3 nm.

A charged chemical species, for example a positively charged chemical species, can be anchored to the fully crystalline mesostructure. The charged chemical species can be cations of an element, quaternary amines, ammonium ions, pyridinium ions, or phosphonium ions, or any combination thereof. Alternatively, a chemical species can be anchored and/or covalently bonded to the fully crystalline mesostructure. The chemical species can be a basic chemical species, an inorganic base, an organic base, hydroxide, amine, pyridine, or phosphine, or any combination thereof. In another embodiment, a homogeneous catalyst adheres to the inorganic material and a chemical species binds to the homogeneous catalyst A heterogeneous catalyst can be supported by the fully crystalline mesostructure. The heterogeneous catalyst can be a metal, a metal oxide, a nanoparticle, a cluster, or a colloid, or any combination thereof.

In another aspect, the invention relates to an inorganic material that has an external surface contour substantially the same as the external surface contour of the material prior to defining the plurality of mesopores. In another aspect, the invention relates to a material that has a chemical composition framework substantially the same as the chemical composition framework of the material prior to defining the plurality of mesopores. For example, the framework has unchanged stoichiometry after the mesopores are defined.

In another aspect, the invention relates to a material that has a connectivity substantially the same as the connectivity of the material prior to defining the plurality of mesopores. In another aspect, the invention relates to a material that has an improved intracrystalline diffusion compared to the intracrystalline diffusion of the material prior to defining the plurality of mesopores.

In another aspect, the invention relates to a method of making an inorganic material that includes the steps of (a) providing a fully crystalline inorganic material, (b) exposing the fully crystalline inorganic material to a pH controlled medium under a first set of time and temperature conditions, (c) exposing the fully crystalline inorganic material to a surfactant under a second set of time and temperature conditions, and (d) treating the inorganic material by controlling the first and second set of time and temperature conditions to form a plurality of mesopores having a controlled cross sectional area within the fully crystalline inorganic material. Optionally, the method includes the step (e) adjusting the first and second set of time and temperature conditions such that the plurality of mesopores is arranged in a hexagonal [MCM-41] pore arrangement, in a cubic [MCM-48] pore arrangement, in a lamellar [MCM-50] pore arrangement, in a hexagonal [SBA-15] pore arrangement, in a foam-like pore arrangement, in a random pore arrangement, in an organized pore arrangement, or in a controlled pore arrangement in the fully crystalline inorganic material.

In one embodiment, the step (b) includes selecting the pH controlled medium to control a pore volume of the fully crystalline inorganic material, to control a diameter of each of the plurality of mesopores, or to control a cross sectional area of each of a plurality of mesopores in the fully crystalline inorganic material. In another embodiment, the step (c) includes selecting a quantity of the surfactant to control a pore volume of the fully crystalline inorganic material, to control a diameter of each of the plurality of mesopores, or to control a cross sectional area of each of a plurality of mesopores in the fully crystalline inorganic material. In another embodiment, the method further includes the step of adding a swelling agent and/or a triblock copolymer to the pH controlled medium.

In another embodiment, the material produced in step (d) is washed and dried. Alternatively, or in addition, surfactant is removed from material produced in step (d) by, for example, extracting the surfactant and/or calcining the surfactant after performing steps (a) through (d).

In another embodiment, the first or second temperature conditions can include hydrothermal conditions. The first or second temperature conditions can include room temperature conditions and/or can range from about 100 to about 200° C. The first or second time conditions can range from about 1 hour to about 2 weeks.

The fully crystalline inorganic material can be a metal oxide, a zeolite, a zeotype, aluminophosphate, gallophosphate, zincophosphate, titanophosphate, faujasite (FAU), mordenite (MOR), ZSM-5 (MFI), or CHA, or any combination thereof. The pH controlled medium can include a pH control setpoint that is at least about 8 to not more than about 12, at least about 10 to not more than about 14, at least about 2 to not more than about 6, or at least about −2 to not more than about 2.

The surfactant can be cationic, ionic, or neutral surfactants, or any combination thereof. For example, the surfactant can be cetyltrimethylammonium bromide (CTAB).

The method of making the inorganic material can also include introducing a charged chemical species to the fully crystalline inorganic material produced in step (d). The charged chemical species can: positively charged. In addition, the charged chemical species can be cations of an element, quaternary amines, ammonium ions, pyridinium ions, or phosphonium ions, or any combinations thereof.

The method of making the inorganic material can also include introducing a chemical species to the fully crystalline inorganic material produced in step (d). The chemical species can be a basic chemical species, an inorganic base, an organic base, hydroxide, amine, pyridine, or phosphine, or any combination thereof. A homogeneous catalyst can be added such that the chemical species binds to the homogeneous catalyst. A heterogeneous catalyst can be contacted with the fully crystalline inorganic material produced in step (d). The heterogeneous catalyst can be a metal, a metal oxide, a nanoparticle, a cluster, or a colloid, or any combination thereof.

In another aspect, the invention relates to an inorganic material made by the process of (a) providing a fully crystalline inorganic material, (b) exposing the fully crystalline inorganic material to a pH controlled medium under a first set of time and temperature conditions, (c) exposing the fully crystalline inorganic material to a surfactant under a second set of time and temperature conditions; and (d) treating the inorganic material by controlling the first and second set of time and temperature conditions to form a plurality of mesopores having a controlled cross sectional area within the fully crystalline inorganic material.

In another aspect, the invention relates to a hydrocarbon material produced by the process of reacting a larger hydrocarbon material in the presence of a catalyst including inorganic material having a fully crystalline mesostructure. The fully crystalline mesostructure includes mesopore surfaces defining a plurality of mesopores. A cross-sectional area of each of the plurality of mesopores is substantially the same. The hydrocarbon material produced by this process can be 1,3-diisopropyl benzene, gasoline, propylene, butene, coke, total dry gas, or liquefied petroleum gases, or combinations thereof.

In another aspect, the invention relates to a method of catalytically cracking an organic compound. The method includes the step of contacting the organic compound with an inorganic material having a fully crystalline mesostructure. The fully crystalline mesostructure includes mesopore surfaces defining a plurality of mesopores. A cross-sectional area of each of the plurality of mesopores is substantially the same. The organic compound can be at least one of a hydrocarbon, unsaturated hydrocarbon, an aromatic hydrocarbon, an alkylated benzene, 1,3,5-triisopropyl benzene, crude oil, gas-oil, or vacuum gas oil. Optionally, the cross sectional area has a diameter greater than a diameter of the organic compound being cracked.

In another aspect, the invention relates to a method of processing crude oil. The method includes contacting crude oil with an inorganic material having a fully crystalline mesostructure. The fully crystalline mesostructure includes mesopore surfaces defining a plurality of mesopores. A cross-sectional area of each of the plurality of mesopores is substantially the same. The crude oil is reacted in the presence of the inorganic material under conditions of controlled temperature and pressure. The crude oil can be reacted in the presence of the inorganic material within a Fluid Catalytic Cracking unit. In one embodiment, the fraction of gasoline produced is increased relative to the amount of gasoline produced using a fully crystalline inorganic material. In another embodiment, light olefin production is increased relative to the amount of light olefins produced using a fully crystalline inorganic material.

In another aspect, the invention relates to a method of processing a polymer. The method includes contacting a polymer with an inorganic material having a fully crystalline mesostructure. The fully crystalline mesostructure includes mesopore surfaces defining a plurality of mesopores. A cross-sectional area of each of the plurality of mesopores is substantially the same. The polymer can be thermally treated in the presence of the inorganic material. The polymer can be a hydrocarbon polymer, poly(alkylene), poly(alkynyl), poly(styrene), or polyethylene (PE), or any combination thereof.

In another aspect, the invention relates to a benzene compound made by the process of contacting a crude oil with an inorganic material having a fully crystalline mesostructure. The fully crystalline mesostructure includes mesopore surfaces defining a plurality of mesopores. A cross-sectional area of each of the plurality of mesopores is substantially the same. The crude oil is reacted in the presence of the inorganic material under conditions of controlled temperature and pressure. The benzene compound can include benzene derivatives such as, for example, toluene and xylene. In one embodiment the quantity of benzene compound produced with the inorganic material having a fully crystalline mesostructure is a lesser quantity than is produced with a conventional unmodified fully crystalline zeolite.

In another aspect, the invention relates to a gasoline compound made by the process of contacting a crude oil with an inorganic material having a fully crystalline mesostructure. The fully crystalline mesostructure includes mesopore surfaces defining a plurality of mesopores. A cross-sectional area of each of the plurality of mesopores is substantially the same. The crude oil is reacted in the presence of the inorganic material under conditions of controlled temperature and pressure. In one embodiment the quantity of gasoline produced with the inorganic material having a fully crystalline mesostructure is a greater quantity than is produced with a conventional unmodified fully crystalline zeolite.

In another aspect, the invention relates to a method of water treatment that includes contacting contaminated water with an inorganic material having a fully crystalline mesostructure. The fully crystalline mesostructure includes mesopore surfaces defining a plurality of mesopores. A cross-sectional area of each of the plurality of mesopores is substantially the same. Contaminants from the water are removed with the inorganic material. In one embodiment, the removed contaminant is a dye.

In another aspect, the invention relates to an inorganic material that includes a crystalline nanostructure having a plurality of members. Each member defines a plurality of pores and adjacent members define voids therebetween. At least one dimension of each of the plurality of members is less than 100 nm. In one embodiment, at least one dimension of each of the plurality of member measures between about 3 nm and about 20 nm. In one embedment, the inorganic material is semi crystalline or poly crystalline. The nanostructure can be one dimensional, two dimensional, or three dimensional. The nanostructure can be a nanotube, nanoring, nanorod, nanowire, nanoslab, nanolayer, or nanodisc. In one embodiment, one member has one nanostructure and another member has another nanostructure, for example, a nanorod is adjacent a nanotube. The inorganic material can include a metal oxide, a zeolite, a zeotype, aluminophosphate, gallophosphate, zincophosphate, titanophosphate, faujasite (FAU), mordenite (MOR), and ZSM-5 (MFI), or CHA, or any combination thereof. The nanostructure can be, for example, nanostructure is Y[ZNR], MOR[ZNR], or ZSM-5[ZNR].

In another aspect, the invention relates to a method of making an inorganic material that includes the steps of (a) providing a crystalline inorganic material, (b) exposing the crystalline inorganic material to a pH controlled medium to partially dissolve the crystalline inorganic material producing an amorphous inorganic material, (c) adjusting the pH of the amorphous inorganic material, (d) exposing the amorphous inorganic material to a surfactant, and (e) treating the inorganic material by controlling time and temperature conditions of steps (b) through (d) to form nanostructures. Optionally, the method further includes treating the inorganic material by controlling the time and temperature conditions to first form a [MCM-50] mesostructure and then to form nanostructures.

In one embodiment of the method, the pH controlled medium has a pH control setpoint that is at least about 10 to not more than about 14, that is at least about 2 to not more than about 6, or that is at least about −2 to not more than about 2. In another embodiment, the amorphous inorganic material has a pH ranging from about 8 to about 12. The temperature conditions can range from about 100 to about 200° C. The time can range from about 12 hours to about 2 weeks. The temperature conditions can be hydrothermal temperature conditions.

In one embodiment, the surfactant employed in accordance with the method is a cationic surfactant, an ionic surfactant, or a neutral surfactants, or any combination thereof. For example, cetyltrimethylammonium bromide (CTAB) can be employed as a surfactant. The fully crystalline inorganic material can be a metal oxide, a zeolite, a zeotype, aluminophosphate, gallophosphate, zincophosphate, titanophosphate, faujasite (FAU), mordenite (MOR), and ZSM-5 (MFI), or CHA, or any combination thereof.

In another aspect, the invention relates to an inorganic material made by the process of (a) providing a crystalline inorganic material, (b) exposing the crystalline inorganic material to a pH controlled medium to partially dissolve the crystalline inorganic material producing an amorphous inorganic material, (c) adjusting the pH of the amorphous inorganic material, (d) exposing the amorphous inorganic material to a surfactant, and (e) treating the inorganic material by controlling time and temperature conditions of steps (b) through (d) to form nanostructures.

In another aspect, the invention relates to a cracked organic compound made by the process of contacting an organic compound with an inorganic material that includes a crystalline nanostructure having a plurality of members. Each member defines a plurality of pores and adjacent members define voids therebetween. At least one dimension of each of the plurality of members is less than 100 nm. In one embodiment, the hydrocarbon material is 1,3-diisopropyl benzene, gasoline, propylene, butene, coke, total dry gas, or liquefied petroleum gases, or combinations thereof.

In another aspect, the invention relates to a method of catalytically cracking an organic compound. The method includes contacting the organic compound with an inorganic material that includes a crystalline nanostructure having a plurality of members. Each member defines a plurality of pores and adjacent members define voids therebetween. At least one dimension of each of the plurality of members is less than 100 nm. In one embodiment, the organic compound is at least one of a hydrocarbon, unsaturated hydrocarbon, an aromatic hydrocarbon, an alkylated benzene, 1,3,5-triisopropyl benzene, crude oil, gas-oil, or vacuum gas oil.

In another aspect, the invention relates to a method of processing crude oil. The method includes contacting crude oil with an inorganic material that includes a crystalline nanostructure having a plurality of members. Each member defines a plurality of pores and adjacent members define voids therebetween. At least one dimension of each of the plurality of members is less than 100 nm. The crude oil is reacted in the presence of the inorganic material under conditions of controlled temperature and pressure. Optionally, the crude oil is reacted in the presence of the inorganic material within a Fluid Catalytic Cracking unit. In one embodiment, the fraction of gasoline produced is increased relative to the amount of gasoline produced using a fully crystalline inorganic material. In another embodiment, light olefin production is increased relative to the amount of light olefins produced using a fully crystalline inorganic material.

In another aspect, the invention relates to a method of processing a polymer. The method includes contacting a polymer with an inorganic material that includes a crystalline nanostructure having a plurality of members. Each member defines a plurality of pores and adjacent members define voids therebetween. At least one dimension of each of the plurality of members is less than 100 nm. The polymer can be thermally treated in the presence of the inorganic material. The polymer can be a hydrocarbon polymer, poly(alkylene), poly(alkynyl), poly(styrene), or polyethylene (PE), or any combination thereof.

In another aspect, the invention relates to a benzene compound made by the process of contacting a crude oil with an inorganic material that includes a crystalline nanostructure having a plurality of members. Each member defines a plurality of pores and adjacent members define voids therebetween. At least one dimension of each of the plurality of members is less than 100 nm. The crude oil is reacted in the presence of the inorganic material under conditions of controlled temperature and pressure. The benzene compound can include benzene derivatives such as, for example, toluene and xylene. In one embodiment the quantity of benzene compound produced with the crystalline nanostructure material is a lesser quantity than is produced with a conventional unmodified fully crystalline zeolite.

In another aspect, the invention relates to a gasoline compound made by the process of contacting a crude oil with an inorganic material that includes a crystalline nanostructure having a plurality of members. Each member defines a plurality of pores and adjacent members define voids therebetween. At least one dimension of each of the plurality of members is less than 100 nm. The crude oil is reacted in the presence of the inorganic material under conditions of controlled temperature and pressure. In one embodiment the quantity of gasoline produced with the inorganic material having a crystalline nanostructure is a greater quantity than is produced with a conventional unmodified fully crystalline zeolite.

In another aspect, the invention relates to a method of water treatment that includes contacting contaminated water with an inorganic material that includes a crystalline nanostructure having a plurality of members. Each member defines a plurality of pores and adjacent members define voids therebetween. At least one dimension of each of the plurality of members is less than 100 nm. Contaminants from the water are removed with the inorganic material. In one embodiment, the removed contaminant is a dye.

In one aspect, the invention features a method of making an inorganic material that includes exposing a solution of one or more inorganic compounds to a basic medium under a first set of time and temperature conditions to form a fully crystalline inorganic material. The fully crystalline inorganic material is exposed to a pH controlled medium under a second set of time and temperature conditions, and then to a surfactant under a third set of time and temperature conditions. The second and third set of time and temperature conditions are controlled to treat the inorganic material such that a plurality of mesopores are formed that have a controlled cross sectional area within the fully crystalline inorganic material. The first set of time conditions can range from about 4 hours to about 2 weeks and the first set of temperature conditions can range from about 100 to about 200° C. The material produced can have a pH from about 10 to about 14. These steps can be repeated.

The pH controlled medium can have a different values during the initial steps as compared with during the repeated steps, and the surfactant used during the first steps can be different than the surfactant used during the repeated steps, i.e., the first steps can use a first surfactant and the repeated steps can use a second surfactant. A first quantity of the first surfactant can be used in the first steps, and a second, different quantity of the second surfactant can be used during the repeated steps.

The third set of time and temperature conditions can be adjusted such that the plurality of mesopores that is formed is arranged in at least one of a hexagonal [MCM-41] pore arrangement, a cubic [MCM-48] pore arrangement, a lamellar [MCM-50] pore arrangement, a hexagonal [SBA-15] pore arrangement, a foam-like pore arrangement, a random pore arrangement, an organized pore arrangement, or some other controlled pore arrangement within the fully crystalline material. Further, the pH controlled medium can be selected to control a pore volume of the fully crystalline inorganic material, and a quantity of the surfactant can also be selected to control a pore volume of the fully crystalline inorganic material. Moreover, the pH controlled medium can be selected to control a diameter of each of a plurality of mesopores in the fully crystalline inorganic material. Selection of the surfactant can also be used to control a diameter of each of the plurality of mesopores in the fully crystalline inorganic material.

In some embodiments, the pH controlled medium is selected to control a cross sectional area of each of a plurality of mesopores in the fully crystalline inorganic material, and the surfactant used can also be selected to control a cross sectional area of each of a plurality of mesopores in the fully crystalline inorganic material. A swelling agent, a nanoparticle, a biomolecule, a mineralizing agent, a co-surfactant, a metal oxide precursor, a silica solubilizing agent, or an alumina solubilizing agent, or any combination thereof, can be added to the pH controlled medium. The fully crystalline inorganic material produced by the method can be washed and dried, and surfactant can be removed (e.g., extracted) from the fully crystalline inorganic material. The surfactant can also be calcined after the fully crystalline inorganic material has been made, e.g., after the mesopores have been formed.

In some embodiments, it is advantageous for the second or third temperature conditions to include hydrothermal conditions. In these embodiments and others, they can range from about 100 to about 200° C., and the temperature setpoint can be steady during the corresponding processing time. In some embodiments, the second or third temperature conditions are ambient (e.g., room temperature conditions). The second or third time conditions range from about 1 hour to about 2 weeks, depending upon the objectives to be achieved.

The fully crystalline inorganic material can include a metal oxide, a zeolite, a zeotype, aluminophosphate, gallophosphate, zincophosphate, titanophosphate, faujasite (FAU), mordenite (MOR), ZSM-5 (MFI), CHA, other similar materials known to those of skill in the art, or any combination of these. The pH controlled medium can include a pH control setpoint that is at least about 8 to not more than about 12, or that is at least about 10 to not more than about 14, or that is at least about 2 to not more than about 6, or that is at least about −2 to not more than about 2.

The surfactants used can include cationic, ionic, or neutral surfactants, or any combination of these. A particular surfactant useful with the invention is cetyltrimethylammonium bromide (CTAB). Suitable surfactants can also include, e.g., a triblock copolymer.

Another aspect of the invention features an inorganic material made by the process of exposing a solution of one or more inorganic compounds to a basic medium under a first set of time and temperature conditions to form a fully crystalline inorganic material, then exposing the fully crystalline inorganic material to a pH controlled medium under a second set of time and temperature conditions. The fully crystalline inorganic material can be exposed to a surfactant under a third set of time and temperature conditions. The inorganic material can be treated by controlling the second and third set of time and temperature conditions to form a plurality of mesopores that have a controlled cross sectional area within the fully crystalline inorganic material. The inorganic material can include at least one of a metal oxide, a zeolite, a zeotype, aluminophosphate, gallophosphate, zincophosphate, titanophosphate, faujasite (FAU), mordenite (MOR), ZSM-5 (MFI), or CHA, or any combination of these materials. This list is not comprehensive and other suitable materials will be apparent to those of skill in the art.

Another aspect of the invention features a method of making an inorganic material comprising the steps of exposing a solution of one or more inorganic compounds to a basic medium under a first set of time and temperature conditions to form a fully crystalline inorganic material, and exposing a crystalline inorganic material to a pH controlled medium to partially dissolve the crystalline inorganic material to produce producing an amorphous inorganic material. The pH of the amorphous inorganic material is adjusted, and the amorphous inorganic material is exposed to a surfactant. Proper treatment by controlling the time and temperature conditions of these steps results in the formation of nanostructures. The time conditions can range from about 4 hours to about 2 weeks, and the temperature conditions can range from about 100 to about 200° C., thereby adjusting the characteristics of the nanostructures that are made. The inorganic material produced can have a pH from about 10 to about 14.

The amorphous inorganic material produced can have a degree of connectivity. Moreover, the steps recited above can be repeated to further control the properties of the material produced.

The first exposing step can include a first pH controlled medium. These steps can be repeated using a second pH controlled medium that is different than the first pH controlled medium. Moreover, the first steps can include using a first surfactant and the repeated steps can use a second surfactant that is different than the first surfactant. A first quantity of the first surfactant can be used, and a different, second quantity of the second surfactant can be used. The time and temperature conditions can be controlled to treat the inorganic material, to first form at least one mesostructure, and then to form nanostructures.

The time and temperature conditions of the first steps can be controlled to first form a [MCM-50] mesostructure, and then to form nanostructures. The pH controlled medium can include a pH control setpoint that is at least about 10 to not more than about 14 during the exposing step, a pH control setpoint that is at least about 2 to not more than about 6, or a pH control setpoint that is at least about −2 to not more than about 2. The adjusted pH of the amorphous inorganic material can include a pH ranging from about 8 to about 12. The temperature conditions can also be used to control the results. In some embodiments, the temperature conditions are ambient (e.g., room temperature). In other, the temperature conditions range from about 100 to about 200° C. The time conditions can range from about 12 hours to about 2 weeks, and the temperature conditions can be hydrothermal.

Different surfactants can be used with this aspect of the invention, including cationic, ionic, or neutral surfactants, or various combination thereof. One useful surfactant includes cetyltrimethylammonium bromide (CTAB). Triblock copolymers can also be used for this purpose. The fully crystalline inorganic material can include metal oxides, zeolites, a zeotype, aluminophosphate, gallophosphate, zincophosphate, titanophosphate, faujasite (FAU), mordenite (MOR), ZSM-5 (MFI), CHA, or other materials known in the art, including various combinations thereof. Useful additives include swelling agents, nanoparticles, biomolecules, mineralizing agents, co-surfactants, metal oxide precursors, silica solubilizing agents, and alumina solubilizing agents, e.g., when added to the pH controlled medium.

The nanostructured inorganic material that is produced can be washed and dried. The surfactant can be removed, e.g, by extraction. The surfactant about the formed material can also be calcined at high temperature, e.g., to remove surfactant.

Another aspect of the invention features an inorganic material made by the process of exposing a solution of one or more inorganic compounds to a basic medium under a first set of time and temperature conditions to form a fully crystalline inorganic material. The crystalline inorganic material is exposed to a pH controlled medium to partially dissolve the crystalline inorganic material, thereby producing an amorphous inorganic material. The pH of the amorphous inorganic material is adjusted, and it is exposed to a surfactant. The inorganic material is treated by controlling time and temperature conditions of these steps, to form nanostructures.

Yet another aspect of the invention features an additive that includes a catalyst and an inorganic material. The inorganic material includes a fully crystalline mesostructure that includes mesopore surfaces that define a plurality of mesopores such that a cross-sectional area of each of the plurality of mesopores is substantially the same. A weight fraction of the inorganic material plus the catalyst is from about 0.05 to about 100 weight percent inorganic material. As described herein, this phraseology can be interpreted to mean, e.g., that the additive can range from 0.05 weight % inorganic material and 99.95 weight % catalyst, to a combination that has a large amount of inorganic material and almost no catalyst. Of course, in addition to these two components the additive can also include other compounds and/or compositions.

The catalyst used can include a biological catalyst or an enzyme, or some combination of these. A weight fraction of the inorganic material (on a weight basis that includes the catalyst plus the inorganic material) can also be from about 2 to about 3 weight percent, or from about 1 to about 10 weight percent. The plurality of mesopores in the additive can have a pore volume that is controlled. For example, embodiments include a pore volume from about 0.05 cc/g to about 2 cc/g, or from about 0.5 cc/g to about 1 cc/g.

Moreover, the inorganic material of the additive can have a chemical composition framework that is substantially the same as a chemical composition framework of the inorganic material before the plurality of mesopores were defined (e.g., formed or created) within the inorganic material. The inorganic material can also have a connectivity that is substantially the same as the connectivity of the inorganic material prior to defining (e.g., forming or creating) the plurality of mesopores within the inorganic material. In some embodiments, the inorganic material of the additive has an improved intracrystalline diffusion compared to the intracrystalline diffusion of the inorganic material prior to defining the plurality of mesopores within the inorganic material.

An area of each of the plurality of mesopores can have a controlled cross sectional area range, and the controlled cross sectional area can have a controlled distribution range. The controlled cross sectional area can have a diameter, e.g., ranging from about 2 nm to about 60 nm, and a diameter and each mesopore diameter can have a controlled distribution range. In some embodiments, the controlled cross sectional area has a diameter and the diameter of a majority of the mesopores falls within a 1 nm distribution range. Embodiments include the controlled cross sectional area having a diameter ranging from about 2 nm to about 5 nm, or from about 2 nm to about 3 nm.

The inorganic material of the additive can include a metal oxide, a zeolite, a zeotype, aluminophosphate, gallophosphate, zincophosphate, titanophosphate, faujasite (FAU), mordenite (MOR), ZSM-5 (MFI), CHA, or some combination of these. The mesostructure can have a pore arrangement, and the pore arrangement can be controlled, e.g., as an organized pore arrangement. Examples of mesostructure pore arrangements of the invention include the hexagonal pore arrangement of MCM-41, the cubic pore arrangement of MCM-48, the lamellar pore arrangement of MCM-50, and/or the hexagonal pore arrangement of SBA-15. The mesostructure pores can also be organized in a foam-like arrangement, or they can be randomly placed. The invention controls these results by controlling and using the parameters described herein. Mesostructures of the additive can include Y[MCM-41], MOR[MCM-41], ZSM-5[MCM-41], Y[MCM-48], MOR[MCM-48], ZSM-5[MCM-48], Y[MCM-50], MOR[MCM-50], and/or ZSM-5[MCM-50]. The wall thickness between adjacent mesopores can be about 1 nm to about 5 nm, or about 5 nm to about 50 nm.

Another aspect of the invention features an additive that includes an inorganic material comprising a fully crystalline mesostructure comprising mesopore surfaces defining a plurality of mesopores, wherein a cross-sectional area of each of the plurality of mesopores is substantially the same. That additive also includes a separation material, such that a weight fraction of the separation material plus the inorganic material is from about 0.05 to about 100 weight percent inorganic material. (This phraseology is clarified above.) The separation material can include membranes, adsorbents, filters, ion exchange columns, ion exchange membranes, ion exchange filters, and combinations of these. These components can be used with the additive using various techniques, both physical and chemical.

The plurality of mesopores in the additive have a pore volume, and the pore volume can be controlled. For example, the pore volume can be from about 0.05 cc/g to about 2 cc/g, or from about 0.5 cc/g to about 1 cc/g. The inorganic material of the additive has a chemical composition framework that can be substantially the same as the chemical composition framework of the inorganic material prior to defining (e.g., by forming or creating) the plurality of mesopores within the inorganic material. The inorganic material can also have a connectivity that is substantially the same as the connectivity of the inorganic material before the plurality of mesopores were defined in the inorganic material. The material can exhibit an improved intracrystalline diffusion compared to the intracrystalline diffusion of the material prior to defining the plurality of mesopores, and this improvement can be a result of the defining process.

Each of the plurality of mesopores in the additive can have a controlled cross sectional area that ranges between controlled limits. The controlled cross sectional area can have a controlled distribution range. For example, the controlled cross sectional area can have a diameter that ranges from about 2 nm to about 60 nm, and the actual distribution within this range can be much tighter. In some embodiments, preferably, the controlled cross sectional area has a diameter and each mesopore diameter has a controlled distribution range. The controlled distribution range can be, e.g., 1 nm of variation. Embodiments include a plurality of mesopores where the diameter of a majority of the mesopores falls within a 1 nm distribution range. The controlled cross sectional area can have diameters ranging from about 2 nm to about 5 nm, or from about 2 nm to about 3 nm.

The inorganic material can include a metal oxide, a zeolite, a zeotype, aluminophosphate, gallophosphate, zincophosphate, titanophosphate, faujasite (FAU), mordenite (MOR), ZSM-5 (MFI), CHA, or various combinations of these and other materials know to those of skill in the art. The mesostructure can have a pore arrangement, and the pore arrangement can be controlled, e.g., to be an organized pore arrangement, such as the hexagonal pore arrangement of MCM-41, the cubic pore arrangement of MCM-48, the lamellar pore arrangement of MCM-50, and/or the hexagonal pore arrangement of SBA-15. These pores can also be organized in a foam-like arrangement, or they can be randomly placed. The mesostructure of the additive can be Y[MCM-41], MOR[MCM-41], ZSM-5[MCM-41], Y[MCM-48], MOR[MCM-48], ZSM-5[MCM-48], Y[MCM-50], MOR[MCM-50], and/or ZSM-5[MCM-50]. A wall thickness between adjacent mesopores can be, e.g., about 1 nm to about 5 nm, or about 5 nm to about 50 nm.

Another aspect of the invention features an additive comprising an inorganic material that includes a crystalline nanostructure comprising a plurality of members, each member defining a plurality of pores, and adjacent members defining voids therebetween, such that at least one dimension of each of the plurality of members is less than 100 nm. The additive also includes a catalyst, such that a weight fraction of the catalyst plus the inorganic material is from about 0.05 to about 100 weight percent inorganic material. The catalyst can include, e.g., a biological catalyst and/or an enzyme. In some embodiments, the at least one dimension of each of the plurality of member measures between about 3 nm and about 20 nm. The nanostructure can be one dimensional, two dimensional, or three dimensional. Many nanoshapes can be formed using the invention. For example, the nanostructures can be a nanotube, nanoring, nanorod, nanowire, nanoslab, nanolayer, and/or a nanodisc. The inorganic material of the additive can include a metal oxide, a zeolite, a zeotype, aluminophosphate, gallophosphate, zincophosphate, titanophosphate, faujasite (FAU), mordenite (MOR), and ZSM-5 (MFI), CHA, or combinations of such materials. The nanostructures formed can be Y[ZNR], MOR[ZNR], and/or ZSM-5[ZNR].

Another aspect of the invention features an additive that comprises an inorganic material that includes a crystalline nanostructure comprising a plurality of members, each member defining a plurality of pores, and adjacent members defining voids therebetween. At least one dimension of each of the plurality of members is less than 100 nm. The additive also includes a separation material, such that a weight fraction of the separation material plus the inorganic material is from about 0.05 to about 100 weight percent of the inorganic material. (This phraseology is explained above.) The catalyst of the additive can include a biological catalyst and/or an enzyme. In some embodiments, the weight fraction of inorganic material is from about 2 to about 3 weight percent, or from about 1 to about 10 weight percent.

The at least one dimension of the inorganic material of each of the plurality of members can measure between about 3 nm and about 20 nm. The nanostructure can be one dimensional, two dimensional, or three dimensional. The nanostructure can take various shapes, such as a nanotube, nanoring, nanorod, nanowire, nanoslab, nanolayer, and/or a nanodisc. The inorganic material can include metal oxides, zeolites, zeotypes, aluminophosphates, gallophosphates, zincophosphates, titanophosphates, faujasite (FAU), mordenite (MOR), ZSM-5 (MFI), CHA, and/or combinations of these and other related materials. In some embodiments the nanostructure is Y[ZNR], MOR[ZNR], and/or ZSM-5[ZNR].

Yet another aspect of the invention features an inorganic material comprising a fully crystalline mesostructure that includes mesopore surfaces defining a plurality of mesopores, such that a cross-sectional area of each of the plurality of mesopores is substantially the same, along with a surface modification of a surface of the fully crystalline mesostructure. The surface modification can include, e.g., a metal nanoparticle, a metal oxide nanoparticle, a metal oxide coating, a metal complex, a biomolecule, a protein, an enzyme, a cation, a proton, a chemical functionality, an amine, a phosphine, a ligand, a homogeneous catalyst, a heterogeneous catalyst, or any combination of these.

Another aspect of the invention features an inorganic material comprising a crystalline nanostructure comprising a plurality of members such that each member defining a plurality of pores, and adjacent members define voids therebetween. At least one dimension of each of the plurality of members is less than 100 nm. The inorganic material also includes a modification of a surface of the crystalline nanostructure, such a modification including a metal nanoparticle, a metal oxide nanoparticle, a metal oxide coating, a metal complex, a biomolecule, a protein, an enzyme, a cation, a proton, a chemical functionality, an amine, a phosphine, a ligand, an homogeneous catalyst, or an heterogeneous catalyst, or combinations of these. Such surface modifications can be accomplished by techniques known to those of skill in the art.

Another aspect of the invention features a method of making an inorganic material that includes providing a fully crystalline inorganic material, exposing the fully crystalline inorganic material to a pH controlled medium under a first set of time and temperature conditions, and exposing the fully crystalline inorganic material to a surfactant under a second set of time and temperature conditions. The inorganic material can be treated by controlling the first and second set of time and temperature conditions to form a fully crystalline mesostructure that includes a plurality of mesopores that have a controlled cross sectional area within the fully crystalline inorganic material, and the surface of the fully crystalline mesostructure can be modified. The fully crystalline mesostructure can be exposed to air for a third set of time and temperature conditions, and exposed to a hydrogen gas for a fourth set of time and temperature conditions. The fully crystalline mesostructure can be treated by controlling the third and fourth set of time and temperature conditions such that a solid phase of a substance is formed on an interior and/or exterior surface of the fully crystalline mesostructure. The content of hydrogen in the gas can range from about 1% to about 100% hydrogen, depending upon the objectives to be achieved. The surface of fully crystalline mesostructure can be reacted with a metal alkoxide. The metal alkoxide can include one or more of silicon alkoxide, aluminum alkoxide, gallium alkoxide, germanium alkoxide, iron alkoxide, zirconium alkoxide, tin alkoxide, and titanium alkoxide.

The surface of the fully crystalline mesostructure can also be reacted with a charged chemical species by ion exchange. The charged chemical species can include metal cations, ammonium ions, phosphinium ions, quaternary amines, quaternary phosphines, amino acids, metal complexes, cations of the elements, choline derived compounds, or combinations of these. The charged chemical species can include cationic species with optic, magnetic, electronic, or bioactive properties, or various combinations thereof. The modifying step can also include attaching a first ligand to the surface of the fully crystalline mesostructure, exposing the resulting product to a metal complex comprising a second ligand, and attaching the metal complex to the fully crystalline mesostructure by at least one of affiliating the metal complex with the first ligand attached to the fully crystalline mesostructure, or by substituting the second ligand for the first ligand on the fully crystalline mesostructure. The first ligand can include phosphine and/or amine. The modifying step can also include neutralizing acid sites of the fully crystalline mesostructure with a base, and the base can include hydroxide, ammonia, amine, phosphine, or any combination of these.

The modifying step can also include coating the surface of the fully crystalline mesostructure with a metal oxide coating, such that the metal oxide coating comprises silicon oxide, aluminum oxide, gallium oxide, germanium oxide, iron oxide, zirconium oxide, tin oxide, and/or titanium oxide. It can also include impregnating the surface of the fully crystalline mesostructure with a solid phase of a substance, wherein the solid phase includes nickel oxide nanoparticles, nickel sulfide nanoparticles, molybdenum oxide nanoparticles, and/or molybdenum sulfide nanoparticles. The modifying step can also include depositing a coating on the surface of the fully crystalline mesostructure by chemical vapor deposition, and the coating can include metal alkoxide(s), nanoparticles, carbon, and/or metal oxide(s).

Another aspect of the invention features a method of making an inorganic material comprising providing a crystalline inorganic material, and exposing the crystalline inorganic material to a pH controlled medium to partially dissolve the crystalline inorganic material, thereby producing an amorphous inorganic material. A pH of the amorphous inorganic material is adjusted, and the material is exposed to a surfactant. Treatment of the inorganic material can be performed by controlling time and temperature conditions during these steps, to form crystalline nanostructures. A surface of the crystalline nanostructures can be modified.

The nanostructures can also be exposed to air for a second set of time and temperature conditions, and exposed to a hydrogen gas for a third set of time and temperature conditions. The second and third set of time and temperature conditions can be controlled to form a solid phase on a surface of the nanostructure. The crystalline inorganic material of the providing step can be semi crystalline, polycrystalline, or a combination of these. The content of the hydrogen gas can range from about 1% to about 100% hydrogen, depending upon the results to be achieved.

The modifying step can include reacting the surface of the crystalline nanostructure with a metal alkoxide, such as silicon alkoxide, aluminum alkoxide, gallium alkoxide, germanium alkoxide, iron alkoxide, zirconium alkoxide, tin alkoxide, and/or titanium alkoxide. The modifying step can also include reacting the surface of the crystalline nanostructure with a charged chemical species by ion exchange. The charged chemical species can include, e.g., metal cations, ammonium ions, phosphinium ions, quaternary amines, quaternary phosphines, amino acids, metal complexes, cations of the elements, and/or choline derived compounds. They can also include cationic species with optic, magnetic, electronic, and/or bioactive properties.

The modifying step can also include attaching a first ligand to the surface of the crystalline nanostructure, exposing the resulting product to a metal complex comprising a second ligand, and attaching the metal complex to the crystalline nanostructure by at least one of affiliating the metal complex with the first ligand attached to the crystalline nanostructure, or by substituting the second ligand for the first ligand on the crystalline nanostructure. The first ligand can include phosphine and/or amine. The modifying step can also include neutralizing acid sites of the crystalline nanostructure with a base. Suitable bases include hydroxide, ammonia, amine, or phosphine, or combinations of these. The modifying step can also include coating the surface of the crystalline nanostructure with a metal oxide coating, such as silicon oxide, aluminum oxide, gallium oxide, germanium oxide, iron oxide, zirconium oxide, tin oxide, and/or titanium oxide. Further, the modifying step can include impregnating the surface of the crystalline nanostructure with a solid phase. The solid phase can include, e.g., nickel oxide nanoparticles, nickel sulfide nanoparticles, molybdenum oxide nanoparticles, and/or molybdenum sulfide nanoparticles. The modifying step can also include depositing a coating on the surface of the fully crystalline mesostructure by chemical vapor deposition. The coating can include metal alkoxide(s), nanoparticles, carbon, and/or metal oxide(s).

Another aspect of the invention a method of making an inorganic material that includes providing a fully crystalline mesostructure comprising mesopore surfaces defining a plurality of mesopores, wherein a cross-sectional area of each of the plurality of mesopores is substantially the same. The fully crystalline mesostructure has a chemical composition framework. The fully crystalline mesostructure is exposed to a metal altering medium under a set of time and temperature conditions to form an altered chemical composition framework. The metal altering medium can include a solid, liquid, and/or gas. Examples include steam, SiCl4, HF, HCl, NaOH, HNO3, F2, EDTA, citric acid, and/or oxalic acid. The exposure can occur under reflux conditions at controlled temperature conditions. Suitable temperature conditions include ambient (about room temperature) conditions, or temperature conditions are from about 60 to about 200° C. The altered chemical composition framework can include a chemical composition, e.g., having fewer metals, substituted metals, or enriched metals (e.g., increased metal content of a specific metal component). The altered chemical composition framework can also include a dealuminated chemical composition framework.

Another aspect of the invention features a method of making an inorganic material comprising providing a crystalline nanostructure that includes a plurality of members, each member defining a plurality of pores, and adjacent members defining voids therebetween. At least one dimension of each of the plurality of members is less than 100 nm. The crystalline nanostructure includes a chemical composition framework. The crystalline nanostructure is exposed to a metal altering medium under a set of time and temperature conditions, thereby altering the chemical composition framework. The metal altering medium can include a solid, liquid, and/or a gas. Examples include steam, SiCl4. HF, HCl, NaOH, HNO3, F2, EDTA, citric acid, and/or oxalic acid. The exposure can occur under reflux conditions at controlled temperature conditions, and the controlled temperature conditions can include about room temperature conditions, or temperatures from about 60 to about 200° C. The altered chemical composition framework can include a chemical composition having fewer metals, substituted metals, or an enriched metal composition. It can also include a dealuminated chemical composition framework.

Another aspect of the invention features an inorganic material including a fully crystalline mesostructure comprising mesopore surfaces defining a plurality of mesopores, such that a cross-sectional area of each of the plurality of mesopores is substantially the same, and a binder formed into a shape. The shape can include a monolith, a pellet, a bead, a powder, and/or a spray. The binder can include aluminum oxide, silicon oxide, amorphous aluminosilicate, clay, titania, zirconia, and/or cellulose. An additive material can be included to enhance at least one of sulfur tolerance (e.g., sour feedstocks), metal tolerance (e.g., impurities or contaminants present in a feedstock), catalytic activity, catalyst life, and/or hydrothermal stability. The additive material can include alumina, silica, calcium oxide, magnesium oxide, antimony passivators, nanosized zeolites, and/or ZSM-5 zeolite.

Yet another aspect of the invention features an inorganic material comprising a crystalline nanostructure comprising a plurality of members, each member defining a plurality of pores, and adjacent members defining voids therebetween. At least one dimension of each of the plurality of members is less than 100 nm. Also included is a binder formed into a shape. The shape can include a monolith, a pellet, a bead, a powder, and/or a spray. The binder can include aluminum oxide, silicon oxide, amorphous aluminosilicate, clay, titania, zirconia, and/or cellulose. An additive material can be included to enhance sulfur tolerance, metal tolerance, catalytic activity, catalyst lifetime, and/or hydrothermal stability of the inorganic material.

Another aspect of the invention features a method of making an inorganic material comprising providing a binder and mixing with the binder a fully crystalline mesostructure comprising mesopore surfaces defining a plurality of mesopores, such that a cross-sectional area of each of the plurality of mesopores is substantially the same. The mixture is formed into a shape. Treatment can be achieved by controlling time and temperature conditions to form a dried shape. The forming step can be performed by or include molding, extruding, layering, spray drying, and/or pelletizing. The binder can include aluminum oxide, silicon oxide, amorphous aluminosilicate, clay, titania, zirconia, and/or cellulose. The mixing step can include introducing an additive material to increasing (e.g., enhance) sulfur tolerance, metal tolerance, catalytic activity, lifetime, and/or hydrothermal stability. The temperature conditions can range from about 20 to about 200° C. and the time conditions can range from about 1 hour to about 1 week. In some embodiments the shape is treated by controlling a second set of time and temperature conditions, to improve mechanical properties of the shape. The second set of temperature conditions can range from about 200 to about 800° C., and the second set of time conditions can range from about 1 hour to about 1 week.

Another aspect of the invention features a method of making an inorganic material that comprises providing a binder, mixing with the binder a crystalline nanostructure comprising a plurality of members, each member defining a plurality of pores, and adjacent members defining voids therebetween, such that at least one dimension of each of the plurality of members is less than 100 nm. The mixture is formed into a shape, and the shape can be treated by controlling the time and temperature conditions to form a dried shape. The forming step can include molding, extruding, spray drying, and/or pelletizing. The binder can include aluminum oxide, silicon oxide, amorphous aluminosilicate, clay, titania, zirconia, and/or cellulose. The mixing step can include introducing and mixing in an additive material to enhance (increase) sulfur tolerance, metal tolerance, catalytic activity, catalyst life, and/or hydrothermal stability. The additive material can include alumina, silica, calcium oxide, magnesium oxide, antimony passivators, nanosized zeolites, and/or ZSM-5 zeolite.

The temperature conditions can range from about 20 to about 200° C., and the time conditions range from about 1 hour to about 1 week. In some embodiments, the shape is treated by controlling a second set of time and temperature conditions to improve mechanical properties of the shape. The second set of temperature conditions can range from about 200 to about 800° C., and the second set of time conditions can range from about 1 hour to about 1 week.

Another aspect of the invention features a petrochemical product produced by the process of reacting a petrochemical feed material in the presence of an inorganic material comprising a fully crystalline mesostructure that includes mesopore surfaces that define a plurality of mesopores, wherein a cross sectional area of each of the plurality of mesopores is substantially the same. The petrochemical feed material can be or include residuals, heavy resids, heavy sour metal laden crudes, heavy sour metal laden stocks, shale oil, hydrocarbons from coal, crude oil, synthetic crude from tar sands, Orinoco crude, various heavy middle east crudes, gas oil fractions, coal-derived liquids, heavy metal-laden crude oils, waxy materials, waxes produced by Fischer-Tropsch synthesis of hydrocarbons from synthesis gas, other feedstocks known to those of skill in the petrochemical art, or any combination of these. The process (e.g., unit operation) can include reacting in the presence of the inorganic material in processes such as catalytic cracking, fluid catalytic cracking, hydrogenation, hydrosulfurization, hydrocracking, hydroisomerization, oligomerization, alkylation, and/or any combination of these. Additional processes (e.g., petrochemical processes) using zeolite catalysts, known to those of skill in the art, can also benefit from use of the inorganic material.

The petrochemical product produced can include gasoline, propylene, butene, coke, total dry gas, liquefied petroleum gases, olefins, benzene, and combinations of these and many other hydrocarbons. The gasoline produced can have a higher octane number than a gasoline prepared by reacting the petrochemical feed material with an unmodified fully crystalline inorganic material. A weight fraction (according to the phraseology defined above) of the inorganic material plus a catalyst can be from about 0.05 to about 100 weight percent inorganic material.

Another aspect of the invention features a petrochemical product produced by the process of reacting a petrochemical feed material in the presence of an inorganic material comprising a crystalline nanostructure that includes a plurality of members, each member defining a plurality of pores, and adjacent members defining voids therebetween. At least one dimension of each of the plurality of members is less than 100 nm. As described above, the petrochemical feed material can include resids, heavy resids, heavy sour metal laden crudes, heavy sour metal laden stocks, shale oil, hydrocarbons from coal, crude oil, synthetic crude from tar sands, Orinoco crude, various heavy middle east crudes, gas oil fractions, coal-derived liquids, heavy metal-laden crude oils, waxy materials, waxes produced by Fischer-Tropsch synthesis of hydrocarbons from synthesis gas, and/or other feedstocks.

As described above, the process can include unit operations such as catalytic cracking, fluid catalytic cracking, hydrogenation, hydrosulfurization, hydrocracking, hydrosisomerization, oligomerization, and/or alkylation, and more. The petrochemical material produced can include gasoline, propylene, butene, coke, total dry gas, liquefied petroleum gases, an olefin, benzene, and/or many other refinery hydrocarbon-based products. Gasoline produced can have a higher octane number than a gasoline prepared by reacting a petrochemical feed material with an unmodified fully crystalline inorganic material. As described above, a weight fraction of the inorganic material plus a catalyst can be from about 0.05 to about 100 weight percent inorganic material.

Another aspect of the invention includes a petrochemical material made by the process of contacting a petrochemical feed material with an inorganic material comprising a fully crystalline mesostructure that includes mesopore surfaces defining a plurality of mesopores, such that a cross sectional area of each of the plurality of mesopores is substantially the same. The petrochemical feed material is reacted in the presence of the inorganic material under conditions of controlled temperature and pressure. As described above, the petrochemical petrochemical feed material can include resids, heavy resids, heavy sour metal laden crudes, heavy sour metal laden stocks, shale oil, hydrocarbons from coal, crude oil, synthetic crude from tar sands, Orinoco crude, various heavy middle east crudes, gas oil fractions, coal-derived liquids, heavy metal-laden crude oils, waxy materials, or waxes produced by Fischer-Tropsch synthesis of hydrocarbons from synthesis gas, and/or other petrochemical-related feedstocks. The reacting can be performed within various operations and processes (e.g., unit operations) such as catalytic cracking, fluidized catalytic cracking, hydrogenation, hydrosulfurization, hydrocracking, hydrosisomerization, oligomerization, and/or alkylation, or other processes known to those of skill in the art.

The petrochemical material produced can include gasoline, propylene, butene, coke, total dry gas, liquefied petroleum gases, and/or olefins, or various other hydrocarbon products. A weight fraction of the inorganic material plus a catalyst (e.g., with which it can be combined) can be from about 0.05 to about 100 weight percent inorganic material.

Another aspect of the invention features a petrochemical material made by the process of contacting a petrochemical feed material with an inorganic material comprising a fully crystalline mesostructure that includes mesopore surfaces defining a plurality of mesopores, such that a cross sectional area of each of the plurality of mesopores is substantially the same, and reacting the petrochemical feed material in the presence of the inorganic material under conditions of controlled temperature and pressure. As described above, the petrochemical feed material can include resids, heavy resids, heavy sour metal laden crudes, heavy sour metal laden stocks, shale oil, hydrocarbons from coal, crude oil, synthetic crude from tar sands, Orinoco crude, various heavy middle east crudes, gas oil fractions, coal-derived liquids, heavy metal-laden crude oils, waxy materials, or waxes produced by Fischer-Tropsch synthesis of hydrocarbons from synthesis gas, and/or various other feedstocks. The reacting can occur in various processes, such as catalytic cracking, fluidized catalytic cracking, hydrogenation, hydrosulfurization, hydrocracking, hydrosisomerization, oligomerization, and/or alkylation. The petrochemical material produced can include gasoline, propylene, butene, coke, total dry gas, liquefied petroleum gases, and/or olefins, or various other hydrocarbon products. A weight fraction of the inorganic material plus a catalyst (e.g., an additive) can be from about 0.05 to about 100 weight percent inorganic material.

Another aspect of the invention includes an alkylate produced by the process of reacting olefins and paraffins in the presence of an inorganic material comprising a fully crystalline mesostructure comprising mesopore surfaces defining a plurality of mesopores, wherein a cross sectional area of each of the plurality of mesopores is substantially the same.

Yet another aspect of the invention includes an alkylate produced by the process of reacting olefins and paraffins in the presence of an inorganic material comprising a crystalline nanostructure that includes a plurality of members, each member defining a plurality of pores, and adjacent members defining voids therebetween. At least one dimension of each of the plurality of members is less than 100 nm.

Another aspect of the invention features a method of water treatment comprising contacting polluted (e.g., contaminated) water with an inorganic material that includes a fully crystalline mesostructure comprising mesopore surfaces that define a plurality of mesopores, such that a cross sectional area of each of the plurality of mesopores is substantially the same, and using the inorganic material to remove from the water at least one of an organic compound or an inorganic compound. The inorganic material can be disposed (positioned or located) in a fixed bed, a filter, a dryer, and/or a membrane. A weight fraction of the inorganic material plus a separation material can be from about 0.05 to about 100 weight percent inorganic material.

Another aspect of the invention features a method of water treatment comprising contacting polluted (e.g., contaminated) water with an inorganic material comprising a crystalline nanostructure that includes a plurality of members, each member defining a plurality of pores, and adjacent members defining voids therebetween. At least one dimension of each of the plurality of members is less than 100 nm. The inorganic material is used to remove from the water at least one of an organic compound or an inorganic compound. The inorganic material can be disposed (i.e., located or supported) in a fixed bed, a filter, a dryer, and/or a membrane. A weight fraction of the inorganic material plus a separation material can be from about 0.05 to about 100 weight percent inorganic material.

Another aspect of the invention includes a method of gaseous compound removal comprising contacting the gaseous compound with an inorganic material that includes a fully crystalline mesostructure comprising mesopore surfaces that define a plurality of mesopores, wherein a cross sectional area of each of the plurality of mesopores is substantially the same, and removing at least a portion of the gaseous compound (e.g., an impurity) using the inorganic material. The gaseous compound can include, e.g., a volatile organic compound (VOC). The removing step can include a separation step, and/or it can include using adsorption, a membrane, a catalyst, a catalytic membrane, or any combination of these. A weight fraction of the inorganic material plus a separation material can be from about 0.05 to about 100 weight percent inorganic material.

Another aspect of the invention includes a method of gaseous compound removal comprising contacting a gaseous compound with an inorganic material that includes a crystalline nanostructure comprising a plurality of members each member defining a plurality of pores, and adjacent members defining voids therebetween. At least one dimension of each of the plurality of members is less than 100 nm. At least a portion of the gaseous compound is removed using the inorganic material. The gaseous compound can include a volatile organic compound (VOC). The removing step can include a separation step, and/or it can also include using adsorption, a membrane, a catalyst, a catalytic membrane, or any combination of these. A weight fraction of the inorganic material plus a separation material can be from about 0.05 to about 100 weight percent inorganic material.

Another aspect of the invention includes a fine chemical produced by the process of conducting one or more chemical reactions in the presence of an inorganic material comprising a fully crystalline mesostructure that includes mesopore surfaces defining a plurality of mesopores, wherein a cross sectional area of each of the plurality of mesopores is substantially the same. The chemical reaction can include isomerization of olefins, isomerization of functionalized saturated systems, ring enlargement reactions, Beckman rearrangements, isomerization of arenes, alkylation of aromatic compounds, acylation of arenes, acylation of ethers, acylation of aromatics, nitration of aromatics, halogenation of aromatics, hydroxyalylation of arenes, carbocyclic ring formation, ring closure towards heterocyclic compounds, amination reactions, nucleophilic addition to epoxides, addition of oxygen compounds to olefins, estirification, acetalization, addition of heteroatom compounds to olefins, oxidation/reduction reactions, dehydration reactions, condensation reactions, C—C formation reactions, hydroformylation, acetilisation, and/or amidation. The chemical reaction can also include Diels-Alder cycloaditions, Meerwein-ponndorf-Verley reduction, and/or Oppenauer oxidation. A weight fraction of the inorganic material plus a catalyst can be from about 0.05 to about 100 weight percent inorganic material. A weight fraction of the inorganic material plus a separation material can be from about 0.05 to about 100 weight percent inorganic material.

Another aspect of the invention features a fine chemical produced by the process of conducting one or more chemical reactions in the presence of an inorganic material comprising a crystalline nanostructure that includes a plurality of members, each member defining a plurality of pores, and adjacent members defining voids therebetween. At least one dimension of each of the plurality of members is less than 100 nm. The chemical reaction can include isomerization of olefins, isomerization of functionalized saturated systems, ring enlargement reactions, Beckman rearrangements, isomerization of arenes, alkylation of aromatic compounds, acylation of arenes, acylation of ethers, acylation of aromatics, nitration of aromatics, halogenation of aromatics, hydroxyalylation of arenes, carbocyclic ring formation, ring closure towards heterocyclic compounds, amination reactions, nucleophilic addition to epoxides, addition of oxygen compounds to olefins, estirification, acetalization, addition of heteroatom compounds to olefins, oxidation/reduction reactions, dehydration reactions, condensation reactions, C—C formation reactions, hydroformylation, acetilisation, and/or amidation. The reaction can also include Diels-Alder cycloaditions, Meerwein-ponndorf-Verley reduction, and/or Oppenauer oxidation. A weight fraction of the inorganic material plus a catalyst can be from about 0.05 to about 100 weight percent inorganic material. A weight fraction of the inorganic material plus a separation material can be from about 0.05 to about 100 weight percent inorganic material.

Another aspect of the invention includes a pharmaceutical produced by the process of conducting one or more pharmaceutical reactions in the in the presence of an inorganic material comprising a fully crystalline mesostructure that includes mesopore surfaces defining a plurality of mesopores, wherein a cross sectional area of each of the plurality of mesopores is substantially the same. A weight fraction of the inorganic material plus a catalyst can be from about 0.05 to about 100 weight percent inorganic material. A weight fraction of the inorganic material plus a separation material can be from about 0.05 to about 100 weight percent inorganic material.

Another aspect of the invention includes a pharmaceutical produced by the process of conducting one or more pharmaceutical reactions in the in the presence of an inorganic material comprising a crystalline nanostructure comprising a plurality of members, each member defining a plurality of pores, and adjacent members defining voids therebetween. At least one dimension of each of the plurality of members is less than 100 nm. A weight fraction of the inorganic material plus a catalyst can be from about 0.05 to about 100 weight percent inorganic material. A weight fraction of the inorganic material plus a separation material can be from about 0.05 to about 100 weight percent inorganic material.

Another aspect of the invention features a release system produced by the process of disposing a release system material on an inorganic material comprising a fully crystalline mesostructure comprising mesopore surfaces defining a plurality of mesopores, wherein a cross sectional area of each of the plurality of mesopores is substantially the same. The release system material can include a drug, a pharmaceutical, chemical(s), an optic material, a conducting material, a semiconducting material, a magnetic material, and/or a nanoparticle. The release system material can be disposed (e.g., located) on the inorganic material by or as a physical mixture, a chemical reactions, heat treatment, irradiation, or ultrasonication, or using any combination of these technologies.

These embodiments of the present invention, other embodiments, and their features and characteristics, will be apparent from the description, drawings and claims that follow.

BRIEF DESCRIPTION OF THE DRAWINGS

FIG. 20B depicts microactivity test (MAT) results of a conventional fully crystalline zeolite H-Y (Si/Al=15) and its fully crystalline mesostructured version H-Y[MCM-41].

FIG. 20C depicts the composition of the LPG fraction obtained by Microactivity test (MAT) of a conventional fully crystalline zeolite H-Y (Si/Al=15) and its fully crystalline mesostructured version H-Y[MCM-41].

DETAILED DESCRIPTION OF THE INVENTION

Definitions

Figure 1A:
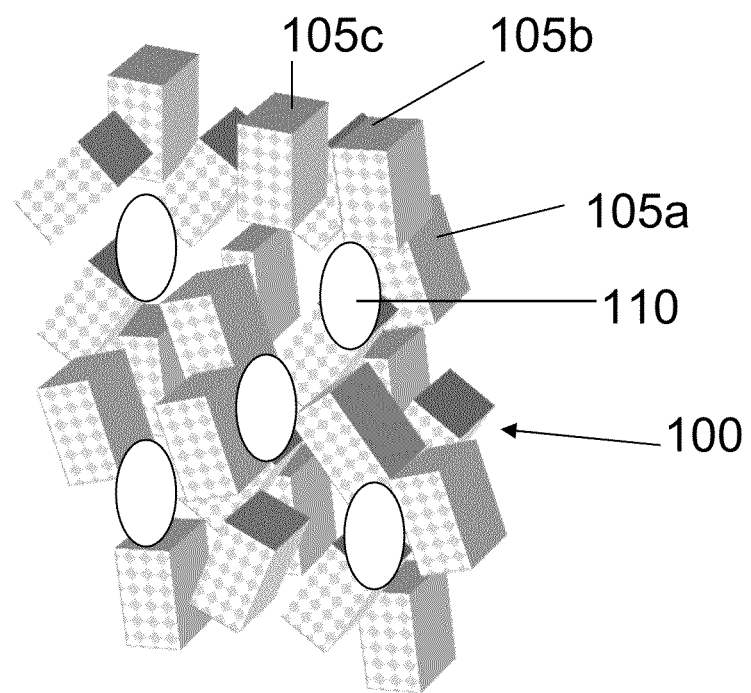
FIG. 1A is a schematic diagram of a prior art polycrystalline mesoporous material.

For convenience, before further description of the present invention, certain terms employed in the specification, examples, and appended claims are collected here. These definitions should be read in light of the remainder of the disclosure and understood as by a person of skill in the art.

The articles "a" and "an" are used herein to refer to one or more than one (i.e., at least one) of the grammatical object of the article. By way of example, "an element" means one element or more than one element.

The term "catalyst" is art-recognized and refers to any substance that notably affects the rate of a chemical reaction without itself being consumed or significantly altered.

The terms "comprise" and "comprising" are used in the inclusive, open sense, meaning that additional elements may be included.

The term "cracking" is art-recognized and refers to any process of breaking up organic compounds into smaller molecules.

The term "including" is used to mean "including but not limited to". "Including" and "including but not limited to" are used interchangeably.

"MCM-41" represents a Mobil composite of matter and refers to an amorphous mesoporous silica with a hexagonal pore arrangement, wherein the mean pore diameter is in the range of about 2-10 nm.

"MCM-48" represents a Mobil composite of matter and refers to an amorphous mesoporous silica with a cubic pore arrangement, wherein the mean pore diameter is in the range of about 2-10 nm.

"MCM-50" represents a Mobil composite of matter and refers to an amorphous mesoporous silica with a lamellar pore arrangement, wherein the mean pore diameter is in the range of about 2-10 nm.

The term "mesoporous" is art-recognized and refers to a porous material comprising pores with an intermediate size, ranging anywhere from about 2 to about 50 nanometers.

The term "mesostructure" is art-recognized and refers to a structure comprising mesopores which control the architecture of the material at the mesoscopic or nanometer scale, including ordered and non-ordered mesostructured materials, as well as nanostructured materials, i.e. materials in which at least one of their dimension is in the nanometer size range, such as nanotubes, nanorings, nanorods, nanowires, nanoslabs, and the like.

The term "mesostructured zeolites" as used herein includes all crystalline mesoporous materials, such as zeolites, aluminophosphates, gallophosphates, zincophosphates, titanophosphates, etc. Its mesostructure maybe in the form of ordered mesporosity (as in, for example MCM-41, MCM-48 or SBA-15), non-ordered mesoporosity (as in mesocellular foams (MCF)), or mesoscale morphology (as in nanorods and nanotubes). The notation zeolite[mesostructure] is used to designate the different types of mesostructured zeolites.

"MOR" represents a mordenite which is a zeolite comprising approximately 2 moles of sodium and potassium and approximately 1 mole of calcium in its orthorhombic crystal structure. This term also includes the acidic form of MOR which may also be represented as "H-MOR."

"MSU-S (MFI)" represents a mesoporous material made with nanosized zeolites with a pore range of about 2-15 nm. The (MFI) refers to its structure.

"MSU-S (BEA)" represents a mesoporous material made with nanosized zeolites with a pore range of about 1-15 nm. The (BEA) refers to its structure.

"PNA" represents a semicrystallized form of MCM-41.

"SBA-15" represents mesoporous (alumino) silicas with pore diameters up to 30 nm arranged in a hexagonal manner and pore walls up to 6 nm thick.

The term "surfactant" is art-recognized and refers to any surface-active agent or substance that modifies the nature of surfaces, often reducing the surface tension of water. Cetyltrimethylammonium bromide is a non-limiting example of a surfactant.

"Y" represents a faujasite which is a zeolite comprising 2 moles of sodium and 1 mole of calcium in its octahedral crystal structure. This term also includes the acidic form of Y which may also be represented as "H-Y."

The term "zeolite" is defined as in the International Zeolite Association Constitution (Section 1.3) to include both natural and synthetic zeolites as well as molecular sieves and other microporous and mesoporous materials having related properties and/or structures. The term "zeolite" also refers to a group, or any member of a group, of structured aluminosilicate minerals comprising cations such as sodium and calcium or, less commonly, barium, beryllium, lithium, potassium, magnesium and strontium; characterized by the ratio (Al+Si):O=approximately 1:2, an open tetrahedral framework structure capable of ion exchange, and loosely held water molecules that allow reversible dehydration. The term "zeolite" also includes "zeolite-related materials" or "zeotypes" which are prepared by replacing $Si^{4+}$ or $Al^{3+}$ with other elements as in the case of aluminophosphates (e.g., MeAPO, SAPO, ElAPO, MeAPSO, and ElAPSO), gallophosphates, zincophophates, titanosilicates, etc.

"ZSM-5" or "ZSM-5 (MFI)" represents a Mobil synthetic zeolite-5. This term also includes the acidic form of ZSM-5 which may also be represented as "H-ZSM-5." The (MFI) relates to its structure.

A comprehensive list of the abbreviations utilized by organic chemists of ordinary skill in the art appears in the first issue of each volume of the *Journal of Organic Chemistry*; this list is typically presented in a table entitled Standard List of Abbreviations.

For purposes of this invention, the chemical elements are identified in accordance with the Periodic Table of the Elements, CAS version, Handbook of Chemistry and Physics, 67th Ed., 1986-87, inside cover.

Contemplated equivalents of the zeolitic structures, subunits and other compositions described above include such materials which otherwise correspond thereto, and which have the same general properties thereof (e.g., biocompatible), wherein one or more simple variations of substituents are made which do not adversely affect the efficacy of such molecule to achieve its intended purpose. In general, the compounds of the present invention may be prepared by the methods illustrated in the general reaction schemes as, for example, described below, or by modifications thereof, using readily available starting materials, reagents and conventional synthesis procedures. In these reactions, it is also possible to make use of variants which are in themselves known, but are not mentioned here.

Synthesis of Fully Crystalline Mesostructured Zeolites

In recent years, expertise has been gained in the synthesis of zeolites with desired properties by the choice of the organic molecule used as structure directing agent (SDA), control of the synthesis conditions, and post-synthesis treatments. van Bekkum, H., Flanigen, E. M., Jacobs, P. A., Jansen, J. C. (editors) Introduction to Zeolite Science and Practice, 2nd edition. Studies in Surface Science and Catalysis, 2001, 137; Corma, A., *Chem. Rev.*, 1997, 97, 2373-2419; Davis, M. E., *Nature*, 2002, 417, 813-821; Davis, M. E., et al., *Chem.*

*Mater.,* 1992, 4, 756-768; de Moor P-P. E. A. et al., *Chem. Eur. J.,* 1999, 5(7), 2083-2088; Galo, J. de A. A., et al., *Chem. Rev.,* 2002, 102, 4093-4138. At the same time, the family of ordered mesoporous materials has been greatly expanded by the use of different surfactants and synthesis conditions. Corma, A., *Chem. Rev.,* 1997, 97, 2373-2419; Davis, M. E., *Nature,* 2002, 417, 813-821; Galo, J. de A. A., et al., *Chem. Rev.,* 2002, 102, 4093-4138; Ying, J. Y., et al., *Angew. Chem. Int. Ed.,* 1999, 38, 56-77. The family of fully crystalline mesostructured zeolites disclosed herein is a one-phase hybrid material consisting of a zeolitic structure with controlled mesoporosity, which bridges the gap between crystalline microporous and amorphous mesoporous materials. In accordance with the instant invention, a surfactant is employed to penetrate a fully crystalline zeolite structure forming pores, more specifically, forming a plurality of mesopores throughout at least a portion of the volume of the fully crystalline zeolite structure. An mesopore surface surrounds each mesopore within the mesostructure. Full crystallinity includes all solids with one or more phases including having repeating structures, referred to as unit cells, that repeat in a space for at least 10 nm. A fully crystalline zeolite structure may have, for example, single crystallinity, mono crystallinity, or multi crystallinity. Multi crystallinity includes all solids having more than one phase having repeating structures, referred to as unit cells, that repeat in a space for at least 10 nm. A fully crystalline zeolite is exposed to the surfactant, for a time, under temperature, and pH conditions suitable to achieve a desired mesopore structure throughout all or a portion of the volume of the fully crystalline zeolite. It is expected that any fully crystalline inorganic material would have a similar structure, would similarly be produced, and/or would similarly be employed where, for example, a zeolite, a fully crystalline zeolite, or zeolites are described.

Figure 1B:
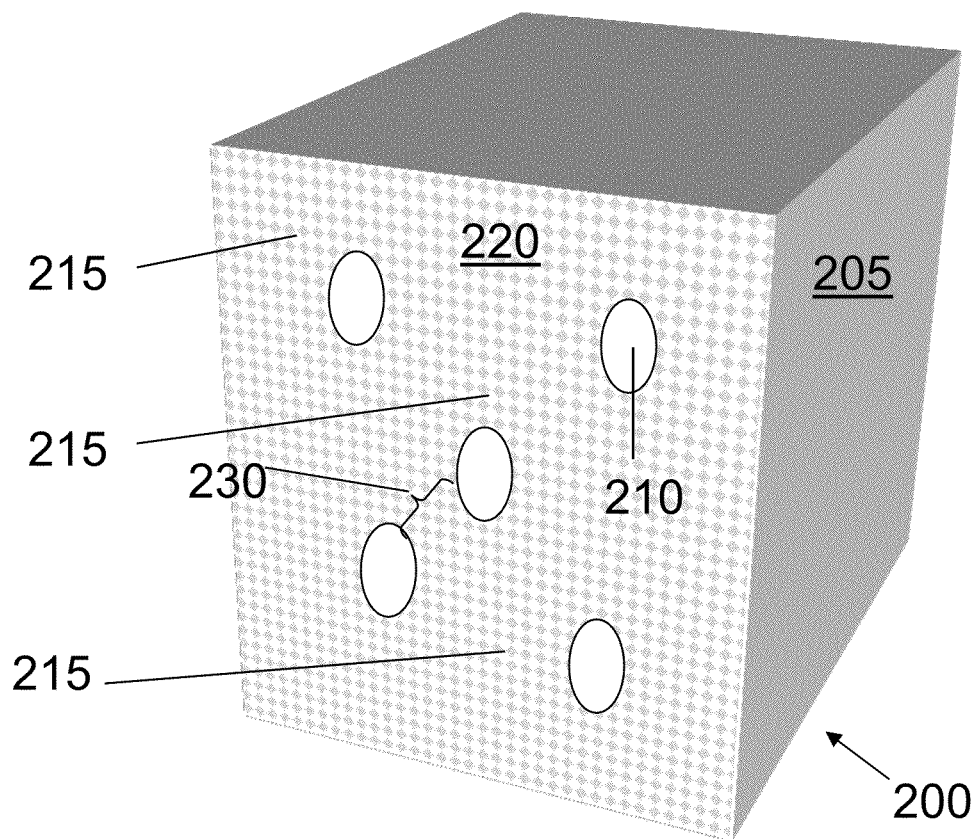
FIG. 1B is a schematic illustration of a fully crystalline mesostructured zeolite of the present invention.

In contrast with FIG. 1A, FIG. 1B is a schematic illustration of a fully crystalline mesostructured zeolite 200 of the instant invention, which features a fully crystalline zeolite structure 205 with mesopores 210 penetrating throughout the volume of the zeolite structure 205. The mesostructure 215 that surrounds the mesopores 210 is fully crystalline. The pore wall or interior wall between adjacent mesopores has a wall thickness 230. As illustrated in FIG. 1B, the mesostructure 215 and the mesopores 210 are viewed from a side 220 of the zeolite structure 205. Although not depicted in this schematic illustration, the mesostructure and the mesopores can be viewed from other sides of the mesostructured zeolite 200.

Referring now to FIGS. 1A and 1B, unlike the fully crystalline mesostructure 215 of the fully crystalline mesostructured zeolite 200 of the instant invention, in the aggregated crystalline mesoporous zeolite nuclei material 100, the pore walls that surround the mesopore-sized pore volume 110 are discontinuous, featuring multiple zeolite nuclei crystals e.g., 105a, 105b, 105c.

The synthesis of fully crystalline mesostructured zeolites is applicable to a wide variety of materials. The first strategy is based on the short-range reorganization of a zeolite structure in the presence of a surfactant to accommodate mesoporosity without loss of zeolitic full crystallinity. A zeolite is added to a pH controlled solution containing a surfactant. Alternatively, a zeolite is added to a pH controlled solution and thereafter a surfactant is added. The pH controlled solution can be, for example, a basic solution with a pH ranging from about 8 to about 12, or from about 9 to about 11, or alternatively, the basic solution pH can be about 10. The strength of the base and the concentration of the basic solution are selected to provide a pH within the desired range. Any suitable base can be employed that falls within the desired pH range.

Suitable surfactants that can be employed in accordance with the invention include cationic, ionic, neutral surfactants and/or combinations. The quantity of surfactant is varied according to, for example, the surfactant and the zeolite that are mixed. For example, in one embodiment, the weight of surfactant is about equal to the weight of zeolite added to the solution. Alternatively, the weight of surfactant can be about half of the weight of zeolite added to the solution.

The mixture is hydrothermally treated for a period of time that is selected to allow the fully crystalline zeolite to achieve a desired mesostructure, for example, a H-Y[MCM-41] is a fully crystalline acidic form of faujasite having a fully crystalline mesostructure surrounding a hexagonal pore arrangement. Similarly, a H-Y[MCM-48] is a fully crystalline acidic form of faujasite having a fully crystalline mesostructure surrounding a cubic pore arrangement, and a H-Y[MCM-50] is a fully crystalline acidic form of faujasite having a having a fully crystalline mesostructure surrounding a lamellar pore arrangement, etc. Generally, the time and temperature are related such that a higher temperature requires a shorter period of time to achieve a desired mesoporosity and a certain mesostructure as compared to a lower temperature, which would require a relatively longer period of time to achieve the same mesoporosity. Because time and temperature are related, any suitable combination of time and temperature may be employed when hydrothermally treating the mixture. For example, the temperature ranges from about room temperature to about 60° C., alternatively, the temperature ranges from 100 to about 200° C. Where the temperature is about 60° C. or greater, the controlled temperature conditions take place under hydrothermal conditions, for example, in a sealed reactor. The time ranges from about one hour to about two weeks.

In two synthesis experiments, the parameters of time, temperature, zeolite type and quantity, and surfactant type and quantity are kept constant, however, the pH in the first synthesis is 9 and the pH in the second synthesis is 11. As a result of the different pH values in the two synthesis experiments, the two fully crystalline zeolite mesostructures differ from one another. Specifically, the fully crystalline zeolite mesostructure synthesized with the 9 pH solution features fewer mesopore surfaces, because fewer mesopores were incorporated into the conventional fully crystalline zeolite, compared to the fully crystalline zeolite mesostructure synthesized with the 11 pH, which has more mesopore surfaces, because the higher base concentration resulted in increased mesoporosity.

In an exemplary synthesis, a zeolite is added to a diluted $NH_4OH$ solution containing cetyltrimethylammonium bromide (CTAB) surfactants. The mixture is hydrothermally treated at about 100 to about 200° C., about 120 to about 180° C., about 140 to about 160° C., or about 150° C. for about 20 hr or overnight during which the zeolite structure undergoes short-range rearrangements to accommodate the MCM-41 type of mesostructure. Higher surfactant concentrations and longer hydrothermal treatments would produce mesostructured zeolites with the MCM-48 type of mesostructure. After washing and drying, the surfactant is removed by, for example, calcination or surfactant extraction. In one embodiment, the resulting material is calcined in $N_2$ at a maximum temperature from about 500 to 600° C., or at about 550° C.; and then in air for surfactant removal. The surfactant removal technique is selected based, for example, on the time needed to remove all of the surfactant from the mesostructured zeolites. This synthetic scheme could be used to produce mesostructured zeolites with various zeolitic structures.

Without being bound to any one theory, it is believed that the controlled pH solution softens the conventional fully crystalline zeolite surface enabling the surfactant to penetrate the zeolite creating the mesostructured zeolite. More specifically, the pH conditions that are employed enable the surfactant to penetrate the structure of the zeolite however the pH conditions do not dissolve the zeolite. As the surfactant penetrates the zeolite, forming mesopores, the penetrated portion is exposed to the controlled pH solution and is softened, enabling further penetration by the surfactant. The penetration continues in this fashion throughout the volume of the zeolite. The penetration through the zeolite volume may be in any single direction or in a combination of directions, for example, the penetration may be through the x direction, the y direction, the z direction, or any combination thereof. The penetration direction or rate is not necessarily linear. Penetration may be ordered or optionally the penetration and consequently the mesopores may be disordered or random. Optionally, one or more of the mesopores intersect, interconnect, converge, and/or align, which impacts the arrangement of the resulting mesoporous fully crystalline mesostructure. The surfactant enables penetration into the fully crystalline zeolite, creating mesopores. The type of surfactant determines, at least in part, the size of the mesopore including, for example, the size of the mesopore diameter and/or the size of the mesopore cross section. Penetration into the conventional fully crystalline zeolite is not observed where a controlled pH solution, for example, a base having a pH of 10, held at controlled time and temperature conditions is mixed with a zeolite without a surfactant.

Certain conventional fully crystalline zeolites are very stable (e.g., ZSM-5, MOR, CHA etc.) and it is difficult to incorporate mesoporosity into these zeolites. In such cases, strong base having, for example, a pH ranging from about 11 to about 14, or from about 12 to about 13, or an acid, for example, HF having, for example, a pH ranging from about 2 to about 6, or from about 3 to about 5, or at about 4, is necessary to dissolve silica and soften the conventional fully crystalline zeolite surface to enable the surfactant to penetrate and create mesopores through the fully crystalline zeolite.

Conventional fully crystalline zeolites with a dense structure (e.g. ZSM-5) are more resistant to acids and basis relative to fully crystalline zeolites with less dense structures. Zeolites with a low solubility (e.g. ZSM-5) and/or a dense structure are relatively stable with respect to penetration by acids and bases, accordingly, a diluted tetramethyl ammonium hydroxide (TMA-OH) having a pH ranging from about 10 to about 14 or a solution of acid, for example hydrofluoric acid, HF, having a pH ranging from about 2 to about 6 can be used instead of a dilute $NH_4OH$ solution, having a pH ranging from about 9 to about 10, in the synthesis scheme. More specifically, base treatment alone, even at very high pH, is not sufficient to soften some of the very stable zeolites. The acid HF dissolves silica and softens the structure of the densely structured conventional fully crystalline zeolite (e.g., ZSM-5). After softening the conventional fully crystalline zeolite by exposing it to HF, the pH is increased by including a base solution having a pH from about 9 to about 11 and a suitable surfactant is added in a quantity selected according to, for example, the quantity of zeolite and the desired mesosporosity volume. The mixture is exposed to appropriate time and temperature conditions to provide the desired mesoporosity and resulting mesostructure in a fully crystalline mesostructured zeolite.

In another exemplary synthesis, a fully crystalline zeolite is added to an acid solution having a pH from about −2 to about 2, or from about −1 to about 1, or at about 0, containing a neutral surfactant, for example, PLURONIC(C) (available from BASF (Florham Park, N.J.). The mixture is exposed to appropriate temperature conditions for a period of time selected to achieve a desired mesostructure. The mixture can be held at room temperature and stirred for from about 1 day to about 1 week. Alternatively, the mixture is hydrothermally treated. In one embodiment, the mixture is hydrothermally treated at about 120° C. for from about 4 hours to about 1 week. The resulting mesopores having a pore diameter measuring from about 5 to 60 nm. An mesopore surface surrounds each mesopore of the mesostructure.

The mesopore size and architecture may also be conveniently tuned by well-known techniques, such as the use of surfactants with different aliphatic chain lengths, non-ionic surfactants, triblock copolymers, swelling agents, etc. For example, use of a surfactant with longer chain length increases pore size and conversely, use of surfactant with a shorter chain length decreases pore size. For example, use of a swelling agent will expand the surfactant micelles. Any of these mesopore size and mesostructure architecture altering properties may be used either alone or in combination. Also, post-synthesis treatments (e.g., silanation, grafting, surface functionalization, ion-exchange, immobilization of homogeneous catalysts and deposition of metal nanoclusters) could be employed to further improve the textural properties of the materials and/or modify their surface chemistry.

Figure 1C:
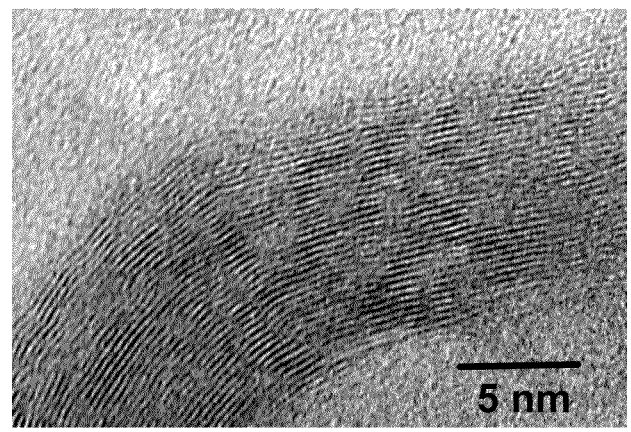
FIG. 1C depicts a TEM image of a nanosostructured zeolite of the present invention where the nanostructure shape includes nanorods.

Another aspect of the invention features mesostructures, e.g., as illustrated in FIG. 1C. Such mesostructures can be achieved based on the dissolution of a zeolite in a pH controlled medium, either in an acidic or basic medium, followed by hydrothermal treatment in the presence of a surfactant. Suitable surfactants that may be employed include cationic, ionic, neutral surfactants, and/or combinations of the cationic, ionic, and neutral surfactants. The quantity of surfactant is varied according to, for example, the selected surfactant and the selected zeolite. For example, the weight of surfactant can be about equal to the weight of zeolite added to the solution, alternatively, the weight of surfactant can be about half of the weight of zeolite added to the solution. Where the pH controlled medium is basic, the pH that dissolves the zeolite ranges from about 10 to about 14. Where the pH controlled medium is acidic, the pH that dissolves the zeolite ranges from about −2 to about 2, when using HF, the pH range is from about 2 to about 6. Under these more extreme pH conditions, a mesoporous solid was obtained wherein the pore walls were initially amorphous. The pore walls can later be transformed to a zeolitic phase, with or without affecting the mesoporous structure. More specifically, after the zeolite is exposed to this aggressive pH treatment, the pH is adjusted to about 10 by adding, for example $NH_4OH$, and surfactant (e.g., CTAB) to produce self-assembling partially dissolved zeolites. This synthesis mixture can be hydrothermally treated or stirred at room temperature over a period of time to obtain a highly stable mesoporous amorphous aluminosilicate. More specifically, if the synthesis mixture is hydrothermally treated at, for example, from about 100 to about 150° C., a highly stable mesoporous amorphous aluminosilicate is obtained. Alternatively, the synthesis mixture is stirred at room temperature for sufficient time (from about 4 hours to about 1 day) to obtain a highly stable mesoporous amorphous aluminosilicate. The mesoporous amorphous aluminosilicate maintains its mesoporosity after boiling for 48 hours under reflux conditions. The acidity of the material produced is higher than that of amorphous mesoporous materials obtained from non-zeolitic silica and alumina sources. Where the synthesis mixture is hydrothermally treated for a longer period of time (from about 12 hours to about 2 weeks) a zeolitic mesostructure is obtained. By adjusting the synthesis conditions (e.g., pH, time, temperature, zeolite type, surfactant concentration) different zeolite nanostructures, for example, nanotubes, nanorings, nanorods, nanowires, nanoslabs, nanofibers, nanodiscs, etc. can be produced. Referring again to FIG. 1C, a nanostructure including, for example, nanorods is made from adjacent members (e.g., a first nanorod adjacent a second nanorod). Voids can be formed between adjacent members (e.g., adjacent nanorods). Each nanostructure member defines a plurality of pores (e.g., each nanorod has pores in its structure). Different members can join together within a single nanostructure, for example, a nanorod may be adjacent a nanoring.

Zeolitic nanorods (ZNRs) have been prepared by this approach in three steps: (i) basic treatment of a zeolite in a pH controlled medium to partially dissolve the zeolite and produce a suspension of amorphous aluminosilicate, (ii) pH adjustment and surfactant addition to produce MCM-41, and (iii) hydrothermal treatment of the resulting solid at a temperature typically ranging from about 100 to about 200° C. for from about 12 hours to about 2 weeks. During the last step, the MCM-41 (the hexagonal pore arrangement) mesostructure is first transformed to MCM-48 (the cubic pore arrangement) and is then transformed to MCM-50 (the lamellar pore arrangement), while the amorphous pore walls are transformed to a crystalline zeolitic phase. MCM-50 is a lamellar structure and is a precursor to zeolitic nanostructures including, for example, nanotubes, nanorings, nanorods, nanowires, nanoslabs, etc. The specific nanostructure formed by using steps (i)-(iii) is determined by the selected zeolite, surfactant, temperature, time, and pH. The zeolite and other conditions can be selected to achieve a single nanostructure shape (e.g., all nanorod) or, alternatively, multiple nanostructure shapes. Without being bound to any single theory, it appears that nanostructures are achieved, at least in part, because the zeolite dissolved by a pH controlled solution into a suspension of amorphous aluminosilicate retains some degree of the zeolitic connectivity that is characteristic of a zeolite starting material. It is expected that some of the IR spectra bands characteristic of zeolites remain present in the dissolved solution, i.e., in the suspension of amorphous aluminosilicate. In contrast, if rather than dissolving a zeolite to produce a suspension of amorphous aluminosilicate an alumina, a silica, or an amorphous aluminosilicate were exposed to steps (ii)-(iii), described above, the nanostructure fails to form. The building blocks of connectivity present in dissolved zeolite solution appear to play a part in forming nanostructures.

Although the nanostructures are crystalline they are not fully crystalline. They have a few units in one direction and are semi crystalline or are polycrystalline. Semi crystalline and polycrystalline refers to, for example, nanosized crystals, crystal nuclei, or crystallites that, for example, aggregate to form a solid. Unit cells are the simplest repeating unit in a crystalline structure or crystalline material. Nanostructures have an open structure. They have a high surface area due to an extended structure in the space as well as due to spaces between multiple structures or voids within the structures themselves. Generally, these nanostructures also have a high external surface area. In one embodiment, one nanostructure is adjacent another nanostructure. FIG. 1C depicts a TEM image of a nanosostructured zeolite of the present invention where the nanostructure shape includes nanorods. The nanorods have a thickness measuring about 5 nm. As depicted, the nanorods sit adjacent one another and the nanorods curve. The background of the curved rods seen in the TEM image is noise and it should be ignored.

Zeolite-like materials, which represent a growing family of inorganic and organic/inorganic molecular sieves, may also be used as precursors for the synthesis of mesostructured zeolites, since the synthetic approaches described above may be adapted for a wide variety of materials.

The mesostructured zeolites and methods of making the mesostructured zeolites of the instant invention utilize available, inexpensive, non-toxic, non-waste producing materials. Previous attempts an improved porosity in zeolites required more steps, exercised limited control on the final structure, and employed more expensive and toxic materials. The method improves on the material cost and production efficiency of prior art processes, requiring fewer steps to achieve improved porosity in zeolites. In addition, the methods of the invention produce fully crystalline mesostructured zeolites. The methods of the invention also produce nanostructured zeolites having a high surface area.

Structure of Mesostructured Zeolites

The hybrid structure of the mesostructured zeolites was studied via XRD. FIGS. 1D-3 show the XRD patterns of H-Y[MCM-41], H-MOR[MCM-41], and H-ZSM-5[MCM-41], respectively. As used herein, the naming convention for mesostructured zeolites, e.g., H-Y[MCM-41] first includes the starting zeolite structure, e.g., H-Y and then, placed adjacent, in brackets, is the name of the mesostructure, e.g., [MCM-41]. The mesostructured zeolite H-Y[MCM-41] retains the full crystallinity of the zeolite H-Y, and features hexagonal pores [MCM-41]. The fully crystalline mesostructure surrounds these hexagonal mesopores that have been formed by the invention. Thus, the resulting structure is a fully crystalline H-Y material that features an [MCM-41] type of mesostructure. For convenience, this is designated as H-Y[MCM-41].

Figure 1D:
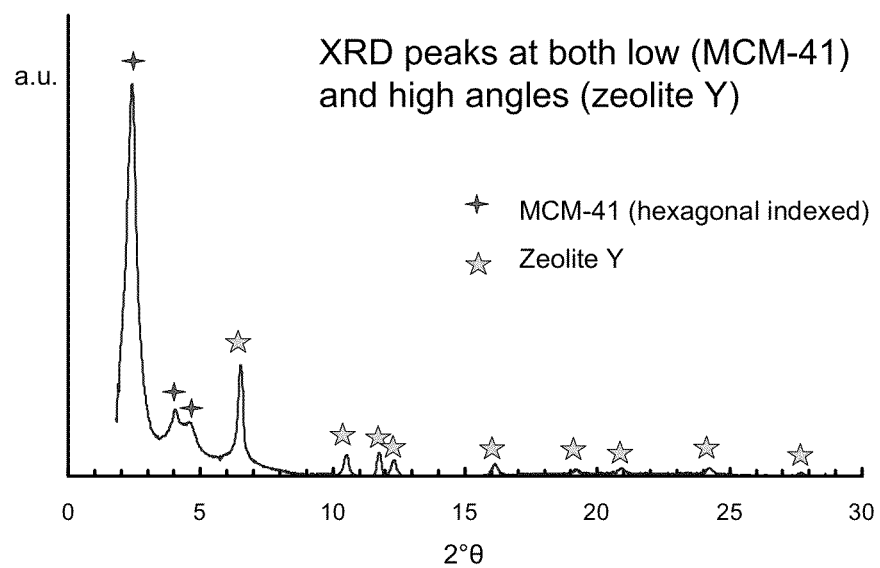
FIG. 1D depicts the X-ray diffraction pattern of the fully crystalline mesostructured zeolite H-Y[MCM-41]. Both the ordered mesostructure MCM-41 (revealed by the XRD peaks at low angles) and the unmodified zeolitic fully crystalline structure H-Y are present.
Figure 2:
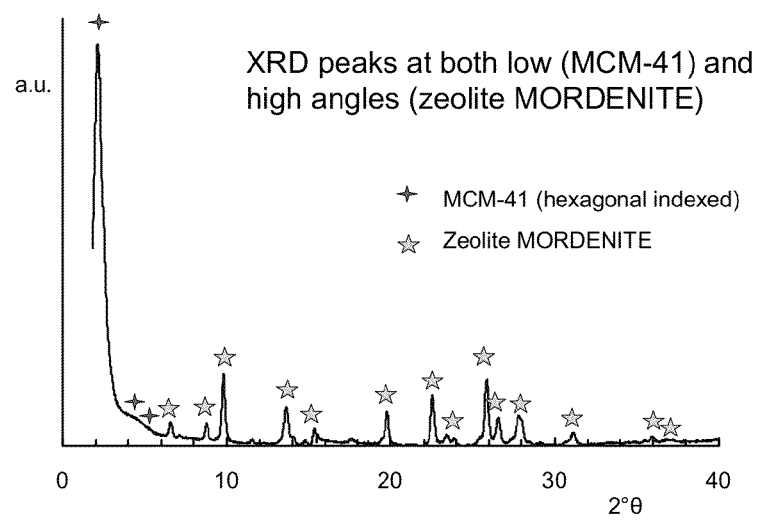
FIG. 2 depicts the X-ray diffraction pattern of the fully crystalline mesostructured zeolite H-MOR[MCM-41]. Both the ordered mesostructure MCM-41 (revealed by the XRD peaks at low angles) and the unmodified zeolitic fully crystalline structure H-MOR are present.
Figure 3:
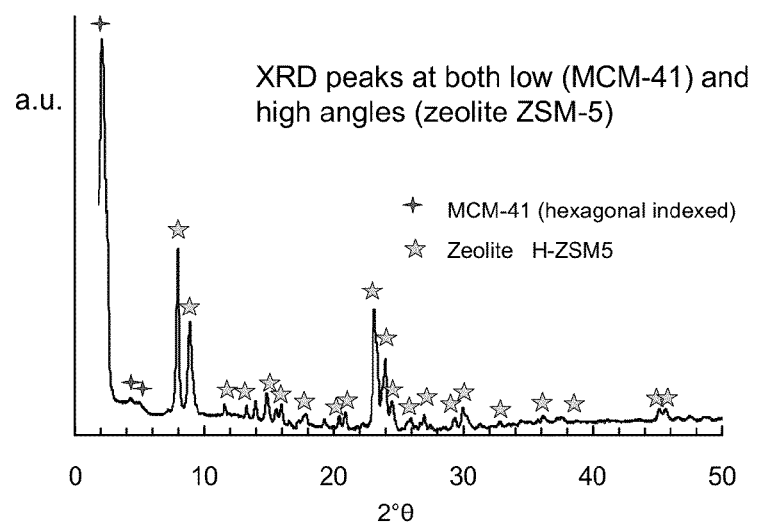
FIG. 3 depicts the X-ray diffraction pattern of the fully crystalline mesostructured zeolite H-ZSM-5 [MCM-41]. Both the ordered mesostructure MCM-41 (revealed by the XRD peaks at low angles) and the unmodified zeolitic crystalline structure H-ZSM-5 are present.

FIG. 1D depicts the X-ray diffraction pattern of the mesostructured zeolite H-Y[MCM-41] and both the ordered mesostructure MCM-41 (revealed by the XRD peaks at low angles) and the zeolitic fully crystalline structure H-Y are present. FIG. 2 depicts the X-ray diffraction pattern of the mesostructured zeolite H-MOR[MCM-41] and both the ordered mesostructure MCM-41 (revealed by the XRD peaks at low angles) and the zeolitic crystalline structure H-MOR are present. FIG. 3 depicts the X-ray diffraction pattern of the mesostructured zeolite H-ZSM-5[MCM-41] and both the ordered mesostructure MCM-41 (revealed by the XRD peaks at low angles) and the zeolitic crystalline structure H-ZSM-5 are present. Referring now to FIGS. 1D-3, very intense peaks, both at low and high 2θ° values reveal both the ordered mesostructure and the zeolitic crystallinity of this family of materials. In all cases, the peaks at low 2θ° values can be indexed to hexagonal symmetry indicating the presence of MCM-41, whereas the well-defined XRD peaks at high 2θ° values correspond, respectively, to the zeolites Y, MOR and ZSM-5. This observation is remarkable since no long-range crystallinity has been previously observed in mesoporous metal oxides and only semicrystallinity (due to the presence of zeolite nanoclusters) has been achieved in thick-wall mesoporous materials prepared using triblock copolymers. Kloetstra, K. R., et al., *Chem. Commun*, 1997, 23, 2281-2282; Liu, Y. et al., *Angew. Chem. Int. Ed.* 2001, 7, 1255-1258; On, D. T., et al., *Angew. Chem. Int. Ed.*, 2001, 17, 3248-3251.

Figure 4:
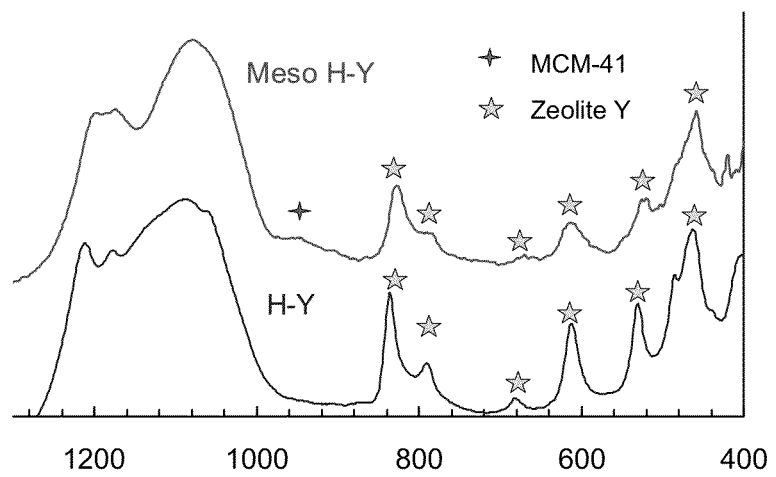
FIG. 4 depicts FTIR characterization peaks for the fully crystalline mesostructured zeolite H-Y[MCM-41], labeled Meso-H-Y, and the unmodified zeolite Y.
Figure 5:
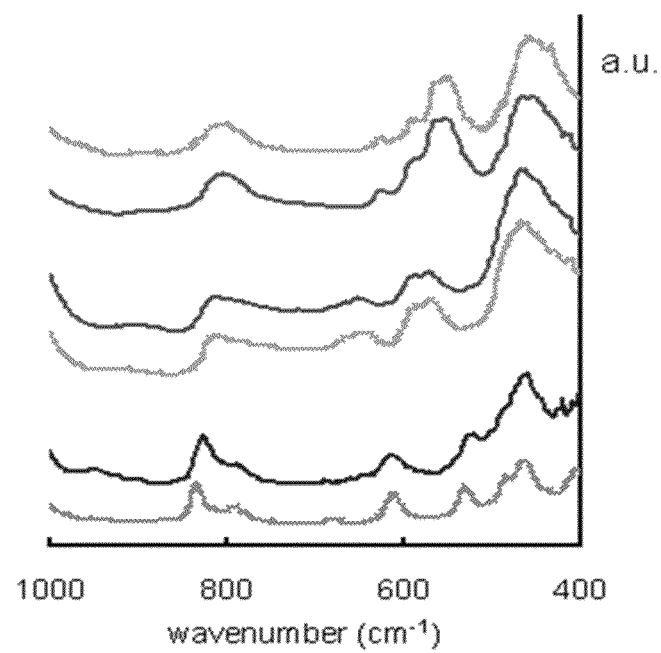
FIG. 5 depicts FTIR spectra of the fully crystalline mesostructured zeolites H-Y[MCM-41] (upper top), H-MOR [MCM-41] (upper middle), H-ZSM-5[MCM-41] (upper bottom) and FTIR spectra of their unmodified fully crystalline zeolitic versions H-Y (lower top), H-MOR (lower middle), H-ZSM-5 (lower bottom). A match between each fully crystalline mesostructured zeolite and its corresponding unmodified zeolite is observed, indicating the fully zeolitic connectivity present in the fully crystalline mesostructured zeolites.

The connectivity of the mesostructured zeolites was studied by infrared spectroscopy (FTIR) (See FIGS. 4-5). FIG. 4 depicts FTIR characterization peaks for the fully crystalline mesostructured zeolite H-Y[MCM-41], labeled Meso-H-Y, and zeolite Y. Referring still to FIG. 4, the FTIR spectra of the fully crystalline mesostructured zeolite H-Y[MCM-41], labeled Meso-H-Y, is on the top and the FTIR spectra of the unmodified conventional fully crystalline zeolite H-Y is on the bottom. FIG. 5 depicts FTIR spectra of H-Y[MCM-41] (upper top), H-MOR[MCM-41] (upper middle), H-ZSM-5 [MCM-41] (upper bottom) and FTIR spectra of their fully crystalline zeolitic versions in conventional, unmodified form, H-Y (lower top), H-MOR (lower middle), H-ZSM-5 (lower bottom). The spectra of the fully crystalline mesostructured zeolite H-Y[MCM-41] is the upper top spectra and the spectra of the unmodified fully crystalline zeolite H-Y is the lower top spectra. The spectra of the fully crystalline mesostructured zeolite H-MOR[MCM-41] is the upper middle spectra and the spectra of the unmodified fully crystalline zeolite H-MOR is the lower middle spectra. The spectra of the fully crystalline mesostructured zeolite H-ZSM-5 [MCM-41] is the upper bottom spectra and the spectra of the unmodified fully crystalline zeolite H-ZSM-5 is the lower bottom spectra. In FIG. 5 a match between each fully crystalline mesostructured zeolite and its corresponding unmodified fully crystalline zeolite is observed, indicating the zeolitic connectivity is present in fully crystalline mesostructured zeolites. FIG. 5 shows a remarkable match between the IR spectra of the fully crystalline mesostructured zeolites H-Y[MCM-41], H-MOR[MCM-41], and H-ZSM-5 [MCM-41] and those of the their corresponding unmodified fully crystalline zeolitic versions, H-Y, H-MOR, H-ZSM-5, contrary to highly stable Al-MCM-41, which presents only one IR broad peak, due to imperfect zeolitic connectivity. Liu, Y., Pinnavaia, T. J., *J. Mater. Chem.*, 2002, 12, 3179-3190; Kloetstra, K. R., et al., *Chem. Commun*, 1997, 23, 2281-2282; Liu, Y. et al., *Angew. Chem. Int. Ed.*, 2001, 7, 1255-1258. The peak at 960 cm$^{-1}$ in the H-Y[MCM-41] mesostructured zeolite sample, characteristic of silanol groups on the wall surfaces, is an additional evidence of the mesoporous/zeolitic hybrid nature of mesostructured zeolites. Geidel, E., et al., *Microporous and Mesoporous Materials*, 2003, 65, 31-42.

Figure 6:
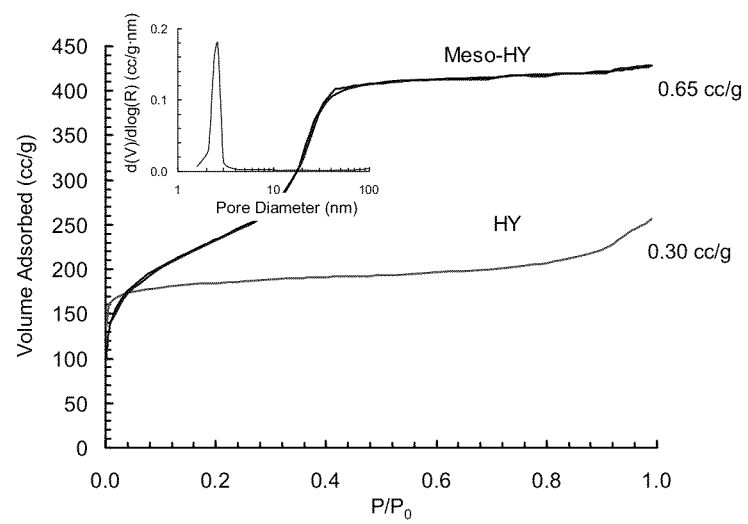
FIG. 6 depicts the physisorption isotherm of $N_2$ at 77 K of the fully crystalline mesostructured zeolite H-Y[MCM-41], labeled Meso-H-Y, and its unmodified zeolitic version, H-Y. The pore size distribution (BJH method) of the fully crystalline mesostructured zeolite is included in inset. The presence of well developed narrow pore size mesoporosity in the mesostructured sample is evident by the sharp uptake at $P/P_0 \sim 0.3$.
Figure 7:
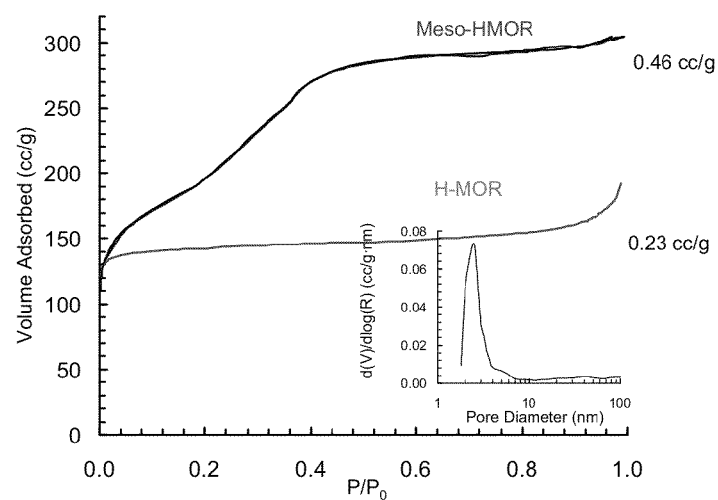
FIG. 7 depicts the physisorption isotherm of $N_2$ at 77 K of the fully crystalline mesostructured zeolite H-MOR[MCM-41], labeled Meso-H-MOR, and its unmodified zeolitic version, H-MOR. The pore size distribution (BJH method) of the fully crystalline mesostructured zeolite is included in inset. The presence of well developed narrow pore size mesoporosity in the mesostructured sample is evident by the sharp uptake at $P/P_0 \sim 0.3$.
Figure 8:
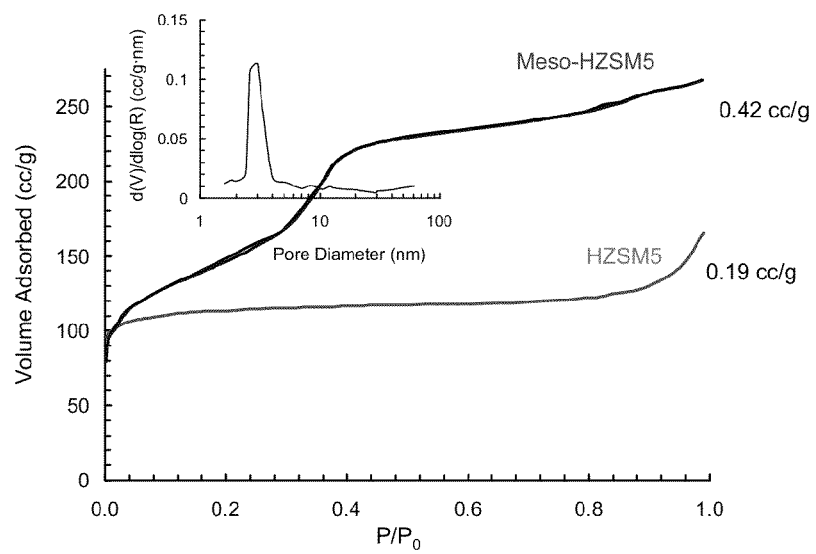
FIG. 8 depicts the physisorption isotherm of $N_2$ at 77 K of the fully crystalline mesostructured H-ZSM-5[MCM-41], labeled Meso-H-ZSM-5, and its unmodified zeolitic version, H-ZSM-5. The pore size distribution (BJH method) of the fully crystalline mesostructured zeolite is included in inset. The presence of well developed narrow pore size mesoporosity in the mesostructured sample is evident by the sharp uptake at $P/P_0 \sim 0.3$.

The presence of well-defined mesoporosity in mesostructured zeolites can be suitably studied by nitrogen physisorption at 77 K. Storck, S., et al., *Applied Catalysis A: General*, 1998, 17, 137-146. FIGS. 6-8 show the nitrogen isotherms at 77 K of the fully crystalline mesostructured zeolites, H-Y [MCM-41], H-MOR[MCM-41], and H-ZSM-5[MCM-41], respectively, and their unmodified zeolitic versions, H-Y, H-MOR, and H-ZSM-5. The presence of well developed narrow pore size diameter distribution mesoporosity is evident in each mesostructured sample. The pore size of the mesoporosity is controlled such that a diameter and or a cross sectional area of each of the mesopores in a specific fully crystalline mesostructured zeolite fall within a narrow pore size diameter distribution. In accordance with the fully crystalline mesostructured zeolites of the invention, in one embodiment, more than 95% of the mesopores has a pore size (e.g., a diameter and/or a cross sectional area) that falls within plus or minus 10% of the average pore size. In another embodiment, more than 95% of the mesopores has a pore size (e.g., a diameter and/or a cross sectional area) that falls within plus or minus 30% of the average pore size. In still another embodiment, more than 95% of the mesopores has a pore size (e.g., a diameter and/or a cross sectional area) that falls within plus or minus 75% of the average pore size. Each pore wall or mesopore surface that surrounds a diameter controlled mesopore is substantially similar in size. The fully crystalline mesostructured zeolites of the invention have controlled mesoporosity pore size cross sectional area. Where the mesopores are substantially cylindrical in shape in addition to having a pore size cross sectional area these pores have a pore size diameter. However, where the shape of the mesopores are not cylinder like and are, for example, slit shaped, worm-like, e.g., with a changing diameter throughout at least a portion of the depth of the mesopore surface that surrounds an exemplary mesopore, or non defined shapes then at least a portion of such a mesopore surface has a controlled mesopore cross sectional area. The size of the mesopores is controlled by, for example, the selected surfactant and/or quantity of surfactant used when making a fully crystalline mesostructured zeolite from a conventional unmodified fully crystalline zeolite. Prior attempts to incorporate mesostructures into zeolites have been unable to achieve such a controlled mesoporosity that result in substantially all mesopores in a zeolite having a substantially similar size (e.g., diameter and/or cross sectional area) and a controlled pore arrangement (e.g., [MCM-41] having a hexagonal pore arrangement). Rather, prior attempts to form mesostructures in zeolites result in any or a combination of a broader pore size distribution ranging from small, medium, to large size pores, different shaped pores, and uncontrolled arrangements.

Figure 9:
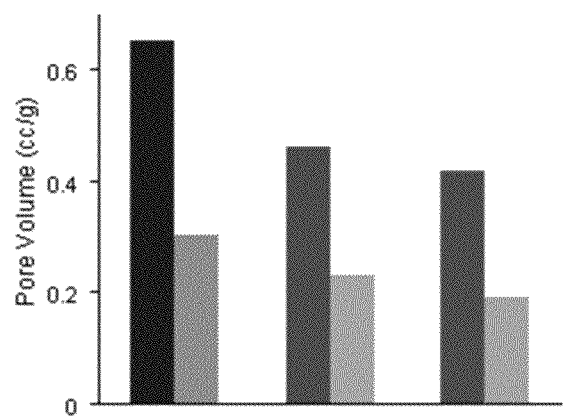
FIG. 9 depicts pore volumes (darker columns) of fully crystalline mesostructured zeolites H-Y[MCM-41] (left), H-MOR[MCM-41] (center), and H-ZSM-5[MCM-41] (right) and their unmodified zeolitic versions (lighter columns) of H-Y (left), H-MOR (center), and H-ZSM-5 (right).

A significant volume of mesoporosity can be introduced into the sample. For example, referring to FIG. 6, the mesopore volume roughly doubles when the zeolite is mesostructured. In accordance with principles of the invention, in this example, the unmodified zeolite H-Y had a mesopore volume of 30 cc/g whereas the fully crystalline mesostructured zeolite labeled Meso-HY, which is HY[MCM-41], has a mesopore volume of 0.65 cc/g. Conventional zeolites adsorb nitrogen only at low pressures, producing type I isotherms that are characteristic of microporous materials. Storck, S., et al., *Applied Catalysis A: General*, 1998, 17, 137-146. However, the fully crystalline mesostructured zeolites of the invention show sharp nitrogen uptakes at higher partial pressures ($P/P_0$~0.3), which is a characteristic feature of mesostructured materials with narrow pore-size distribution (pore diameter~2.5 nm). Storck, S., et al., Applied Catalysis A: General, 1998, 17, 137-146. FIGS. 6-8 show similar results for fully crystalline mesostructured zeolites H-Y[MCM-41], H-MOR[MCM-41], and H-ZSM-5 [MCM-41] and their unmodified conventional zeolitic versions H-Y, H-MOR, and H-ZSM-5. FIG. 9 depicts mesostructured zeolite pore volumes (darker columns) of H-Y[MCM-41] (left), H-MOR [MCM-41] (center), and H-ZSM-5[MCM-41] (right) and their zeolitic versions (lighter columns) of H-Y (left), H-MOR (center), and H-ZSM-5 (right). Compared to conventional zeolites, the fully crystalline mesostructured zeolites of the invention have more than double the pore volume (see FIG. 9) due to the incorporation of a well-developed, narrow distribution of pore-size diameter mesoporosity. Referring still to FIG. 9, the volume of mesoporosity that is incorporated can be controlled. The fully crystalline mesostructured zeolite mesoporosity volume is controlled by, for example, the quantity of surfactant added as a percentage of the quantity of zeolite. Other factors that contribute to mesoporosity volume include the pH, time, and temperature conditions employed. In one embodiment, the volume of the controlled pH medium that is added is an amount suitable to achieve the desired surfactant concentration in view of the amount of zeolite. The pore volume is expressed in cc/g, the cubic centimeters of pores over the grams of the zeolite. The fully crystalline mesostructured zeolite pore volume may range from about 0.05 cc/g to about 2 cc/g, or from about 0.5 cc/g to about 1 cc/g. The mesopore size is controlled and the mesopore volume is controlled by the type and the quantity of surfactant used to create the zeolite mesostructure from the zeolite. The time and temperature conditions also contribute to the mesopore size and/or the mesopore volume.

The mesostructured zeolites have sharper uptake at low partial pressures, which indicates the presence of microporosity, and slightly higher pore size. As well known in surfactant-templated mesoporous solids synthesis, the size of the mesopore in mesostructured zeolites can be easily tuned or controlled by changing the length of the aliphatic chain of the surfactant. Corma, A., *Chem. Rev.* 1997, 97, 2373-2419; Linssen, T., Cassiers, K., Cool, P., Vansant, E. F., *Advances in Colloid and Interface Science,* 2003, 103, 121-147; Ying, J. Y., et al., *Angew. Chem. Int. Ed.,* 1999, 38, 56-77. Optionally, the mesopore pore size diameter can also be controlled by, for example, the choice of surfactant and/or the quantity of the surfactant.

Previous attempts by others to prepare zeolitic mesostructured materials led to phase separation into zeolite and amorphous mesoporous solids. Karlsson, A., et al., *Microporous and Mesoporous Materials,* 1999, 27, 181-192; Huang L., et al., *J. Phys. Chem. B.* 2000, 104, 2817-2823. Moreover, some authors pointed out the difficulty of making thin-walled mesoporous materials, such as MCM-41, with zeolitic walls, due to surface tension caused by the high curvature of the structure. Yang, P., et al., Nature, 1998, 396, 152-155.

In one aspect of the invention, a fully crystalline mesostructured zeolite is produced, as described above, by exposing a conventional zeolite to a suitable pH controlled solution containing a suitable concentration of a selected surfactant under time and temperature conditions desired to obtain the a desired mesopore size and mesopore volume. The fully crystalline mesostructured zeolite retains substantially the same exterior surface contour (e.g., has substantially the same external size and external shape) and covers substantially the same perimeter as the unmodified conventional fully crystalline zeolite used to make the fully crystalline mesostructured zeolite. Suitable unmodified conventional zeolites may range in size from about 400 nm to about 5 microns. The conditions employed to form the mesopores do not substantially change the external size, external shape or the perimeter of the unmodified zeolite. The density of the fully crystalline mesostructured zeolite is less than the density of the unmodified zeolite, however, the density difference is due to the zeolite removed when the mesopores were formed. In addition, where the fully crystalline mesostructured zeolite is produced from a fully crystalline conventional unmodified zeolite, the fully crystalline mesostructured zeolite maintains the full crystallinity of the unmodified conventional zeolite.

Where the unmodified conventional zeolite has a chemical composition in its framework, after mesopores are formed in the conventional zeolite, the chemical composition in the resulting fully crystalline mesostructured zeolite framework will remain substantially the same as the chemical composition in the unmodified conventional zeolite framework that was used as source material. The chemical composition of the unmodified conventional zeolite can vary from the external surface (e.g., about the zeolite perimeter) to the inner core. However, the chemical composition of unmodified conventional zeolite framework, whether consistent or variable from the perimeter to the inner core of the zeolite, is unchanged when the mesopores are formed in the zeolite. Thus, forming mesopores to create the fully crystalline mesostructured zeolite does not chemically alter the framework of the conventional zeolite. The zeolite stoichiometry is unchanged from the unmodified conventional fully crystalline zeolite to the fully crystalline mesostructured zeolite.

Previous attempts by others to form mesostructures in zeolites has resulted in a change in the chemical composition of the framework of the unmodified conventional zeolite. For example, in zeolites containing Si and Al, prior methods treat the zeolite with a base selected to remove more Al than Si from the zeolite. Where such dealumination methods are employed, at least a portion of the chemical composition in the framework of the zeolite changes, specifically, the tetra-coordinated alumina ratio changes. Where the methods of the invention are employed with a zeolite containing Si and Al, in a mesostructured zeolite of the invention the alumina within the mesostructured zeolite framework remains tetracoordinated.

Figure 10:
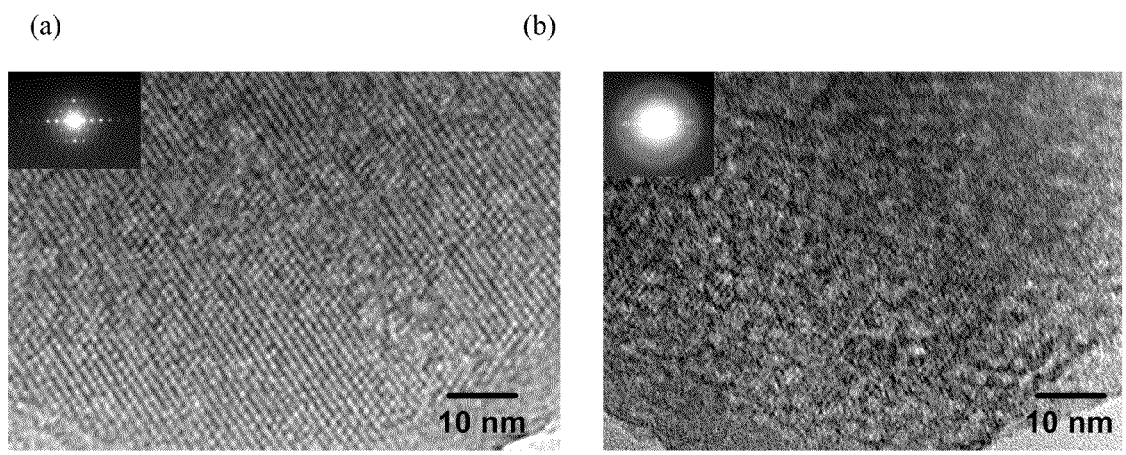
FIG. 10 depicts images obtained by transmission electron microscopy (TEM) of a) detail of a H-Y[MCM-41] fully crystalline mesostructured zeolite, and b) detail of a H-Y [MCM-41] fully crystalline mesostructured zeolite at different focus. The electron diffraction patterns are included as insets.
Figure 11:
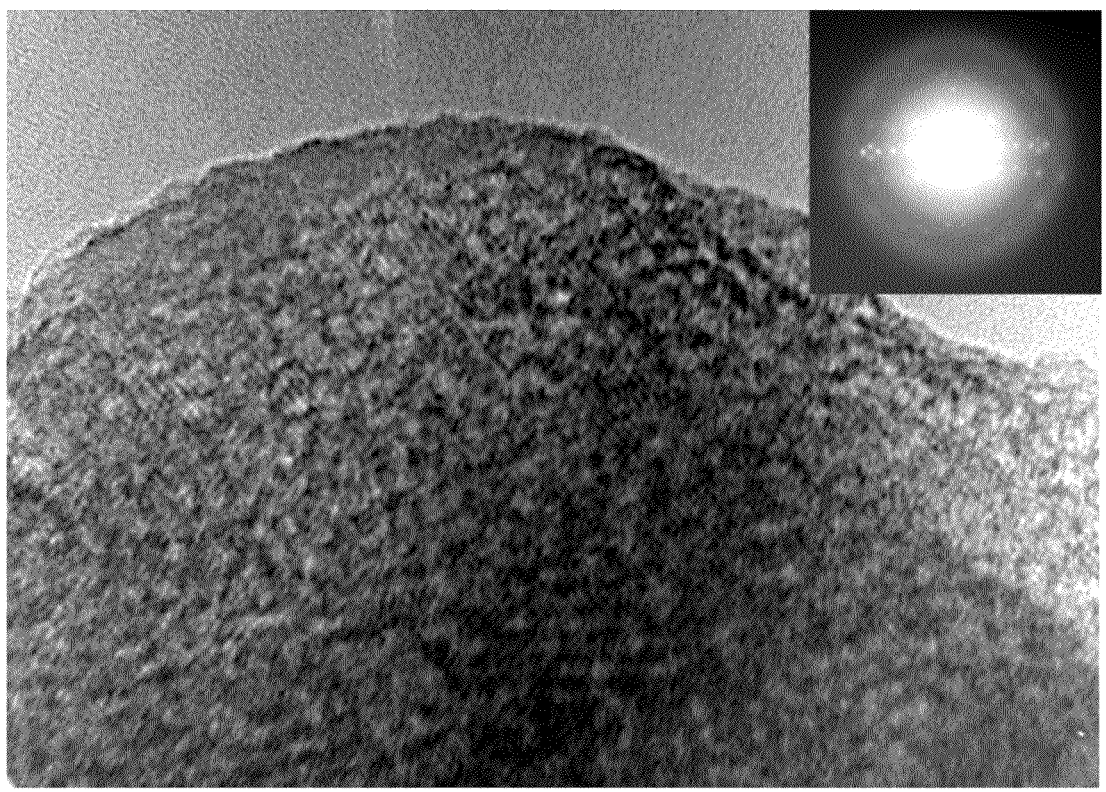
FIG. 11 depict a TEM image of a fully crystalline mesostructured zeolite of the present invention.
Figure 12:
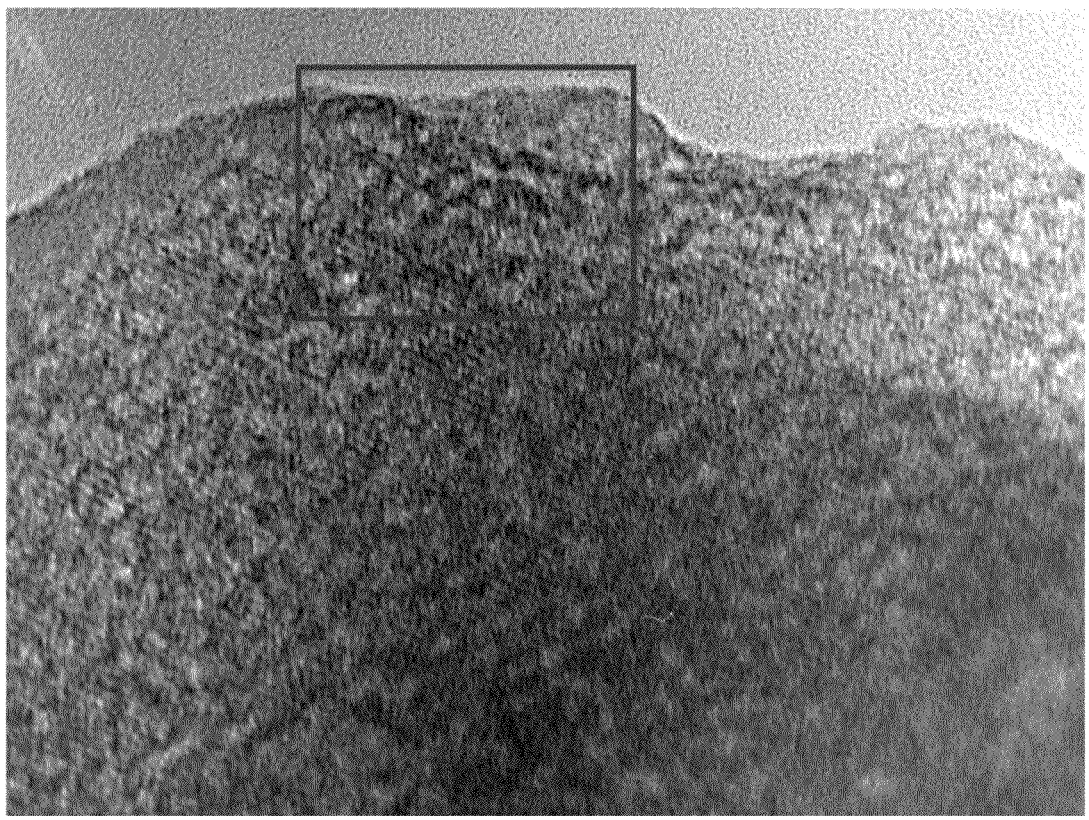
FIG. 12 depicts a TEM image of a fully crystalline mesostructured zeolite of the present invention.

Direct evidence for the hybrid single-phase nature of mesostructured zeolites was obtained via transmission electronic microscopy (TEM). FIGS. 10*a* and 10*b* show two details of the H-Y[MCM-41] mesostructured zeolite microstructure at different foci in which both the crystallinity and ordered mesoporosity can be observed in a single phase. Additional TEM images of mesostructured zeolites are depicted in FIGS. 11-12.

Additional evidence of the hybrid nature of mesostructured zeolites comes from catalysis. The presence of mesopores, high surface area, and the thickness of the pore wall or the interior wall between adjacent mesopores is (~2 nm). This must allow access to bulkier molecules and reduce intracrystalline diffusion resistance in the fully crystalline mesostructured zeolites of the invention as compared to conventional unmodified zeolites. So, enhanced catalytic activity for bulky molecules must be observed in mesostructured zeolites compared to zeolites.

For example, semicrystalline mesoporous materials, such as nanocrystalline aluminosilicates PNAs and Al-MSU-S$_{(MFI)}$, shows significantly lower activity for cumene cracking (which is usually correlated to strong Bronsted acidity) than conventional H-ZSM-5. Mesostructured zeolites, however, show even greater activity than zeolites, most likely due to their fully zeolitic structure and the presence of mesopores. For example, H-ZSM-5[MCM-41] converts 98% of cumene at 300° C. whereas commercial H-ZSM-5 converts 95% in similar conditions.

The anchoring of chemical species on mesostructured zeolites was confirmed by Infrared Spectroscopy (FTIR). The pure chemical species to be anchored, the mesostructured zeolites, and the species modified mesostructured zeolites prepared according the method described herein were all analyzed by FTIR. The species modified mesostructured zeolites exhibited the FTIR bands of the chemical species which did not disappear after washing the samples.

Some of the chemical species anchored on mesostructured zeolites were used as ligands for a homogeneous catalysts. This anchoring of a homogeneous catalyst was confirmed by Infrared Spectroscopy (FTIR), and by catalytic testing of both the homogeneous catalysts and the homogeneous catalysts anchored on the mesostructured zeolite. These experiments were repeated after washing the samples and no major changes were observed, indicating that this method is suitable for anchoring both chemical species and homogeneous catalysts.

Applications

The unique structure of mesostructured zeolites will be useful to a variety of fields, and should address certain limitations associated with conventional zeolites. As catalysis is the most important field of application for zeolites, special emphasis is placed on the catalytic applications of mesostructured zeolites. van Bekkum, H., Flanigen, E. M., Jacobs, P. A., Jansen, J. C. (editors). Introduction to Zeolite Science and Practice, 2nd edition. Studies in Surface Science and Catalysis, 2001, Vol. 137; Corma, A., *Chem. Rev.* 1997, 97, 2373-2419; Davis, M. E., *Nature* 2002, 417, 813-821.

The combination of a mesostructure, a high surface-area, and controlled pore or interior thickness (~2 nm) as measured between adjacent mesopores should provide for access to bulky molecules and reduce the intracrystalline diffusion barriers. Thus, enhanced catalytic activity for bulky molecules should be observed over mesostructured zeolites, as compared to conventional zeolites. See FIGS. 13-14. FIGS. 13-20 include reactions with 1,3,5-triisopropylbenzene being catalytically cracked to form 1,3-diisopropyl benzene. The 1,3,5-triisopropylbenzene is representative of molecules present in crude oil and 1,3-diisopropyl benzene is representative of a product within the gasoline range. These experiments are a surrogate for molecules present in crude oil that are cracked to form gasoline.

Figure 13:
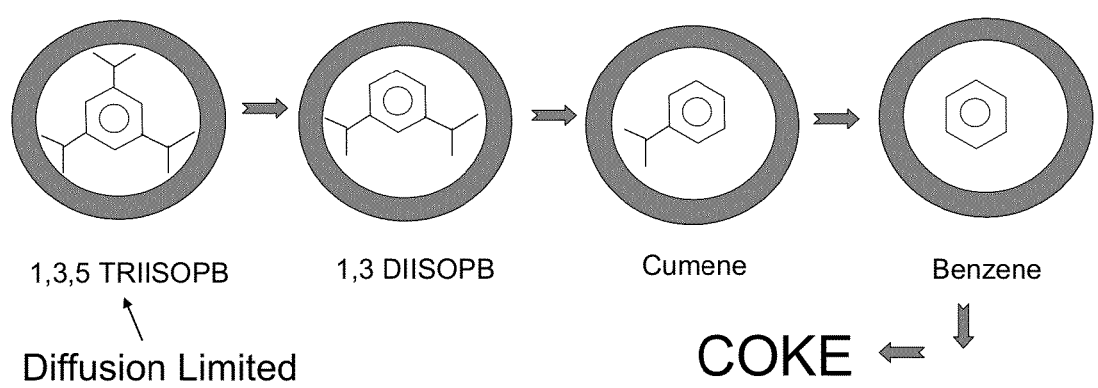
FIG. 13 depicts a schematic illustration of catalytic cracking of 1,3,5-triisopropyl benzene by the unmodified conventional zeolite H-Y.
Figure 14:
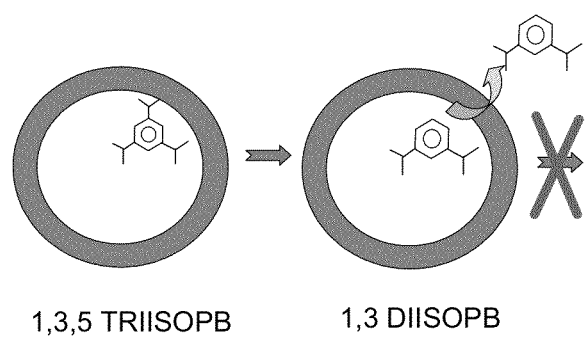
FIG. 14 depicts a schematic illustration of catalytic cracking of 1,3,5-triisopropyl benzene a fully crystalline mesostructured zeolite of the present invention.

FIG. 13 depicts the process of catalytic cracking of 1,3,5-triisopropyl benzene by zeolite H-Y. Catalytic cracking is selectivity and/or efficiency limited, because diffusion is limited by the small pore size of the zeolite H-Y. Because the conventional unconverted zeolite crystal has limited diffusion, it is difficult for the reaction product, e.g., 1,3-diisopropyl benzene, to exit the zeolite. As a result, over cracking occurs and light compounds are formed resulting in excess formation of undesirable products cumene, benzene, and coke. FIG. 14 depicts the process of catalytic cracking of 1,3,5-triisopropyl benzene by a mesostructured zeolite of the present invention. In contrast to catalytic cracking with the unmodified conventional zeolite H-Y, the larger pore size, the controlled mesopore volume, and the controlled interior or pore wall thickness present in the fully crystalline mesostructured zeolite, facilitates the exit of desired products, e.g., 1,3-diisopropyl benzene, from the mesostructure and over cracking that produces cumene, benzene and coke are avoided. As a result, there is a higher catalytic cracking conversion of the desired product, 1,3-diisopropyl benzene.

Figure 15:
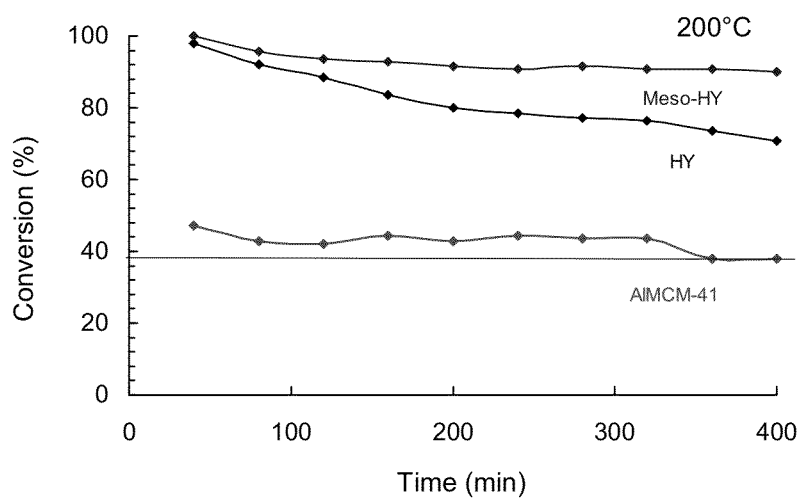
FIG. 15 depicts catalytic activity for 1,3,5-triisopropyl benzene cracking shown as conversion vs. time for the fully crystalline mesostructured zeolite H-Y[MCM-41], labeled Meso-HY, its unmodified zeolitic version H-Y, and a conventional Al-MCM-41. A 50 mL/min of He flow saturated with 1,3,5-triisopropylbenzene at 120° C. was flowed at 200° C. over 50 mg of catalyst.
Figure 17:
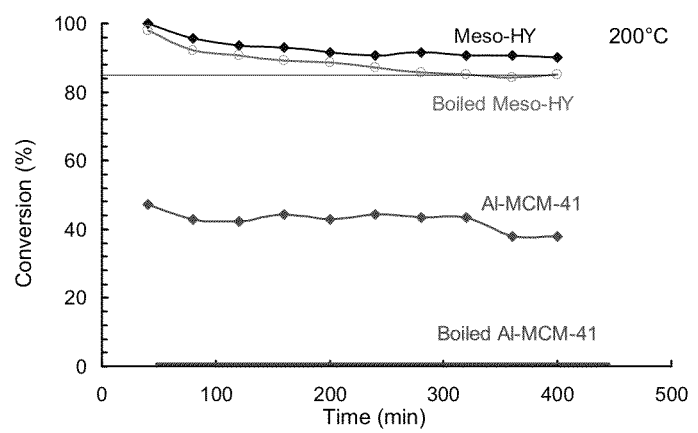
FIG. 17 depicts the hydrothermal stability of the fully crystalline mesostructured zeolite H-Y, H-Y[MCM-41], labeled Meso-H-Y, compared to the conventional non-mesolytic zeolite Al-MCM-41.

Acid catalysts with well-defined ultralarge pores are highly desirable for many applications, especially for catalytic cracking of the gas oil fraction of petroleum, whereby slight improvements in catalytic activity or selectivity would translate to significant economic benefits. Venuto, P. B., Habib, E. T., Jr. Fluid Catalytic Cracking with Zeolite Catalysts. Marcel Dekker, New York, 1979; Harding, R. H., et al., *Appl. Catal. A: Gen.*, 2001, 221, 389-396; Degnan, T. F., et al., *Microporous Mesoporous Mater.*, 2000, 35-36, 245-252. As a test reaction, we have examined the catalytic cracking of 1,3,5-triisopropylbenzene (critical dimension ~0.95 nm) to produce 1,3-diisopropyl benzene. FIG. 15 depicts catalytic activity for 1,3,5-triisopropyl benzene cracking shown as percent conversion to 1,3-diisopropyl benzene vs. time for the mesostructured zeolite H-Y[MCM-41], which is labelled Meso-H-Y, the zeolite H-Y, and a conventional Al-MCM-41. Catalytic cracking was performed when 50 mL/min of He saturated with 1,3,5-triisopropylbenzene at 120° C. was flowed at 200° C. over 50 mg of each catalyst. The H-Y [MCM-41] mesostructured zeolite demonstrated superior catalytic activity for this cracking reaction after 400 min at 200° C. (93% conversion) compared to the H-Y zeolite (71% conversion) and the mesoporous Al-MCM-41 (39% conversion) (see FIG. 15). This result was attributed to its combination of strong acidity and mesostructured nature. The mesopores and the mesostructure surrounding the mesopores greatly facilitated the hydrocarbon diffusion within the H-Y [MCM-41] catalyst thereby improving conversion. The H-Y [MCM-41] mesostructured zeolite is stable and maintains mesostructure integrity even under harsh conditions. FIG. 17 depicts the hydrothermal stability of H-Y[MCM-41], labelled Meso-H-Y compared to the non-mesolytic zeolite Al-MCM-41. For example, the boiled mesostructured zeolite H-Y[MCM-41], labelled Meso-H-Y, also maintained its physicochemical integrity even after being boiled for several days, exhibiting a high 1,3,5-triisopropylbenzene activity (87% conversion to 1,3-diisopropyl benzene after 400 min) even after such severe treatment. The term boiled is used for convenience, however, the specific treatment to the material includes suspending the solid in water and heating the water and solid material under reflux conditions. See FIG. 17. This outcome illustrated the superior hydrothermal stability of H-Y[MCM-41] over the amorphous Al-MCM-41 catalyst, which lost its activity and ordered mesostructure after exposure to similar conditions. These results show that hydrothermally stable H-Y[MCM-41] is a crystalline material and its crystallinity contrasts the amorphous Al-MCM-41 catalyst that structurally collapsed after boiling, rendering it unable to convert appreciable quantities via catalytic cracking.

Figure 19:
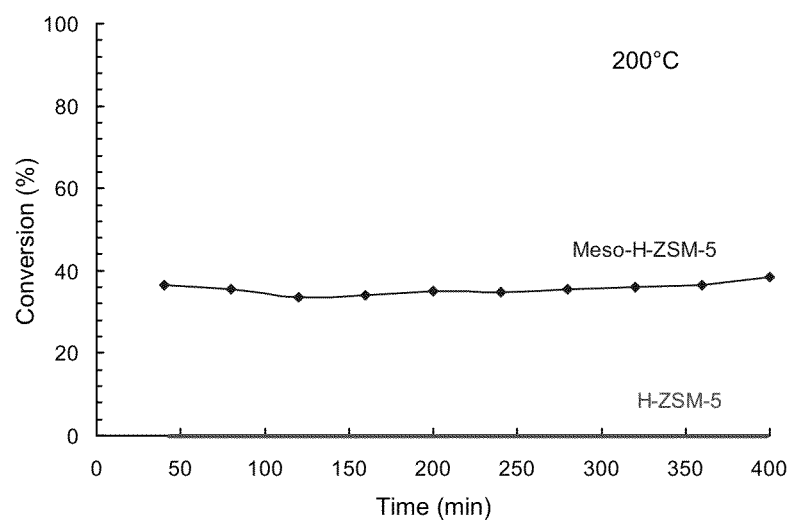
FIG. 19 depicts catalytic activity for 1,3,5-triisopropyl benzene cracking shown as conversion vs. time for the fully crystalline mesostructured zeolite H-ZSM-5[MCM-41], labeled Meso-H-ZSM-5, and its unmodified zeolitic version H-ZSM-5. A 50 mL/min of He flow saturated with 1,3,5-triisopropylbenzene at 120° C. was flowed at 200° C. over 50 mg of each catalyst, H-ZSM-5[MCM-41] and H-ZSM-5.

FIG. 19 depicts catalytic activity for 1,3,5-triisopropyl benzene cracking shown as percent conversion vs. time for H-ZSM-5[MCM-41], labeled Meso-H-ZSM-5, and its zeolitic version, H-ZSM-5. A 50 mL/min of He flow saturated with 1,3,5-triisopropylbenzene at 120° C. was flowed at 200° C. over 50 mg of each catalyst, H-ZSM-5[MCM-41] and H-ZSM-5. H-ZSM-5 is used as an important additive in cracking catalysts to increase propylene production and improve octane number in gasoline. Degnan, T. F., et al., *Microporous Mesoporous Mater.*, 2000, 35-36, 245-252. However, due to its small pores, H-ZSM-5 is inactive in 1,3,5-triisopropylbenzene cracking at 200° C. (<1% conversion to 1,3-diisopropyl benzene after 400 min). The incorporation of MCM-41 mesostructure in this zeolite (H-ZSM-5 [MCM-41]) successfully achieved substantial activity, with 40% conversion of 1,3,5-triisopropylbenzene to 1,3-diisopropyl benzene after 400 min (see FIG. 19). In this case, the activity was attributed to the mesopores and strong acidity of the mesostructured zeolite.

Figure 18:
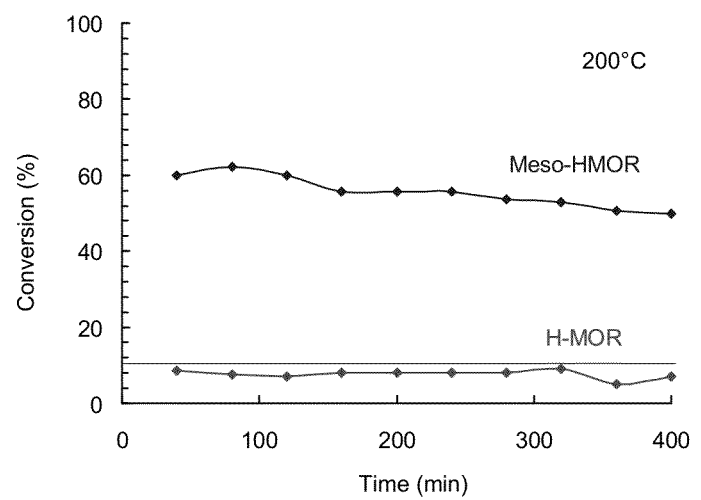
FIG. 18 depicts catalytic activity for 1,3,5-triisopropyl benzene cracking shown as conversion vs. time for the fully crystalline mesostructured zeolite H-MOR[MCM-48], labeled Meso-HMOR, and its unmodified zeolitic version H-MOR. A 50 mL/min of He flow saturated with 1,3,5-triisopropylbenzene at 120° C. was flowed at 200° C. over 50 mg of each catalyst, H-MOR[MCM-48] and H-MOR.

More than 135 different zeolitic structures have been reported to date, but only about a dozen of them have commercial applications, mostly the zeolites with 3-D pore structures. Corma, A., *Chem. Rev.*, 1997, 97, 2373-2419; Davis, M. E., *Nature*, 2002, 417, 813-821. The incorporation of 3-D mesopores would be especially beneficial for zeolites with 1-D and 2-D pore structures as it would greatly facilitate intracrystalline diffusion. Zeolites with 1-D and 2-D pore structures are not widely used, because the pore structure is less then optimal. To illustrate the potential of mesostructure processing of zeolites with low pore interconnectivity, H-MOR with 1-D pores were prepared with a MCM-48 mesostructure by exposing the H-MOR zeolite with 1-D pores to a pH controlled solution in the presence of a surfactant under suitable time and temperature conditions, described above. The resulting H-MOR[MCM-48] with 3-D mesostructured structures was examined for the catalytic cracking of 1,3,5-triisopropylbenzene at 200° C. FIG. 18 depicts catalytic activity for 1,3,5-triisopropyl benzene cracking shown as conversion to 1,3-diisopropyl benzene vs. time for H-MOR[MCM-48] labeled Meso-HMOR, and its zeolitic version, H-MOR. A 50 mL/min of He flow saturated with 1,3,5-triisopropylbenzene at 120° C. was flowed at 200° C. over 50 mg of each catalyst, H-MOR[MCM-48] and H-MOR. Catalytic cracking with H-MOR[MCM-48] exhibited 50% conversion after 400 min, which was significantly higher compared to the 7% conversion achieved by H-MOR (see FIG. 18). Zeolites with 1-D pore structures show a more dramatic improvement when exposed to the mesostructure process as compared to the zeolites with 2-D pore structures, but this is to be expected, because the 1-D pore structure zeolites begin with a more limited diffusion. When exposed to the mesostructure process, zeolites with 2-D pore structures result in 3-D mesostructures. Exposing 1-D and 2-D pore structure zeolites to the instant process for forming mesostructures in fully crystalline inorganic material, e.g., zeolites, may increase the usefulness of these otherwise underused zeolites.

Figure 16:
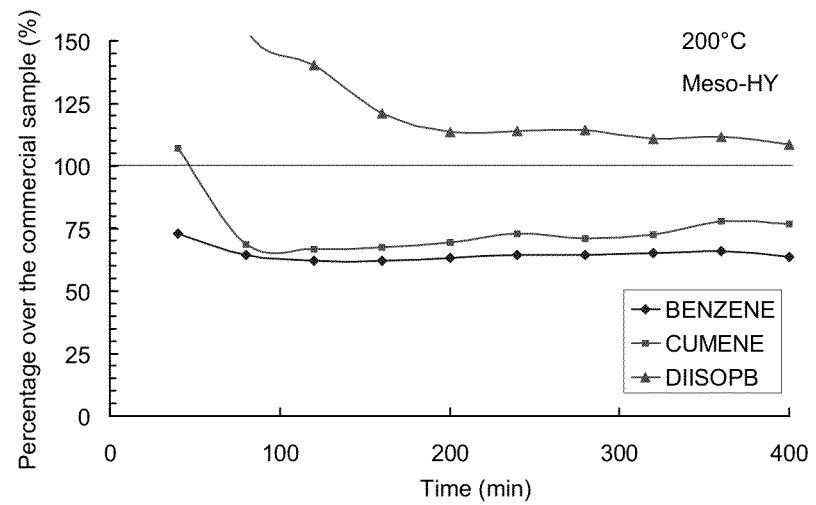
FIG. 16 depicts the catalytic cracking of 1,3,5-triisopropyl benzene with the fully crystalline mesostructured zeolite H-Y [MCM-41], labeled Meso-H-Y, to diisopropyl benzene and cumene. The H-Y[MCM-41] results are compared to the normalized results from a commercial sample of unmodified fully crystalline zeolite H-Y. Catalytic cracking with the fully crystalline mesostructured zeolite H-Y[MCM-41] results in higher selectivity and reduction in benzene production.

Mesostructured zeolites not only showed much higher catalytic activity, but also enhanced selectivity over zeolites. Referring now to FIG. 16, a commercially available zeolite H-Y was employed to catalytically crack 1,3,5-triisopropylbenzene. The resulting products were 1,3-diisopropyl benzene, benzene, and cumene and the fractional composition results were normalized to be 100%. The mesostructured zeolite labelled Meso-HY, which is H-Y[MCM-41], was employed to catalytically crack 1,3,5-triisopropylbenzene under identical conditions employed with H-Y. Increased production of 1,3-diisopropyl benzene (about 110% of the 1,3-diisopropyl benzene produced with the zeolite H-Y) and decreased production of benzene and cumene (about 75% of the benzene and cumene produced with the zeolite H-Y) was observed. In this example, H-Y[MCM-41] mesostructured zeolite produced only 75% of the benzene generated by the H-Y zeolite. See FIG. 16. Benzene is a toxic compound whose presence in gasoline is being increasingly restricted by legislation. Degnan, T. F., et al., *Microporous Mesoporous Mater.*, 2000, 35-36, 245-252. The benzene production was even lower in the case of H-MOR[MCM-48], and was minimal in the case of H-ZSM-5[MCM-41]. The decrease in benzene production has been observed in small zeolite crystals, and was related to the intrinsic ability of crystals with higher surface areas to limit successive cracking reactions. Al-Khattaf, S., et al., *Appl. Catal. A: Gen.* 2002, 226, 139-153. It also reduced the formation of coke, which was the undesired end-product of the cracking process that was responsible for catalyst deactivation. Thus, the mesostructured zeolites not only provided for higher catalytic activity and selectivity, but also longer catalyst life time.

Figure 20A:
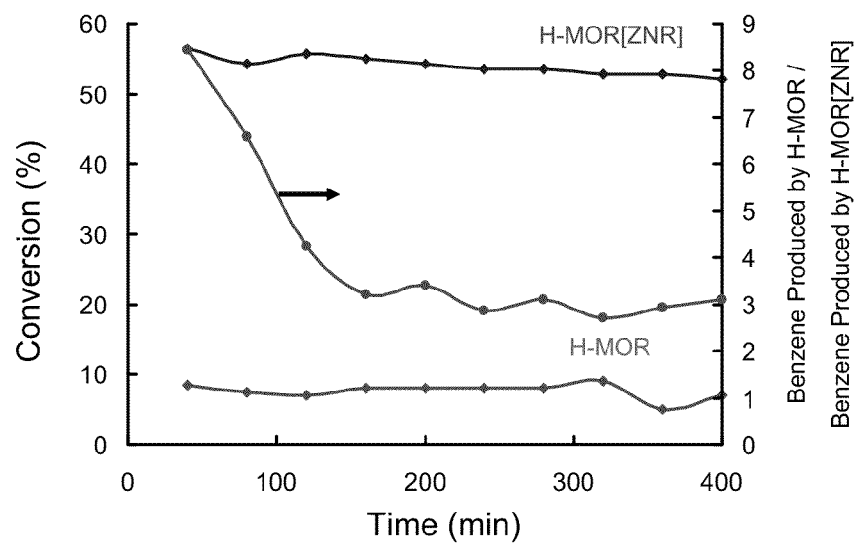
FIG. 20A depicts, on the left hand side Y axis, the conversion of 1,3,5-triisopropylbenzene versus time for the nanostructure H-MOR[ZNR] and the unmodified fully crystalline zeolite H-MOR. The ratio of benzene produced by H-MOR/ benzene produced by H-MOR[ZNR] as a function of time is also shown on the right hand side Y axis. A helium flow of 50 mL/min saturated with 1,3,5-triisopropylbenzene at 120° C. was introduced over 50 mg of each catalyst, H-MOR[ZNR] and H-MOR, at 200° C.

Zeolitic nanorods (ZNRs), another form of mesostructured zeolite, also enhance catalytic activity by increasing active-site accessibility. The rod-shape ZNRs are only nanometer-sized in diameter, so internal diffusional resistance is minimal. These new mesostructured zeolites (also referred to as nanostructures) were tested as cracking catalysts for the gas oil fraction of petroleum to assess their potential. FIG. 20A depicts, on the left hand side Y axis, the percent conversion of 1,3,5-triisopropylbenzene to 1,3-diisopropyl benzene versus time for H-MOR[ZNR] and H-MOR. The ratio of benzene produced by H-MOR/benzene produced by H-MOR[ZNR] as a function of time is also shown on the secondary Y axis located on the right hand side of FIG. 20A and an arrow is present on the line that connects this data. A helium flow of 50 mL/min saturated with 1,3,5-triisopropylbenzene at 120° C. was introduced over 50 mg of each catalyst, H-MOR[ZNR] and H-MOR, at 200° C.

In the cracking of 1,3,5-triisopropylbenzene, the conventional H-MOR zeolite showed a low activity (7% conversion to 1,3-diisopropyl benzene after 400 min) due to its medium-sized (0.65×0.70 nm), 1-D pores. In contrast, H-MOR[ZNR] achieved a much higher catalytic activity under similar conditions (~52% conversion to 1,3-diisopropyl benzene) (see FIG. 20A). This significant increase in catalytic activity was attributed to ZNRs' higher surface areas, readily accessible active sites, and improved intracrystalline diffusivity.

Besides increased activity, ZNRs also showed improved selectivity due to their nanostructured rod-shape morphology. For example, H-MOR[ZNR] produced 3 times less benzene per mole of 1,3,5-triisopropylbenzene converted as compared to the commercial zeolite H-MOR (see the secondary Y axis on the right hand side of FIG. 20A). Benzene may include, for example, benzene derivatives such as, for example, toluene, xylene, and other related derivative compounds. This significant increase in selectivity also helped to reduce coke formation, which has been a major problem with conventional cracking catalysts, especially those containing 1-D pores, such as mordenite.

The simple, inexpensive and generalized synthesis strategy described here allows for the preparation of ZNR, a crystalline material with walls that are only several nanometers thick (3-20 nm), in which nanorings and junctions are common. The novel synthesis strategy was based on the "programmed" zeolitic transformation of mesoporous materials, which avoided the typical drawbacks of nanoscaled zeolite synthesis (e.g., low yield, difficulty in separation, and high pressure drops), and did not require the use of a layered precursor. The unique crystalline structure of ZNRs provided for improved catalytic conversion of bulky molecules by increasing the accessibility to its microporosity, while reducing interparticle and intraparticle diffusion barriers.

Referring now to FIGS. 20B and 20C, mesostructured zeolites were tested for crude oil refining via Microactivity Test (ASTM D-3907). This is a well known and widely accepted technique to estimate the performance of FCC (Fluid Catalytic Cracking) catalysts. Vacuum gas-oil was used as feed in a fluid-bed stainless steel reactor. The experiments were conducted under identical conditions with mesostructured zeolites and their conventional zeolites counterparts.

FIG. 20B depicts microactivity test (MAT) results of a conventional fully crystalline zeolite H-Y (Si/Al=15) and its fully crystalline mesostructured version H-Y[MCM-41]. Microactivity test conditions included the reaction temperature of 500° C., the catalyst contact time was 60 seconds, the catalyst charge was 1 grams, the catalyst/vacuum gas oil ration was 2, the WHSV was 30 g/h/g. The conversion, specifically, how much of the vacuum gas oil feed was converted into product, with all yield normalized to 100% for comparison purposes, was for the unmodified fully crystalline zeolite H-Y: 61.22% and for the fully crystalline mesostructured zeolite H-Y[MCM-41]: 67.20%. Although not depicted in FIG. 20B, the results of this test provide an LPG fraction of H-Y of 17.45% and LPG fraction of H-Y[MCM-41] of 15.27%.

FIG. 20C depicts the composition of the LPG fraction obtained by Microactivity test (MAT) of a conventional fully crystalline zeolite H-Y (Si/Al=15) and its fully crystalline mesostructured version H-Y[MCM-41], described above in conjunction with FIG. 20B. The composition of the LPG fraction was analyzed to determine the components of the LPG fraction. Where the fully crystalline zeolite H-Y was used the LPG fraction was 17.45%. Where the fully crystalline mesostructured zeolite HY[MCM-41] was used the LPG fraction was 15.27%. In addition, the fully crystalline mesostructured zeolites produced more olefins, which are desired products. Referring now to the X-axis on FIG. 20C the label C3 indicates propane, the label C3=indicates propene, the label i-C4 indicates isobutane, the label n-C4 indicates normal butane, the label i-C4=indicates isobutene, and the label n-C4=indicates normal butene. Specifically, the fully crystalline mesostructured zeolite produced increased propene, isobutene, and normal butene in the LPG fraction then the unmodified fully crystalline zeolite. Further, the fully crystalline mesostructured zeolite produced a lesser fraction of LPG than with its counter part conventional unmodified fully crystalline zeolite. The internal wall thickness of the fully crystalline mesostructured zeolite is less than the internal wall thickness of the unmodified fully crystalline zeolite. Thus the thinner internal walls in the fully crystalline mesostructured zeolites reduced hydrogen transfer reactions, which are responsible for the undesired conversion of olefins to paraffins. Accordingly, an increased number of desired olefins are produced where fully crystalline mesostructured zeolites are used instead of conventional unmodified fully crystalline zeolites.

In the MET, generally, the samples were displayed in a fluidized-bed stainless steel reactor. Reaction temperature was 500° C., the amount of catalyst was 3.0 g, the catalyst/oil ratio was 2.0, the WHSV was 30 g/h/g, and the contact time was 60 seconds. These tests showed that using H-Y[MCM-41] in place of conventional H-Y resulted in a 43% increase in gasoline production, a 75% increase in propylene and a 110% increase in butenes. Additionally, there is a 32% decrease in coke formation, a 23% decrease in Total Dry Gas, and a 12% decrease in LPG (Liquified Petroleum Gases). The presence of mesopores in the H-Y[MCM-41], which has at least double the surface area of H-Y, favours the cracking of the larger molecules present in the crude oil, which cannot be transformed within the micropores of conventional zeolites. Typically, conventional zeolites have pores measuring about 0.7 nm, which are too small to efficiently process desirable products, for example, alkyl benzene, contained in heavy crude oil fractions. Larger pore sizes are required to facilitate improved surface area contact (including within the pore walls or mesopore surfaces) with the hydrocarbon materials. For comparison, the diameter of each of the mesopores, which are surrounded by the mesopore surfaces of the fully crystalline mesostructure of the invention, can measure, e.g., about 2 nm. The increased production of light olefins was related to the reduction of hydrogen transfer reaction due to the presence of favorable interior or pore wall thickness in the fully crystalline mesostructured zeolites (~2 nm) as opposed to the thick crystals of conventional zeolites (~1000 nm). This interior or pore wall thickness also results in reduction of overcracking, significantly reduces coke formation, and reduces production of Total Dry Gas and LPG.

Pyrolysis of plastics has gained renewed attention due to the possibility of converting these abundant waste products into valuable chemicals while also producing energy. Williams, P. T. Waste Treatment and Disposal; John Wiley and Sons, Chichester, UK, 1998. Acidic catalysts, such as zeolites, have been shown to be able to reduce significantly the decomposition temperature of plastics and to control the range of products generated. Williams, P. T. Waste Treatment and Disposal. John Wiley and Sons, Chichester, UK, 1998; Park, D. W., et al., *Polym. Degrad. Stability* 1999, 65, 193-198; Bagri, R., et al., *J. Anal. Pyrolysis*, 2002, 63, 29-41. However, the accessibility of the bulky molecules produced during plastic degradation has been severely limited by the micropores of zeolites.

Figure 21:
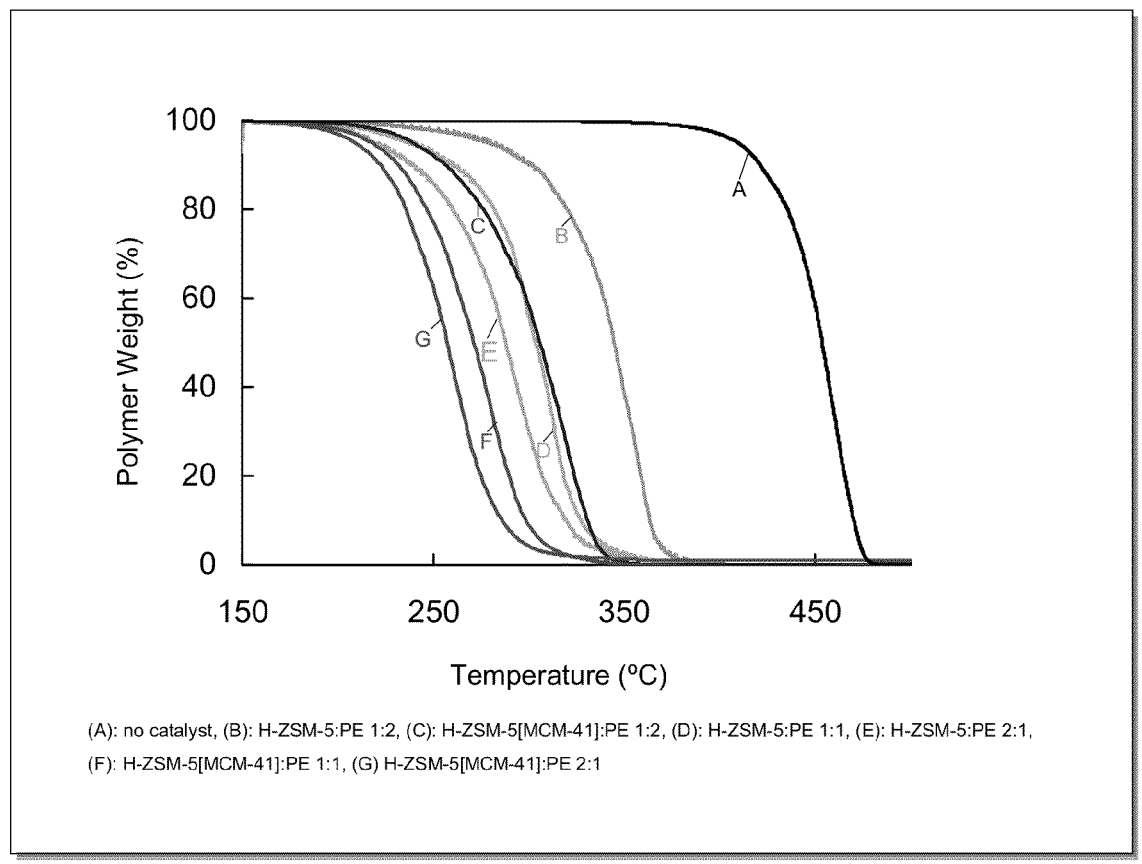
FIG. 21 depicts the percentage of polyethylene (PE) weight lost vs. temperature for the mixtures of catalysts in weight ratio to PE labelled: (A): no catalyst, (B): H-ZSM-5:PE 1:2, (C): H-ZSM-5[MCM-41]:PE 1:2, (D): H-ZSM-5:PE 1:1, (E) H-ZSM-5:PE 2:1, (F): H-ZSM-5[MCM-41]:PE 1:1, and (G) H-ZSM-5[MCM-41]:PE 2:1.

The catalytic degradation of polyethylene (PE) by commercially available zeolites and their corresponding mesostructured zeolites was studied by thermal gravimetric analysis (TGA). FIG. 21 depicts the percentage of polyethylene (PE) weight lost vs. temperature for the following mixtures of catalysts in weight ratio to PE. The curves labeled (A)-(G) depicts results of the following degradation curves: (A): no catalyst, (B): H-ZSM-5:PE 1:2, (C): H-ZSM-5[MCM-41]: PE 1:2, (D): H-ZSM-5:PE 1:1, (E) H-ZSM-5:PE 2:1, (F): H-ZSM-5[MCM-41]:PE 1:1, and (G) H-ZSM-5[MCM-41]: PE 2:1. In all cases, fully crystalline mesostructured zeolites allow for reduced decomposition temperatures compared to the unmodified commercial zeolites (by ~35° C. in the case of (C)H-ZSM-5[MCM-41] vs. (B) H-ZSM-5), even at high catalyst:PE ratios (see FIG. 21). In fact, referring to the curve labelled (F), with a H-ZSM-5[MCM-41]:PE weight ratio of 1:1, a lower decomposition temperature was achieved compared to that required by, referring to curve labeled (E), a ZSM-5:PE weight ratio of 2:1.

The large accessible surface area and ion-exchange properties of fully crystalline mesostructured zeolites will also facilitate the surface functionalization, the immobilization of homogeneous catalysts, and the deposition of metal clusters. Thus, fully crystalline mesostructured zeolites also serve as a very useful catalyst support for a variety of reactions.

With their improved accessibility and diffusivity compared to conventional zeolites, fully crystalline mesostructured zeolites may also be employed in place of unmodified conventional zeolites in other applications, such as gas and liquid-phase adsorption, separation, catalysis, catalytic cracking, catalytic hydrocracking, catalytic isomerization, catalytic hydrogenation, catalytic hydroformilation, catalytic alkylation, catalytic acylation, ion-exchange, water treatment, pollution remediation, etc. Many of these applications suffer currently from limitations associated with the small pores of zeolites, especially when bulky molecules are involved. van Bekkum, H., Flanigen, E. M., Jacobs, P. A., Jansen, J. C. (editors), Introduction to Zeolite Science and Practice, 2nd edition. Studies in Surface Science and Catalysis, Vol. 137, 2001; Corma, A., *Chem. Rev.*, 1997, 97, 2373-2419; Davis, M. E., *Nature*, 2002, 417, 813-821. Mesostructured zeolites present attractive benefits over zeolites in such applications.

Organic dye and pollutant removal from water is of major environmental importance, and represents the third major use of zeolites (accounting for 80 tons of zeolites per year). Galo, J. de A. A., et al., *Chem. Rev.* 2002, 102, 4093-4138. However, most of the organic dyes are bulky, which make their removal slow or incomplete, requiring a huge excess of zeolites in the process. Fully crystalline mesostructured zeolites offer significant advantage over unmodified conventional zeolites in organic dye and pollutant removal with their larger surface area and pore size.

Large Scale Material Production

Fully crystalline mesostructured zeolites can be prepared directly as part of the process for preparing conventional zeolites. Generally, conventional zeolites are prepared in large scale production in a reactor by exposing one or more inorganic compounds to a basic media under hydrothermal conditions. The time required to form the fully crystalline inorganic material ranges from about 4 hours to about 2 weeks. The hydrothermal temperature conditions range from about 100 to about 200° C. In conventional zeolite production, after the hydrothermal treatment step is conducted, a slurry or solution is obtained. The pH range of the slurry of the solution is from about 10 to about 14.

Fully crystalline mesostructured zeolites can be directly prepared from the slurry or solution. The pH is adjusted by, for example, a partial neutralization. A type and quantity of surfactant is added under time and temperature conditions to obtain a desired pore volume, pore size (cross sectional area and/or diameter). A subsequent hydrothermal treatment in the same reactor can produce the fully crystalline mesostructured zeolite simplifying its production and the equipment required. Typical times and temperatures are in the range of from about 4 hours to about 7 days and from about 100 to about 180° C. The final material can be filtered, dried and calcined to remove the surfactant.

Other synthesis parameters can be adjusted during the process, for example, when the pH is adjusted, the surfactant is added, and/or the temperature is adjusted. Other synthesis parameter include, adding mineralizing agents (e.g., fluoride, and hydroxide), adding co-surfactants (e.g., isopentanol, isopropanol, and alkyltrimethylammonium ions), adding swelling agents (e.g., xylene and mesitylene), adding metal oxides precursors (e.g., metal alkolxides, silicates, and aluminates), and adding silica or alumina solubilizing chemicals (e.g., tetraalkylammonium hydroxides, fluorides, and HF). Additional synthesis parameters can include adding other mesopore forming agents (e.g., polymer, nanoparticle, and/or biomolecule) in addition to, for example, the surfactant. The incorporation of the mesostructure in zeolites is facilitated when zeolites are, at least partially, in their acidic form (H-zeolite). In order to introduce acid sites on the zeolite before to the second treatment with surfactant, various methods can be tried such as, for example, ion exchange.

For example, in conventional zeolite production, after the hydrothermal treatment step a fully crystalline zeolite Y slurry is produced. The fully crystalline zeolite Y slurry is treated with HCl to reduce the pH from 14 to 10 while stirring for 2 hours at room temperature. Alternatively, the pH is adjusted to from about 2 to about 4 with HCl and then adjusted to from about 8 to about 12 with ammonia solution. Thereafter, a surfactant, for example, cetyltrimethylammonium bromide is added in the zeolite/surfactant ratio of 1 and stirred for 2 hours at 40° C. Finally, the mixture is hydrothermally treated at 120° C. for 24 hours.

Similarly, crystalline nanostructured zeolites can be prepared directly as part of the process for preparing conventional zeolites from the slurry or solution. The slurry or solution is exposed to a pH controlled medium to partially dissolve the crystalline zeolite producing an amorphous inorganic material. The pH of the amorphous inorganic material is adjusted and the amorphous inorganic material is exposed to a surfactant under controlled time and temperature conditions to form nanostructures.

Post-Synthesis Hydrothermal Treatment

The steps for making a fully crystalline mesostructured zeolite may be repeated or cycled to obtain a desired result. One or more of the hydrothermal treatment, surfactant type, surfactant quantity, and the pH may be altered in each successive cycle. A fully crystalline mesostructured zeolite still present in the synthesis solution may be hydrothermally treated one or more times. Specifically, after hydrothermal treatment in the pH controlled media in the presence of surfactant and prior to filtration, drying, and calcination, one or more of the hydrothermal treatment, surfactant type, surfactant quantity, and pH may be altered in one or more cycles. Cycles may be employed to further improve the amount, quality, and ordering of the mesoporosity introduced. Synthesis parameters such as, for example, pH, concentration of surfactant, water content, and mineralizating agents, can be adjusted prior to successive hydrothermal treatment. Various cycles of hydrothermal treatment and parameter synthesis can be used. A fully crystalline mesostructured zeolite can be formed in between about 1 and about 10 cycles, for example. In each cycle, the hydrothermal temperature can vary from about 100 to about 200° C. and from about 2 hours to about 2 weeks. The method of making the fully crystalline mesostructured zeolites can be cycled in the large scale process or from a fully crystalline zeolite. The method of making a crystalline nanostructured zeolite can similarly be cycled.

For example, a zeolite HY (Si/Al~15) was hydrothermally treated in a NaOH solution having a pH of 11 and containing the surfactant CTAB at a zeolite to CTAB ratio of 1 at 120° C. for a 12 hours. After this treatment 0.2 cc/g of mesoporosity was introduced in the original zeolite, as measured by nitrogen adsorption at 77K. Pore size distribution was fairly narrow and no mesopore ordering was observed under Transmission Electron Microscopy (TEM). In a second cycle, 1.0M HCl was added until the pH reached 9, an excess of 50% of CTAB surfactant was added to provide a zeolite to CTAB ratio of 1 to 1.5, and second hydrothermal treatment at 120° C. for a 12 hours produced a 0.3 cc/g mesopore volume, a narrower pore size distribution, and same local mesopore ordering, observed by TEM. The materials as modified by changing synthesis parameters and hydrothermal conditions were characterized by X-Ray Diffraction, gas adsorption, and electronic microscopy. These techniques confirmed that it is possible to control of the synthesis conditions even after some mesoporosity is introduced. In addition, the successive hydrothermal treatments enable controlled mesoporosity (i.e., controlled pore volume, controlled pore size, and/or controlled pore shape) in the fully crystalline mesostructured zeolites.

Generally, after a first hydrothermal treatment, fully crystalline mesostructured zeolite slurries having a pH in the range from about 8 to about 14 can be partially neutralized to a final pH of from about 8 to about 10 by employing acids, both mineral and organic, including, for example, HCl, $HNO_3$, $H_2SO_4$, HF, acetic acid, or any combination of such acids. The quantity of surfactant including, for example, quaternary ammonium, phosphonium based surfactacts, cationic, neutral or anionic surfactants can be increased from about 5 to about 500%. In a second cycle, the same surfactant from the first cycle may be employed. Alternatively, in a second cycle, a second different surfactant or any combination of surfactants may be employed.

Other synthesis parameters can also be added to increase the control of the properties of the final material. Such additional synthesis parameters can include adding: mineralizing agents, co-surfactants, swelling agents, metal oxide precursors, adding silica or alumina solubilizing chemicals, adding other mesopore forming agents, for example, polymers, nanoparticles, and/or biomolecules.

Modification of a Surface

A surface of the inorganic material can be modified according to one or more of the following methods and these methods can be used alone or in combination. For example, at least a portion of the exterior surface (e.g., the geometric surface of the inorganic material) and/or at least a portion of the mesopore surfaces of the fully crystalline mesostructured zeolite can be modified. Similarly, the surfaces of a crystalline nanostructure including the external surface of one or more nanostructure members, the surface of one or more pores defined within the members, and/or voids defined between adjacent members can be modified.

In particular, the full crystallinity of the mesostructured zeolite simplifies loading of functionalities onto the mesoporous surfaces and/or the exterior surface of the fully crystalline inorganic material. Specifically, the fully crystalline mesostructured zeolite can accommodate from small to medium to large bulky molecules on its surfaces (e.g., the mesoporous surfaces and/or the exterior surface). The ion exchange properties of the zeolites can be used to introduce chemical species. Much of the surface area that is available and accordingly modified is the surface area of the mesoporous surfaces. The available mesopore surface area in the fully crystalline mesostructured zeolite is controlled, at least in part, by the controlled pore volume. As such, the fully crystalline mesostructured zeolites can be functionalized with a wide variety of chemical groups by various techniques.

In one embodiment, various metal alkoxides containing various chemical functionalities are reacted and grafted to the surface of fully crystalline mesostructured zeolites by hydrolysis of the alkoxy groups. In one embodiment, metal trialkoxide ($R-M(OR')_3$) is grafted to the surface of the fully crystalline mesostructured zeolite. For example, trialkoxydes (R-M(OR')$_3$) where R is, for example, a amine, phosphine, carboxylic acid, alcohol, or thiol and where M is a Si, Al, Ti, Sn, or Zn and where R' is a methyl, ethyl, propyl, ethyl, or butyl are reacted by hydrolysis of the alkoxy group to the surface of the fully crystalline mesostructured zeolite.

Generally, the fully crystalline mesostructured zeolite, preferentially in its acidic form, is degasified under vacuum at a temperature from about 150 to about 550° C. for a time from about 2 to about 24 hours. Alternatively, the sample can be degasified in an inert atmosphere or it can be air dried at temperatures from about 150 to about 550° C. for a time from about 2 to about 24 hours.

The degasified fully crystalline mesostructured zeolite is suspended in a dispersing medium. Suitable dispersing mediums can include, organic solvents, for example, hexane, toluene, xylene, or benzene or any combination of these organic solvents. Suitable metal alkoxides include, for example, silicon, aluminum, gallium, germanium, zinc, iron, tin, or titanium alkoxides or any combination of these metal alkoxides. The metal alkoxides can include functional groups (R-M (OR')$_3$) such as, for example, amines, phosphines, carboxylic acids, hydroxides, or thiols any combination of these functional groups. A metal alkoxide and/or a functional group is dissolved in the dispersing medium prior to after the degasified fully crystalline mesostructured zeolite is suspended in the dispersing medium.

This sample is held at temperatures ranging from about room temperature to about 200° C. Refluxing conditions may be employed. The sample can be stirred and is held at the determined temperature for from about 1 hour to about 1 week. Thereafter, the sample is filtered, washed, for example, with the chemical used as a dispersing medium, and dried. The sample is dried at temperatures ranging from about 20 to about 120° C. and at atmospheric pressure, under inert gas, or under vacuum. The sample is dried for a time ranging from about 1 hour to about 1 week. This treatment can be repeated or cycled several times from, for example, 1 time to about 10 times. In accordance with this treatment, metal alkoxides containing various chemical functionalities are loaded onto the mesoporous surface and/or the exterior surface of the fully crystalline inorganic material.

For example, 1 gram of fully crystalline mesostructured zeolite H-Y[MCM-41] was degasified under vacuum at 250° C. and was suspended in 50 ml toluene solution containing 1.5 grams of 3-aminopropyl trimethoxysilane under an argon atmosphere. The suspension was stirred for 12 hours under reflux conditions. Thereafter, the solid was filtered, washed with toluene, and dried at room temperature for 12 hours. The alkylamine grafting was confirmed by infrared spectroscopy.

In another embodiment, charged chemical species were introduced to the fully crystalline mesostructured zeolites by simple ion exchange. Suitable chemical species that can be incorporated by ion exchange include, for example, metal cations, ammonium ions, phosphinium ions, quaternary amines, quaternary phosphines, choline derived compounds, aminoacids, or metal complexes, or any combination of these.

In general, a fully crystalline mesostructured zeolite is suspended in an aqueous solution of a salt of the cation this is to be exchanged by ion exchange. Suitable salts include, for example, sulfates, nitrates, chlorides, or any combination thereof. Suitable cations include, for example, metals, the cations of the elements, quaternary ammonium compounds, choline derived compounds, and quaternary phosphonium compounds.

The ion and fully crystalline mesostructured zeolite mixture is stirred for a time ranging from about 1 hour to about 1 week and for a temperature ranging from room temperature to 200° C. Refluxing conditions may be employed. The sample is then filtered, washed with water, and dried. The drying temperatures may range from about 20 to about 120° C. and at, for example, atmospheric pressure, under inert gas, or under vacuum. The drying time can range from about 1 hour to about 1 week. This treatment can be repeated or cycled several times from, for example, 1 time to about 10 times. In accordance with this treatment, suitably sized charged chemical species are loaded onto the mesoporous surface and/or the exterior surface of the fully crystalline inorganic material. Also in accordance with this treatment, smaller sized charged chemical species can be disposed in the microporous walls.

For example, 1 gram of a fully crystalline mesostructured zeolite NH$_4$-Y[MCM-41] was stirred in 100 ml of 0.01 M Pt(NH$_3$)$_4$(NO$_3$)$_2$ aqueous solution for 12 hours at 70° C. The solid was filtered, washied with deionized water, and dried at 40° C. for 12 hours. This process was repeated three times. Approximately, 1.5 wt % Pt(NH$_3$)$_4^2$ was added to the fully crystalline mesostructured zeolite by this ion exchange method.

In another embodiment, the fully crystalline mesostructured zeolites are neutralized. Specifically, the acidic properties of the fully crystalline mesostructured zeolites can be used to introduce various chemical species by reaction of the acid sites of the solids with bases containing chemical functionalities of interest. In accordance with this modification of an external surface of the fully crystalline mesostructured zeolite, the fully crystalline mesostructured zeolite is exposed to a base containing the desired chemical group and the neutralization is allowed to happen. These neutralization reactions can be done in a gas, liquid, or solid phase. Also, the external surface of zeolites can be neutralized by the reaction of the acid sites located on the external surface of the fully crystalline mesostructured zeolites by bulky bases, passivating agents, or poisons.

For example, in one exemplary neutralization reaction, 1 gram of a degasified H-Y[MCM-41] fully crystalline mesostructured zeolite was suspended in 20 ml of hexane containing 0.4 ml of triphenylphosphine and stirred for 4 hours in an argon atmosphere. The sample was filtered, washed with hexane, and dried at room temperature for about 12 hours.

Generally, a fully crystalline mesostructured zeolite is suspended in a dispersing medium in which a certain base is dissolved. Suitable bases include, for example, hydroxides, ammonia, amines, phosphine, or phosphine based bases, and their combinations. The mixture is stirred for times ranging from about 1 hour to about 1 week and is held at a temperatures ranging from room temperature to about 200° C. The sample is filtered, washed, and dried. The drying temperatures can range from about 20 to about 120° C. and at, for example, atmospheric pressure, under inert gas, or under vacuum. The drying time can range from about 1 hour to about 1 week. This treatment can be repeated or cycled several times from, for example, 1 time to about 10 times. In accordance with this treatment, various chemical species containing chemical functionalities of interest are loaded onto the mesoporous surfaces and/or the exterior surface of the fully crystalline inorganic material. Smaller sized chemical species can also be disposed in the microporous walls.

In another embodiment, various chemical species are incorporated into and/or with the fully crystalline mesostructured zeolite using the methods described before, for example, ion exchange and neutralization, and are thereafter reacted to produce a desired solid phase. For example, the fully crystalline mesostructured zeolite NH$_4$-Y[MCM-41] can be ion exchanged with a Pt(NH$_3$)$_4^2$ and then heat treated in air at a certain temperature and then in hydrogen at a lower temperature. Heat treatment includes, for example, calcination at temperatures from about 300 to about 600° C. for a time ranging from about 1 hour to about 1 day under dry air flow and then under hydrogen flow. The hydrogen concentration can range from 1% to 100% at a temperature from about 200 to about 400° C. for from about 1 hour to about 1 day. In accordance with this method when $Pt(NH_3)_4$-Y[MCM-41] was calcined $Pt(NH_3)_4^{2+}$ ions reduce to produce highly dispersed Pt nanoparticles on the surface of the fully crystalline mesostructured zeolite.

In another embodiment, the surface of a fully crystalline mesostructured zeolite is coated with various chemical compounds. For example, metal alkoxides $(M(OR')_4)$ can be reacted to the surface of the fully crystalline mesostructured zeolites allowing the hydrolysis and the formation of a metal oxide coating on the surface of the fully crystalline mesostructured zeolite. This method includes the passivation of the mesopore surfaces of zeolites. For example, this method enables the formation of a silica coating on the surface of the solid to block the active sites located on the mesopore surfaces of the fully crystalline mesostructured zeolite. In this way, the accessibility of the sites in the pore walls is increased thereby keeping the shape selectivity typical of conventional zeolites.

Generally, the fully crystalline mesostructured zeolite, preferentially in its acidic form, is degasified under vacuum at temperatures between about 150 and 550° C. for a time between about 2 hours to about 24 hours. Alternatively, the sample can be degasified under an inert atmosphere or air dried at temperatures from about 150 to about 550° C. for a time from about 2 hours to about 24 hours.

The degasified fully crystalline mesostructured zeolite is suspended in an appropriate dispersing medium such as, for example, organic solvents including hexane, toluene, xylene, or benzene, or any combination of these solvents. A metal alkoxide, for example, silicon, aluminum, tin and titanium alkolxides, is dissolved in the dispersing medium prior to or after the suspension of the degasified fully crystalline mesostructured zeolite. The mixture is stirred for times ranging from about 1 hour to about 1 week and the mixture is held at temperatures from room temperature to about 200° C. Refluxing conditions can be employed. The sample is then filtered, washed with, for example, the chemical used as a dispersing medium, and dried. The drying temperatures can range from about 20 to about 120° C. at, for example, atmospheric pressure, under inert gas, or under vacuum. The drying time can range from about 1 hour to about 1 week. This treatment can be repeated or cycled several times from, for example, 1 time to about 10 times.

For example, 1 gram of a degasified fully crystalline mesostructured zeolite H-Y[MCM-41] was suspended in 20 ml of hexane containing 0.4 ml of tetraethoxysilane and was stirred for 12 hours in argon atmosphere. The final material was then filtered, washed with hexane, and dried at room temperature for about 12 hours In another embodiment, various solid phases, for example, metals, sulfides, or oxides or combinations of these are loaded on the surface of the fully crystalline mesostructured zeolites. Various solid phases can be incorporated on the surface of fully crystalline mesostructured zeolites by, for example, impregnation and, if needed, further thermal or chemical treatment. For example, an aqueous nickel acetate solution is added to a fully crystalline mesostructured zeolite until incipient wetness of the solid. The drying of the solution is allowed to happen slowly and the resulting solid is thermally treated. This procedure yields nickel oxide nanoparticles on the surface of the fully crystalline mesostructured zeolite.

Other solid phases that can similarly be loaded by impregnation onto the fully crystalline mesostructured zeolites include sulfide nanoparticles, molybdenum oxide, sulfide, and any other suitable solids known in the art.

In general, the fully crystalline mesostructured zeolite is degasified in vacuum at temperatures from about 150 to about 550° C. for a time ranging from about 2 hours to about 24 hours. Alternatively, the sample can be degasified under inert atmosphere or dried air at temperatures from about 150 to about 550° C. for a time from about 2 hours to about 24 hours. An aqueous solution of the chemical that is to be loaded is added to the fully crystalline mesostructured zeolite. The contact between the solid and the solution is allowed for time between about 1 hour to about 1 week. The contact can be done under vacuum, in an inert atmosphere, or at any air pressure. The final material is filtered and dried. The drying temperatures can range from about 20 to about 120° C. and be at, for example, atmospheric pressure, under inert gas, or under vacuum. The drying time can range from about 1 hour to about 1 week. This treatment can be repeated or cycled several times, for example, from 1 time to about 10 times. In accordance with this treatment, various solid phases are loaded onto the mesoporous surfaces and/or the exterior surface of the fully crystalline inorganic material.

For example, 1 gram of a fully crystalline mesostructured zeolite H-Y[MCM-41] was impregnated (to incipient wetness) with 0.8 ml of a an aqueous solution (0.064 mol l$^{-1}$) of ammonium heptamolybdate. Finally, the solid was calcined at 500° C. under flowing air. Well dispersed molybdenum oxide nanoparticles were formed inside the micropores, on the surface of the mesopores, and on the exterior surface of the mesostructure.

In another embodiment, physicochemical properties of fully crystalline mesostructured zeolites are controlled by chemical vapor deposition (CVD) of various compounds including, for example, metal alkoxides on to a surface of a fully crystalline mesostructured zeolite. The fully crystalline mesostructured zeolite can degassed in vacuum at a temperature ranging from about 200 to about 400° C. It is then exposed to the chemical compound deposited by CVD. The chemical compound can be, for example, tetramethoxysilane, provided at a certain temperature. This technique can be also used to introduce nanoparticles, carbon, and metal oxide coatings on to the surface of a fully crystalline mesostructured zeolite.

In general, the fully crystalline mesostructured zeolite is degasified in vacuum at temperatures ranging from about 150 and about 550° C. for times ranging from about 2 hours to about 24 hours. Alternatively, the sample can be degasified under inert atmosphere or dried air at temperatures ranging from about 150 to about 550° C. for a time ranging from about 2 hours to about 24 hours. Then, the sample is exposed to the vapors of a chemical compound such as, for example, hydrocarbons, metal complexes, metals, or organometalic compounds or combinations thereof at a temperature and pressure selected to stabilize the vapor phase. This treatment is conducted for from about 1 hour to about 1 week and the time selected depends of the degree of deposition desired. The final material is washed and dried. The drying temperatures can range from about 20 to about 120° C. and be at, for example, atmospheric pressure, under inert gas, or under vacuum. The drying time can range from about 1 hour to about 1 week. This treatment can be repeated or cycled several times from, for example, 1 time to about 10 times. In accordance with this treatment, various chemical compounds are loaded onto the mesoporous surfaces and/or the exterior surface of the fully crystalline inorganic material. Certain small sized vapor molecules will also penetrate the micropores.

For example, 1 gram of fully crystalline mesostructured zeolite H-Y[MCM-41] was placed in a quartz reactor and heat treated in a nitrogen atmosphere at 450° C. After 4 hours, the temperature was increased to 700° C. and then a flow of 2.0% propylene in nitrogen was passed at 100 cc/g for 4 hours. This treatment produced a continuous coating of pyrolitic carbon onto the surface of the fully crystalline mesostructured zeolite.

In another embodiment, homogeneous catalysts are heterogenized. A variety of catalysts can be supported on the surface of fully crystalline mesostructured zeolites. Catalysts can be supported on, for example, the mesopore surfaces and/or on the exterior surface of the mesostructure. Suitable techniques that dispose the catalyst on the fully crystalline mesostructured zeolite include direct ion exchange and chemical species used as ligands to functionalize a surface of the fully crystalline mesostructured zeolite.

In another embodiment, cationic homogeneous catalysts are direct ion exchanged with fully crystalline mesostructured zeolites. Cationic homogeneous catalysts can be used to heterogenize bulky metal complexes to the surface of fully crystalline mesostructured zeolites. In accordance with this method, cationic species having properties including, for example, optical properties, magnetic properties, electronic properties, or bioactivity or combinations thereof can be heterogenized or immobilized on a surface of the fully crystalline inorganic material.

Chemical species that contain both a cationic end and a terminal end functional group can be ion exchange with fully crystalline mesostructured zeolites. These terminal groups can be used as ligands for heterogenization. Accordingly, the cationic end is direct ion exchanged with the fully crystalline mesostructured zeolite and the terminal end functional group modifies the chemistry of the surface of the fully crystalline mesostructured zeolite.

Generally, a fully crystalline mesostructured zeolite is suspended in an aqueous solution of a salt of the cation that will be ion exchanged. Salts include, for example, sulfates, nitrates, or chlorides, or any combinations thereof. Suitable cations include, for example, metals, the cations of the elements, quaternary ammonium compounds, choline derived compounds, and quaternary phosphonium compounds. Any other suitable salts and/or cations known to the skilled person may also be employed. The mixture is stirred for a time ranging from about 1 hour to about 1 week and is held at temperatures from room temperature to about 200° C. Refluxing conditions may also be employed. Thereafter, the sample is filtered, washed with water, and dried. The drying temperatures can range from about 20 to about 120° C. and be at, for example, atmospheric pressure, under inert gas, or under vacuum. The drying time can range from about 1 hour to about 1 week. This treatment can be repeated or cycled several times from, for example, 1 time to about 10 times. In accordance with this treatment, desirable properties and/or functional groups can be heterogenized to the mesopore surfaces and/or the exterior surface of the fully crystalline inorganic material.

For example, 1 gram of fully crystalline mesostructured zeolite $NH_4Y[MCM-41]$ was stirred in 50 ml of a 0.1 M 5,10,15,20-tetrakis(N-methyl-4-pirydyl) porphyrin pentachloride solution at room temperature for 12 hours. The solid was filtered and washed with deionized water. This process was repeated three times. Finally, the solid was dried under vacuum at 40° C. for 12 hours. As a result of this treatment method, tetrakis(N-methyl-4-pirydyl) porphyrin pentachloride is present on the surface of the fully crystalline mesostructured zeolite.

In another example, example, 1 gram of $NH_4Y[MCM-41]$ was stirred in 50 ml of a 0.1M choline p-toluenesulfonate salt solution at room temperature for 12 hours. The solid was filtered and washed with deionized water. This process was repeated three times. Finally, the solid was dried under vacuum at 40° C. for 12 hours. As a result of this treatment method, choline p-toluenesulfonate is present on the surface of the fully crystalline mesostructured zeolite.

In another embodiment, the surface of the fully crystalline mesostructured zeolite is first functionalized with a chemical species that acts as a ligand and is subsequently reacted with a metal complex containing ligands. Various chemical species that can act as ligands can be incorporated to the surface of fully crystalline mesostructured zeolites. Methods for incorporating suitable chemical species that act as ligands on the surface of the fully crystalline mesostructured zeolite include, for example, reaction of the fully crystalline mesostructured zeolite with metal alkoxides, ion exchange, neutralization, and other methods selected according to the specific heterogenation application (e.g., the desired chemical species to act as a ligand on the surface of the fully crystalline mesostructured zeolite).

In order to heterogenize homogeneous catalysts, chemical species with good properties are incorporated with ligands to form a metal complex. Suitable chemical species that may be employed as ligands in the metal complex include, for example, amines or phosphines or combinations thereof.

A metal complex containing ligands is exposed and allowed to bind to ligands incorporated on the surface of the fully crystalline mesostructured zeolite. Catalyst heterogenization occurs when at least one of the ligands in the metal complex is substituted by at least one ligand attached to the surface of the fully crystalline mesostructured zeolite. Alternatively, catalyst heterogenization occurs when at least one ligand attached to the surface of the fully crystalline mesostructured zeolite is substituted by at least one of the ligands in the metal complex.

Generally, a fully crystalline mesostructured zeolite containing a chemical group that can be used as ligand is degasified under vacuum at a temperature ranging from about 150 to about 550° C. Degasification takes place over a time ranging from about 2 to about 24 hours. Alternatively, the sample can be degasified under inert atmosphere or air dried at temperatures ranging from about 150 to about 550° C. and for a time ranging from about 2 to about 24 hours. The removal of the chemical group (i.e., the ligand) should be avoided, accordingly, the desgassification temperatures can range from about 60 to about 200° C.

The degasified fully crystalline mesostructured zeolite is suspended in an appropriate dispersing medium such as, for example, organic solvents including hexane, toluene, xylene, or benzene or any combination thereof. Homogeneous catalysts, for example, metal complexes, enzymes, supramolecular species, or organic compounds, or combinations thereof are dissolved in the dispersing medium prior to or after the suspending the degasified fully crystalline mesostructured zeolite. The mixture is stirred for a time ranging from about 1 hour to about 1 week at a temperature ranging from room temperature to about 200° C. Refluxing conditions may be employed. The sample is then filtered, washed with, for example, the chemical used as dispersing medium, and dried. The drying temperatures can range from about 20 to about 120° C. and be at, for example, atmospheric pressure, under inert gas, or under vacuum. The drying time can range from about 1 hour to about 1 week. This treatment can be repeated or cycled several times from, for example, 1 time to about 10 times. In accordance with this treatment, catalysts, for example, homogeneous catalysts can be attached to the fully crystalline mesostructure surface.

For example, 1 gram of 3-aminopropyl functionalized fully crystalline mesostructured zeolite H-Y[MCM-41] was reacted in 150 ml anhydrous ethanol containing 0.1 mol of a metal complex $Rh(CO)Cl(L)_2$ (where L is a phosphine based ligand) at room temperature for 24 hours under inert atmosphere. After this time, the solid was filtered, washed with anhydrous ethanol and dried at 40° C. under vacuum. The metal complex Rh(CO)Cl is on the surface of the fully crystalline mesostructured zeolite.

In another embodiment, the chemical composition framework of the fully crystalline mesostructure zeolite, i.e., the stoichiometry, is altered. Specifically, metals atoms within the fully crystalline mesostructured zeolite framework are removed and/or substituted with other elements. Various techniques can be used to substitute some of the metal atoms of the mesostructured zeolite framework by other elements. For example, $Al^{3+}$ can be replaced by $Si^{4+}$ by reaction with $SiCl_4$ in gas phase at high temperature. Other methods to dealuminate mesostructured zeolites are based on the chemical reaction with EDTA and $(NH_4)_2SiF_6$, typically under refluxing conditions, and at high steam temperatures.

Generally, the fully crystalline mesostructured zeolite is exposed to a medium (solid, liquid or gas) that partially dissolves the fully crystalline mesostructured zeolite. Suitable mediums includes, for example, steam, HF, HCl, NaOH, $HNO_3$, $F_2$, EDTA, citric acid, or oxalic acid at different concentrations or any combination thereof. The medium preferentially removes one or more of the components of the fully crystalline mesostructured zeolite, such as, for example, silica and/or alumina, thereby enriching the mesostructured zeolite framework in the component that was not removed. This treatment can result in a loss in crystallinity in the mesostructured zeolite.

For example, 1 gram of H-Y[MCM-41] (Si/Al~5) was stirred in 20 ml of a 0.25M oxalic acid solution at room temperature for 12 hours. The solid was filtered, washed with deionized water, and dried at 60° C. for 12 hours. This treatment produces dealuminization and crystallinity loss in the mesostructured zeolite.

Shaping

Suitable binders such as aluminum oxide, silicon oxide, amorphous aluminosilicates, clays, titania, zirconia, and others can blended to the fully crystalline mesostructured zeolite, molded, extruded, and heat treated to fabricate pellets, beads, powders (e.g., spray dried substances), layers, a monolith, or any other shapes for use in chemical processing. Binders can similarly be blended with crystalline nanostructures and processed to fabricate shapes for use in chemical processing.

Other phases may be also added for other purposes such as, increasing sulfur tolerance, increasing metal tolerance, increasing catalytic activity, increasing lifetime, increasing selectivity, increasing bottoms upgrading, or increasing hydrothermal stability, or any combination thereof. Types of materials employed as other phases include, for example, alumina, silica, calcium oxide, magnesium oxide, antimony passivators, nanosized zeolites, ZSM-5 zeolite. Suitable methods and techniques for adding phases to the fully crystalline mesostructured zeolites and to the crystalline nanostructured zeolites are described herein.

Generally, a fully crystalline mesostructured zeolite, a surface modified version of a fully crystalline mesostructured zeolite, a crystalline nanostructure zeolite, or a surface modified version of a crystalline nanostructure zeolite, is mixed with one or more binders (such as but not limited to clays, alumina, silica or cellulose). These zeolites are mixed with the binders in any ratio and with the appropriate amount of water to form a paste that can be mixed. The mixture is shaped by various methods such as, but not limited to, extruding, molding, spray drying, and pelletizing. Once the solid is shaped, it can be aged by, for example, being treated in air at a temperature ranging from, for example, about 20° C. to about 200° C. The solid is treated for a time ranging from about 1 hour to about 1 week. Optionally, in order to increase the solids mechanical properties, it is heat treated a second time at a higher temperature. The second temperature can vary from about 200 to about 800° C. and for from about 1 hour to about 1 week.

For example, 8 g of the fully crystalline mesostructured zeolite H-Y[MCM-41] was physically mixed with 1.5 g of bentonite, 0.3 g of kaolin, and 0.2 g of hydroxyethyl cellulose (dry mixing). Four grams of water was added to the mixture and then there was additional mixing. The paste was extruded, aged, dried, sieved and calcined at 450° C. for 12 hours.

Application in Petrochemical Processing

The fully crystalline mesostructured zeolitic materials have one or more of controlled pore volume, controlled pore size (e.g., cross sectional area and/or diameter), and a controlled pore shape. Hydrocarbon, including petrochemical processing, reactions are mass-transfer limited. Accordingly, a fully crystalline mesostructured catalyst with controlled pore volume, pore size, and/or pore shape can facilitate transport of the reactants to and within active catalyst sites within the fully crystalline mesostructured catalyst and transport the products of the reaction out of the catalyst.

Fully crystalline mesostructured inorganic materials, for example, zeolites, enable processing of very large or bulky molecules, with critical dimensions of, for example, from about 2 to about 60 nm, from about 5 to about 50 nm, and from about 30 to about 60 nm.

Hydrocarbon and/or petrochemical feed materials that can be processed with the fully crystalline mesostructured zeolitic materials and/or the crystalline nanostructure materials include, for example, a gas oil (e.g., light, medium, or heavy gas oil) with or without the addition of resids. The feed material can include thermal oils, residual oils, for example, Atmospheric Tower Bottoms (ATB), heavy gas oil (HGO), Vacuum Gas Oil (VGO), and Vacuum Tower Bottoms (VTB), cycle stocks, whole top crudes, tar sand oils, shale oils, synthetic fuels (for example products of Fischer-Tropsch Synthesis), heavy hydrocarbon fractions derived from the destructive hydrogenation of coal, tar, pitches, asphalts, heavy and/or sour and/or metal-laden crude oils, and waxy materials, including, but not limited to, waxes produced by Fischer-Tropsch Synthesis of hydrocarbons from synthesis gas. Hydrotreated feedstocks derived from any of the above described feed materials may also be processed by using the fully crystalline mesostructured zeolitic materials and/or the crystalline nanostructure materials.

Heavy hydrocarbon fractions from crude oil contain most of the sulfur in crude oils, mainly in the form of mercaptans, sulfides, disulfides, thiophenes, benzothiophenes, dibenzothiophenes, and benzonaphthothiophenes, many of which are large, bulky molecules. Similarly, heavy hydrocarbon fractions contain most of the nitrogen in crude oils, principally in the form of neutral N-compounds (indole, carbazole), basic N-compounds (pyridine, quinoline, acridine, phenenthridine), and weakly basic N-compounds (hydroxipyridine and hydroxiquinoline) and their substituted H-, alkyl-, phenyl- and naphthyl-substituted derivatives, many of which are large, bulky materials. Sulfur and nitrogen species are removed for production of clean fuels and resids or deeper cut gas oils with high metals content can also be processed using the fully crystalline mesostructured zeolitic materials and/or the crystalline nanostructure materials of the invention.

The fully crystalline mesostructured inorganic material and/or the crystalline nanostructured inorganic material can be employed in chemical processing operations including, for example, catalytic cracking, fluidized catalytic cracking, hydrogenation, hydrosulfurization, hydrocracking, hydrosisomerization, oligomerization, or alkylation or any of these in combination. Any of these chemical processing operations may be employed to produce, for example, a petrochemical product by reacting a petrochemical feed material with the fully crystalline mesostructured inorganic material and/or the crystalline nanostructured inorganic material.

The fully crystalline mesostructured inorganic material and the crystalline nanostructured inorganic material can be used as an additive to other catalysts and/or other separation materials including, for example, a membrane, an adsorbent, a filter, an ion exchange column, an ion exchange membrane, or an ion exchange filter.

In one embodiment, the fully crystalline mesostructured inorganic material and/or the crystalline nanostructured inorganic material are used alone or in combination as an additive to a catalyst. The fully crystalline mesostructured inorganic material and/or the crystalline nanostructured inorganic material can be added at from about 0.05 to about 100 weight percent to the catalyst. The additive may be employed in chemical processing operations including, for example, catalytic cracking, fluidized catalytic cracking, hydrogenation, hydrosulfurization, hydrocracking, hydrosisomerization, oligomerization, or alkylation or any of these in combination.

For example, the addition of small amounts of fully crystalline mesostructured zeolites and/or crystalline nanostructured zeolites to conventional commercially available Fluidized Catalytic Cracking (FCC) catalysts allows for a improvement in the catalytic performance. This blend can be employed to process the hydrocarbon and petrochemical feed materials described above. This improvement includes better gasoline yield via a more complete use of the heavier fractions of the crude.

Generally, FCC uses a FCC catalyst, which is typically a fine powder with a particle size of about 10 to 200 microns. The FCC catalyst is suspended in the feed and propelled upward into a reaction zone. A relatively heavy hydrocarbon or petrochemical feedstock, e.g., a gas oil, is mixed with the FCC catalyst to provide a fluidized suspension. The feed stock is cracked in an elongated reactor, or riser, at elevated temperatures to provide a mixture of petrochemical products that are lighter hydrocarbon products than were provided in the feed stock. Gaseous reaction products and spent catalyst are discharged from the riser into a separator where they can be regenerated. Typical FCC conversion conditions employing FCC catalysts include a riser top temperature of about 500 to about 595° C., a catalyst/oil weight ratio of about 3 to about 12, and a catalyst residence time of about 0.5 to about 15 seconds. The higher activity of the fully crystalline mesostructured zeolite catalysts and/or the crystalline nanostructure zeolite can enable less severe processing conditions, such as, for example, lower temperature, lower catalyst to oil ratios, and/or lower contact time.

A small amount of fully crystalline mesostructured zeolites and/or crystalline nanostructured zeolites blended with the conventional FCC catalysts enables pre-cracking of the bulkier molecules by the fully crystalline mesostructured zeolites and/or crystalline nanostructured zeolites contained in the blend. Conventional FCC catalysts have pore sizes too small to accommodate bulkier molecules. After the bulkier molecules are pre-cracked they are processed in the small pores of the conventional FCC catalyst.

Figure 23:
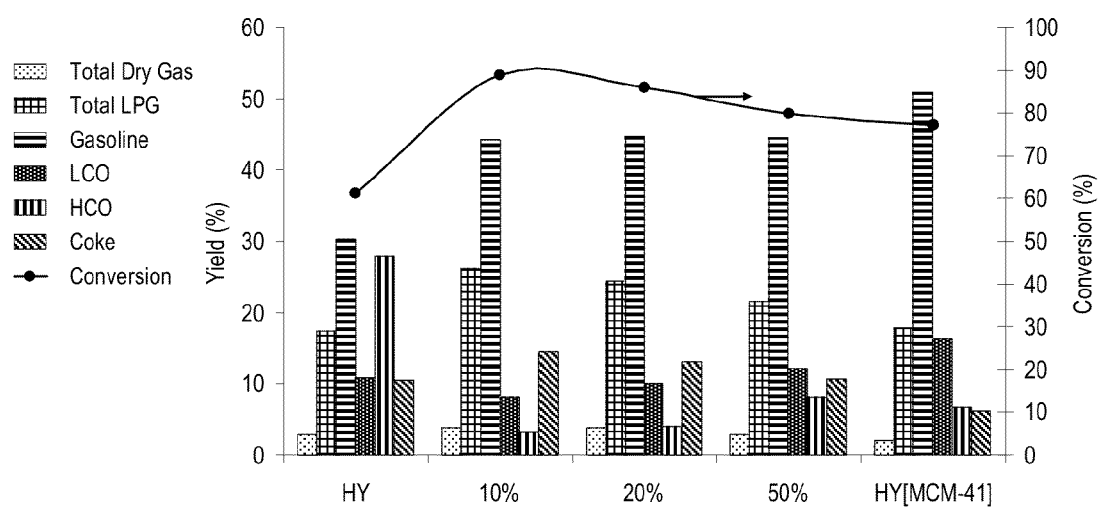
FIG. 23 depicts microactivity test (MAT) showing yield results where a fully crystalline mesostructured zeolite HY[MCM-41] is employed as an additive to a conventional unmodified zeolite H-Y for fluid catalytic cracking of a vacuum gas oil. The results from left to right on the x-axis show 100% H-Y with no additive, 10% H-Y[MCM-41] additive to the catalyst, 20% H-Y[MCM-41] additive to the catalyst, 50% H-Y[MCM-41] additive to the catalyst, and 100% H-Y[MCM-41].

FIG. 23 depicts microactivity test (MAT) showing yield results where a fully crystalline mesostructured zeolite H-Y [MCM-41] is employed as an additive to a conventional unmodified zeolite H-Y for fluid catalytic cracking of a vacuum gas oil. The results from left to right on the x-axis show 100% H-Y with no additive, 10% H-Y[MCM-41] additive to the catalyst, 20% H-Y[MCM-41] additive to the catalyst, 50% H-Y[MCM-41] additive to the catalyst, and 100% H-Y[MCM-41]. Microactivity test conditions include a reaction temperature of 500° C., catalyst contact time of 60 seconds, a catalyst charge of 1 gram, a catalyst to vacuum gas oil ratio of 2, and WHSV=30 g/h/g. In FIG. 23, the bar labeled LCO show the yield of light cycle oil and the bar labeled HCO shows the yield of fractions heavier than gasoline.

Referring still to FIG. 23, the addition of the fully crystalline mesostructured zeolite to the conventional FCC catalyst produces a significant impact over the yield structure that does not correspond to the linear combination of both materials. The data suggests the pre-cracking effect of a fully crystalline mesostructured zeolite additive to a catalyst. A significant conversion improvement in the heavier fractions (HCO) is obtained at 10% fully crystalline mesostructured zeolite. The incremental amounts of fully crystalline mesostructured zeolites, 20% and 50%, does not produce an increase in gasoline production or conversion, and does not decrease the HCO as compared to the 10% additive quantity. This data supports the pre-cracking effect of the fully crystalline mesostructured zeolite additive. The higher amount of total dry gas, LPG, and coke produced when fully crystalline mesostructured zeolites as used as FCC additives is likely due to the higher conversion obtained when the fully crystalline zeolite materials are employed. A similar pre-cracking effect can be expected where a crystalline nanostructure zeolite is employed as an additive.

Fully crystalline mesostructured zeolites and/or crystalline nanostructure zeolites can be blended with conventional catalysts. The additive fully crystalline mesostructured zeolites and/or crystalline nanostructure zeolites can be incorporated into the conventional catalysts pellet. Shaped, for example, pelletized fully crystalline mesostructured zeolites and/or crystalline nanostructure zeolites can be mixed with the catalyst pellet. Alternatively, the conventional catalyst and the fully crystalline mesostructured zeolites and/or crystalline nanostructure zeolites can be layered together. Any such mixture can be used a refining application, for example, in fluidized catalytic cracking directly as is done with other additives. The amount of mesostructured zeolite added and the manner by which it is blended can be used to tune the yield and/or the structure of the products.

In another embodiment, the addition of or incorporation of small amounts of fully crystalline mesostructured zeolites and/or crystalline nanostructured zeolites to conventional commercially available Thermofor Catalytic Cracking process (TCC) catalysts provides an improvement in the catalytic performance. The Thermofor Catalystic Cracking process (TCC) process is a moving bed process and uses pellet or bead shaped conventional catalysts having an average particle size of about one-sixty-fourth to one-fourth inch. Hot catalyst beads progress with a hydrocarbon or petrochemical feed stock downwardly through a cracking reaction zone. The hydrocarbon products are separated from the spent catalyst and recovered. The catalyst is recovered at the lower end of the zone and recycled (e.g., regenerated). Typically TCC conversion conditions include an average reactor temperature from about 45° C. to about 51° C. a catalyst/oil volume ratio of from about 2 to about 7, a reactor space velocity of from about 1 to about 2.5 vol./hr./vol.

Fully crystalline mesostructured zeolites and/or crystalline nanostructured zeolites can be substituted for TCC catalysts to improve the catalytic cracking of petrochemical or hydrocarbon feed stocks to petroleum product. Alternatively, the fully crystalline mesostructured zeolites and/or crystalline nanostructured zeolites can be blended with the TCC catalyst.

Fully crystalline mesostructured zeolites and/or crystalline nanostructure zeolites can be used as catalyst additives in any other catalytic application. For example, they may be used as additives in processes where bulky molecules must be processed. The fully crystalline mesostructured zeolites and/or crystalline nanostructure zeolites are able to effectively process bulky molecules.

In another embodiment, the fully crystalline mesostructured zeolites and/or crystalline nanostructure zeolites can be used in hydrogenation, Conventional zeolites are good hydrogenation supports, because they posses a level of acidity needed both for the hydrogenation of the aromatic compounds and for tolerance to poisons such as, for example, sulfur. However, the small pore size of conventional zeolites limit the size of the molecules that can be hydrogenated. Various metals, for example, Pt, Pd, Ni, Co, or Mo, or mixtures of such metals can be supported on fully crystalline mesostructured zeolites using surface modification methods, for example, ion exchange, described herein.

The hydrogenation catalytic activity of fully crystalline mesostructured zeolites modified to support various metals (e.g., doped with metals) shows a higher hydrogenation activity for bulky aromatic compounds as compared to other conventional materials, for example, metal supported on alumina, silica, metal oxides, MCM-41, and zeolites. The fully crystalline mesostructured zeolites modified to support various metals also shows, compared to conventional materials, a higher tolerance to sulfur, for example, sulfur added as thiophene and dibenzothiophene, which are common bulky components of crude oil that often end up in gas oil fractions.

In another embodiment, fully crystalline mesostructured zeolites and/or crystalline nanostructure zeolites can be used in hydrodesulfurization (HDS), including, for example, deep HDS, hydrodesulfurization of 4,6-dialkyldibenzothiophenes. Deep removal of sulfur species from gas oil has two main limitations: i) the very low reactivity of some sulfur species, for example, dimethyldibenzothiophenes and ii) the presence of inhibitors in the feed stocks such as, for example, $H_2S$. Deep HDS is currently done with active metal sulfides on alumina, silica/alumina, and alumina/zeolite.

Generally, during HDS the feed stock is reacted with hydrogen in the presence of an HDS catalyst. During HDS, oxygen and any sulfur and nitrogen present in the feed is reduced to low levels. Aromatics and olefins are also reduced. The HDS and reaction conditions are selected to minimize cracking reactions, which reduce the yield of the most desulfided fuel product. Hydrotreating conditions typically include a reaction temperature from about 400 F to about 900 F, a pressure between 500 to 5000 psig a feed rate (LHSV) of 0.5 $hr^{-1}$ to 20 $hr^{-1}$ (v/v); and overall hydrogen consumption 300 to 2000 scf per barrel of liquid hydrocarbon feed (53.4-356 $m^3$ $H_2/m^3$ feed).

Suitable active metal sulfides include, for example, Ni and Co/Mo sulfides. Zeolites provide strong acidity, which improves HDS of refractory sulfur species through methyl group migration. Zeolites also enhance the hydrogenation of neighboring aromatic rings. Zeolite acidity enhances the liberation of $H_{2S}$ from the metal sulfide increasing the tolerance of the catalyst to inhibitors.

Bulky methylated polyaromatic surfur species are not able to access the acidic sites of conventional zeolites. In contrast, the controlled mesoporosity and strong acidity of fully crystalline mesostructured zeolites provide both accessibility to the acidic sites and acidity that allows for the deeper HDS required for meeting future environmental restrictions.

In another embodiment, fully crystalline mesostructured zeolites and/or crystalline nanostructure zeolites can be used in hydrocracking Metals, including noble metals such as, for example, Ni, Co, W and Mo and metal compounds are commercially used in hydrocracking reactions. These metals can be supported on fully crystalline mesostructured zeolites by the previously described methods. The fully crystalline mesostructured zeolite including metals can be employed for hydrocracking of various feedstocks, for example, petrochemical and hydrocarbon feed materials.

Typically, hydrocracking involves passing a feed stock (i.e., a feed material), such as the heavy fraction, through one or more hydrocracking catalyst beds under conditions of elevated temperature and/or pressure. The plurality of catalyst beds may function to remove impurities such as any metals and other solids. The catalyst beads also crack or convert the longer chain molecules in the feedstock into smaller ones. Hydrocracking can be effected by contacting the particular fraction or combination of fractions with hydrogen in the presence of a suitable catalyst at conditions, including temperatures in the range of from about 600 to about 900 F. and at pressures from about 200 to about 4000 psia, using space velocities based on the hydrocarbon feedstock of about 0.1 to 10 $hr^{-1}$.

As compared with conventional unmodified catalyst supports such as, for example, alumina, silica, and zeolites, the fully crystalline mesostructured zeolites including metals allow for the hydrocracking of higher boiling point feed materials. The fully crystalline mesostructured zeolites including metals produce a low concentration of heteroatoms and a low concentration of aromatic compounds. The fully crystalline mesostructured zeolites including metals exhibit bifunctional activity. The metal, for example a noble metal catalyzes the dissociative adsorption of hydrogen and the fully crystalline mesostructured zeolite provides the acidity.

The controlled pore size and controlled mesopore surface in the fully crystalline mesostructured zeolites including noble metals make the bifunctional activity more efficiently present in the fully crystalline mesostructured catalysts as compared to a bifunctional conventional catalyst. In addition to the zeolitic acidity present in the fully crystalline mesostructured zeolites, the controlled pore size enables larger pores that allow for a high dispersion of the metal phase and the processing of large hydrocarbons.

In another embodiment, fully crystalline mesostructured zeolites and/or crystalline nanostructure zeolites can be used in hydroisomerization. Various metals and mixtures of metals, including, for example, noble metals such as nickel or molybdenum and combinations thereof in, for example, their acidic form can be supported on fully crystalline mesostructured zeolites. These metals can be supported on fully crystalline mesostructured zeolites by the previously described methods.

Typically, hydroisomerization is used to convert linear paraffins to branched paraffins in the presence of a conventional catalyst and in a hydrogen-rich atmosphere. Hydroisomerization catalysts useful for isomerization processes are generally bifunctional conventional catalysts that include a dehydrogenation/hydrogenation component, an acidic component.

Paraffins were exposed to the fully crystalline mesostructured zeolites including metals and were isomerized in a hydrogen flow a temperature ranging from about 150 to about 350° C. thereby producing branched hydrocarbons and high octane products. The fully crystalline mesostructured zeolites including metals permit hydroisomerization of bulkier molecules then is possible with a commercial conventional catalysts due, in part, to their controlled pore size and pore volume.

In another embodiment, fully crystalline mesostructured zeolites and/or crystalline nanostructure zeolites can be used in the oligomerization of olefins. The controlled pore shape, pore size, and pore volume improves the selectivity properties of the fully crystalline mesostructured zeolites and/or crystalline nanostructure zeolites. The selectivity properties, the increased surface area present in the mesopore surfaces, and the more open structure of the fully crystalline mesostructured zeolites and/or crystalline nanostructure zeolites can be used to control the contact time of the reactants, reactions, and products inside the fully crystalline mesostructured zeolites and/or crystalline nanostructure zeolites. The olefin can contact the fully crystalline mesostructured zeolites and/or crystalline nanostructure zeolites at relatively low temperatures to produce mainly middle-distillate products via olefin-oligomerization reactions. By increasing the reaction temperature, gasoline can be produced as the primary fraction.

Where the fully crystalline mesostructured zeolites and/or crystalline nanostructure zeolites are used in Fluidized Catalytic Cracking (FCC) the yield of olefins production is increased relative to FCC with conventional zeolites. The increased yield of olefins can be reacted by oligomerization in an olefin-to-gasoline- and/or -diesel process, such as, for example, MOGD (Mobile Olefins to Gas and Diesel, a process to convert olefins to gas and diesel). In addition, olefins of more complex structure can be oligomerized using the fully crystalline mesostructured zeolites and/or crystalline nanostructure zeolites.

The LPG (Liquified Petroleum Gas) fraction produced using fully crystalline mesostructured zeolites has a higher concentration of olefins compared to other catalysts, including, for example, various conventional FCC catalysts, zeolites, metals oxides, and clays under catalytic cracking conditions both in fixed bed and fluidized bed reactor conditions. The mesopore size (e.g., a diameter, from 1 to 50 nm) of the fully crystalline mesostructured zeolites readily allow the cracked products to exit the fully crystalline mesostructured zeolites. Accordingly, hydrogen transfer reactions are reduced and the undesired transformation of olefins to paraffins in the LPG fraction is reduced. In addition, over-cracking and coke formation are limited, which increases the average life time of the catalyst.

The controlled pore size, pore volume, and mesopore surfaces provide an open structure in the fully crystalline mesotructured zeolite. This open structure reduces the hydrogen transfer reactions in the gasoline fraction and limits the undesired transformation of olefins and naphthenes into paraffins and aromatics. As a result, the octane number (both RON and MON) of the gasoline produced by the fully crystalline mesostructured zeolites is increased.

The acidity and the controlled mesoporosity present in the fully crystalline mesostructured zeolite enables its use in alkylation reactions. Specifically, olefins and paraffins react in the presence of the fully crystalline mesostructured zeolite to produce highly branched octanes. The highly branched octane products readily exit the open structure of the fully crystalline mesostructured zeolite thereby minimizing unwanted olefin oligomerization.

In another embodiment, the fully crystalline mesostructured zeolites and/or crystalline nanostructure zeolites are used to process a petrochemical feed material to petrochemical product by employing any of a number of shape selective petrochemical and/or hydrocarbon conversion processes. In one embodiment, a petrochemical feed is contacted with the fully crystalline mesostructured zeolites and/or crystalline nanostructure zeolites under reactions conditions suitable for dehydrogenating hydrocarbon compounds. Generally, such reaction conditions include for example, a temperature of from about 300 to about 700° C., a pressure of from about 0.1 atm to about 10 atm, and WHSV of from about 0.1 $hr^{-1}$ to about 20 $hr^{-1}$.

In another embodiment, a petrochemical feed is contacted with the fully crystalline mesostructured zeolites and/or crystalline nanostructure zeolites under reactions conditions suitable for reforming, converting paraffins to aromatics. Generally, such reaction conditions include, for example, a temperature of from about 300 to about 700° C., a pressure of from about 0.1 atm to about 60 atm, a WHSV of from about 0.5 $hr^{-1}$ to about 400 $hr^{-1}$, and a $H_2$/HC mole ratio of from about 0 to about 20.

In another embodiment, a petrochemical feed is contacted with the fully crystalline mesostructured zeolites and/or crystalline nanostructure zeolites under reactions conditions suitable for converting olefins to aromatics. Generally, such reaction conditions include, for example, a temperature of from about 100 to about 700° C., a pressure of from about 0.1 atm to about 60 atm, a WHSV of from about 0.5 $hr^{-1}$ to about 400 $hr^{-1}$, and a $H_2$/HC mole ratio of from about 0 to about 20.

In another embodiment, a petrochemical feed is contacted with the fully crystalline mesostructured zeolites and/or crystalline nanostructure zeolites under reactions conditions suitable for isomerizing alkyl aromatic feedstock components. Generally, such reaction conditions include, for example, a temperature of from about 230 to about 510° C., a pressure of from about 3 atm to about 35 atm, a WHSV of from about 0.1 $hr^{-1}$ to about 200 $hr^{-1}$, and a $H_2$/HC mole ratio of from about 0 to about 100.

In another embodiment, a petrochemical feed is contacted with the fully crystalline mesostructured zeolites and/or crystalline nanostructure zeolites under reactions conditions suitable for disproportionating alkyl aromatic components. Generally, such reaction conditions include, for example, a temperature ranging from about 200 to about 760° C., a pressure ranging from about 1 atm to about 60 atm, and a WHSV of from about 0.08 $hr^{-1}$ to about 20 $hr^{-1}$.

In another embodiment, a petrochemical feed is contacted with the fully crystalline mesostructured zeolites and/or crystalline nanostructure zeolites under reactions conditions suitable for alkylating aromatic hydrocarbons, e.g., benzene and alkylbenzenes in the presence of an alkylating agent, e.g., olefins, formaldehyde, alkyl halides and alcohols. Generally, such reaction conditions include a temperature of from about 250 to about 500° C., a pressure of from about 1 atm to about 200 atm, a WHSV of from about 2 $hr^{-1}$ to about 2000 $hr^{-1}$, and an aromatic hydrocarbon/alkylating agent mole ratio of from about 1/1 to about 20/1.

In another embodiment, a petrochemical feed is contacted with the fully crystalline mesostructured zeolites and/or crystalline nanostructure zeolites under reactions conditions suitable for transalkylating aromatic hydrocarbons in the presence of polyalkylaromatic hydrocarbons. Generally, such reaction conditions include for example, a temperature of from about 340 to about 500° C., a pressure of from about 1 atm to about 200 atm, a WHSV of from about 10 hr$^{-1}$ to about 1000 hr$^{-1}$, and an aromatic hydrocarbon/polyalkylaromatic hydrocarbon mole ratio of from about 1/1 to about 16/1.

Generally, suitable conditions for a petrochemical or hydrocarbon feed to contact the fully crystalline mesostructured zeolites and/or crystalline nanostructure zeolites include temperatures ranging from about 100 to about 760° C., a pressure of from above 0 psig to about 3000 psig, a WHSV of from about 0.08 hr$^{-1}$ to about 2000 hr$^{-1}$ and a hydrocarbon compound mole ratio of from 0 to about 100.

Application in Compound Removal

The microporosity, mesoporosity, and ion exchange properties present in fully crystalline mesostructured zeolites and/or in crystalline nanostructured zeolites enables removal of inorganic and organic compounds from solutions. Suitable solutions can be aqueous and organic solutions. Accordingly, the fully crystalline mesostructured zeolites and/or in crystalline nanostructured zeolites can be employed in water treatment, water purification, pollutant removal, and solvent drying.

For example, 1 gram of Na$^+$ and a fully crystalline mesostructured zeolite is suspended in 1 Liter of a methylene blue aqueous solution, stirred for 12 hours, and filtered. The fully crystalline mesostructured zeolite removed the metheylene blue from the aqueous solution. Other configurations such as fixed bed, filters, and membranes can be also used in addition to the fully crystalline mesostructured zeolite and/or crystalline nanostructured zeolites. Optionally, the fully crystalline mesostructured zeolite and/or crystalline nanostructured zeolites can be employed as additives with conventional separation means, for example, fixed bed, filters, and membranes. The fully crystalline mesostructured zeolite and/or crystalline nanostructured zeolites can be substituted for other separation means in, for example, fixed bed, filters, and membranes. The fully crystalline mesostructured zeolites and/or crystalline nanostructured zeolites can be recycled by ion exchange, drying, calcinations or other conventional techniques and reused.

Application in Adsorption

The fully crystalline mesostructured zeolites and/or crystalline nanostructured zeolites can be used to adsorb gaseous compounds including, for example, volatile organic compounds (VOC's), which are too bulky to be adsorbed by conventional unconverted zeolites. Accordingly, pollutants that are too bulky to be removed by conventional unconverted zeolites can be removed from a gaseous phase by direct adsorption. The fully crystalline mesostructured zeolites and/or crystalline nanostructured zeolites can be employed for adsoroption in various adsorption configurations such as, for example, membranes, filters and fixed beds. Adsorbed organic compounds can be desorbed from the fully crystalline mesostructured zeolites and/or crystalline nanostructured zeolites by heat treatment. Thus, the fully crystalline mesostructured zeolites and/or crystalline nanostructured zeolites can be recycled and then reused.

Application in Gas Separation

Fully crystalline mesostructured zeolites and/or crystalline nanostructured zeolites can be grown on various supports by employed techniques such as, for example, seeding, hydrothermal treatment, dip coating, use of organic compounds. They can be physically mixed with conventional zeolites or metal oxides. Continuous layers of fully crystalline mesostructured zeolites and/or crystalline nanostructured zeolites can be used as membranes and/or catalytic membranes on, for example, porous supports.

Fully crystalline mesostructured zeolites and/or crystalline nanostructured zeolites are unique molecular sieves containing both microporosity and mesoporosity. They may be employed in various configurations including, for example, membranes for separation of gases based on physicochemical properties such as, for example, size, shape, chemical affinity, and physical properties.

Application in Fine Chemicals and Pharmaceuticals

A fully crystalline mesostructured zeolite has increased active site accessibility as compared to the same zeolite in conventional form. Similarly, crystalline nanostructure zeolites have increased active site accessibility compared to the same zeolite in conventional form. Accordingly, the activity of some important chemical reactions used in fine chemical and pharmaceutical production can be improved by substituting a conventional zeolite used in the process for a fully crystalline mesostructured zeolite and/or a crystalline nanostructure zeolites. In addition, a fully crystalline mesostructured zeolite and/or a crystalline nanostructure zeolites may be employed as an additive to a catalyst typically employed in such fine chemical and pharmaceutical production reactions. Suitable processes that can be improved by using a fully crystalline mesostructured zeolite and/or a crystalline nanostructure zeolite include, for example, isomerization of olefins, isomerization of functionalized saturated systems, ring enlargement reactions, Beckman rearrangements, isomerization of arenes, alkylation of aromatic compounds, acylation of arenes, ethers, and aromatics, nitration and halogenation of aromatics, hydroxyalylation of arenes, carbocyclic ring formation (including Diels-Alder cycloaditions), ring closure towards heterocyclic compounds, amination reactions (including amination of alcohols and olefins), nucleophilic addition to epoxides, addition to oxygen-compounds to olefins, estirification, acetalization, addition of heteroatom compounds to olefins, oxidation/reduction reactions such as but not limited to Meerwein-ponndorf-Verley reduction and Oppenauer oxidation, dehydration reactions, condensation reactions, C—C formation reactions, hydroformylation, acetilisation and amidation.

Application in Slow Release Systems

Chemicals and/or materials having useful properties such as, for example, drugs, pharmaceuticals, fine chemicals, optic, conducting, semiconducting magnetic materials, or nanoparticles or combinations thereof can be introduced to fully crystalline mesostructured zeolite and/or a crystalline nanostructure zeolites using one or more the modifying methods described herein. For example, chemicals and/or materials may be incorporated into the fully crystalline mesostructured zeolite by, for example, adsorbtion or ion exchange. In addition, such useful chemicals can be combined with the fully crystalline mesostructured zeolite and/or a crystalline nanostructure zeolites by creating a physical mixture, by a chemical reaction, by heat treatment, by irradiation, or by ultrasonication, or by any combination thereof.

The release of the chemicals and/or materials having useful properties can be controlled. Controlled release may take place in various systems, for example, chemical reactions, living organisms, blood, soil, water, and air. The controlled release can be accomplished by physical reactions or by chemical reactions. For example, controlled release can be accomplished by chemical reactions, pH variation, concentration gradients, osmosis, heat treatment, irradiation and magnetic fields.

Kits

This invention also provides kits for conveniently and effectively implementing the methods of this invention. Such kits comprise any of the zeolitic structures of the present invention or a combination thereof, and a means for facilitating their use consistent with methods of this invention. Such kits provide a convenient and effective means for assuring that the methods are practiced in an effective manner. The compliance means of such kits includes any means which facilitates practicing a method of this invention. Such compliance means include instructions, packaging, and dispensing means, and combinations thereof. Kit components may be packaged for either manual or partially or wholly automated practice of the foregoing methods. In other embodiments involving kits, this invention contemplates a kit including block copolymers of the present invention, and optionally instructions for their use.

EXEMPLIFICATION

The invention now being generally described, it will be more readily understood by reference to the following examples, which are included merely for purposes of illustration of certain aspects and embodiments of the present invention, and are not intended to limit the invention.

Example 1

Synthesis of H-Y[MCM-41]

0.79 g of zeolite H-Y (Zeolyst CBV-720 Si/Al=15) were stirred in 50 mL of a 0.37 M $NH_4OH$ solution containing 0.55 g of CTAB, for 20 minutes, after which time the synthesis mixture was hydrothermally treated at 150° C. for 10 hours. The solid was filtered, washed, and finally ramped in nitrogen at 5° C./min until 550° C., and then switched to air for 4 hours. Similar conditions were used to calcine all of the samples. Alternatively, 1 g of H-Y (Zeolyst CBV-720 Si/Al=15) was stirred for in 30 mL of a 0.09 M tetramethylammonium hydroxide (TMA-OH) solution. Then 0.5 g of cetyltrimethylammonium bromide (CTAB) was added. After 30 minutes of stirring the suspension was hydrothermally treated for 20 hours at 150° C. Structural parameters are presented in Table 1.

Example 2

Synthesis of H-MOR[MCM-41]

2.0 g of zeolite H-MOR (calcined Zeolyst CBV21A Si/Al=10) was stirred in 50 mL of 0.27 M TMA-OH solution. Afterwards, 1.0 g of CTAB was added. After other 30 minutes of stirring the synthesis solution was hydrothermally treated at 150° C. for 20 hours. Structural parameters are presented in Table 1.

Example 3

Synthesis of H-ZSM-5[MCM-41]

1.0 g of $NH_4$-ZSM-5 (Zeolyst CBV3024E Si/Al=15) was stirred in 50 mL of 0.8 M HF solution for 4 hours. This suspension was added to a solution containing 0.69 g of CTAB, and stirred for 30 minutes. The resulting synthesis mixture was basified by slowly adding 2.5 g of a 30% $NH_4OH$ solution. Finally, it was hydrothermally treated at 150° C. for 20 hours. Structural parameters are presented in Table 1. The wall thickness was determined by the standard method within the art by substracting the distance between two pore centers ($a_o$, obtained via X-ray diffraction) and the pore size (determined by $N_2$ adsorption).

TABLE 1

Structural parameters for the mesostructured zeolites.

| | $a_o$ (nm) | Pore diameter (nm) | Wall thickness (nm) |
|---|---|---|---|
| H-Y[MCM-41] | 4.2 | 2.6 | 1.6 |
| H-MOR[MCM-41] | 4.7 | 2.5 | 2.2 |
| H-ZSM-5[MCM-41] | 4.8 | 2.6 | 2.2 |

Example 4

Catalytic cracking of Cumene and 1,3,5-triisopropylbenzene

Catalytic tests were carried out in a lab-scale packed-bed catalytic reactor connected to a gas chromatograph (Hewlett Packard HP6890 Series) with a DB petrol (50 m×0.2 mm×0.5 microns) column. In all cases, 50 mL/min of He were flowed through 50 mg of catalyst. For cumene cracking the gas flow was saturated with cumene at room temperature and the reaction temperature was 300° C. For 1,3,5-triisopropylbenzene cracking the gas flow was saturated at 120° C. and the reaction temperatures were 300° C.

Example 5

Polyethylene (PE) Degradation

An initial mass of ~10 mg of catalyst:PE samples with ratios 1:2, 1:1, and 2:1 were ramped in a thermogravimetric analyzer (Perkin Elmer TGA7) at 10° C./min in a 250 mL/min flow of He until 600° C. Results are depicted in FIG. 21.

Example 6

Chemical Species and Homogeneous Anchoring on Mesostructured Zeolites

Figure 22:
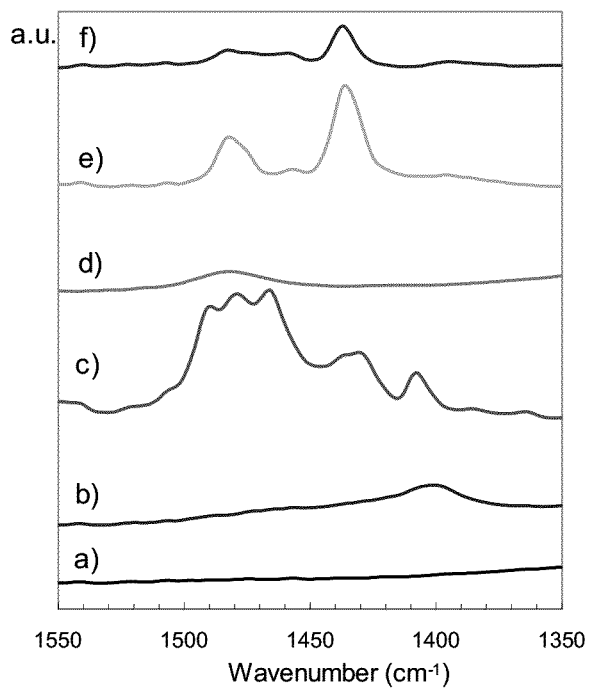
FIG. 22 depicts the FTIR spectra of a) H-Y[MCM-41], b) $NH_4$-Y[MCM-41], c) $NH_2(CH_2)_2NMe_3Cl$, d) $NH_2(CH_2)_2 NMe_3$-Y[MCM-41], d) $Rh(PPh_3)_3Cl$, and e) $Rh(PPh_3)_3NH_2 (CH_2)_2NMe_3$-Y[MCM-41].

The acid form of the fully crystalline mesostructured zeolite with faujasite structure and MCM-41 architecture, H-Y[MCM-41], (Si/Al-15), was ion exchanged in a 0.1 M $NH_4OH$ solution for 24 h in order to produce $NH_4$-Y[MCM-41]. The resulting material was ion-exchanged again in a 7.0 mM $NH_2(CH_2)_2NMe_3Cl$ solution for 24 h. After filtering and washing thoroughly, the sample was dried at 60° C. overnight. Finally, this amine functionalized mesostructured zeolite was added to a 2.0 mM $Rh(PPh_3)_3$ solution (Wilkinson catalyst) for 24 h. After filtering and washing thoroughly, the sample was dried at 60° C. overnight. All the products, as well as the quaternary amine and the Wilkinson catalyst, were analyzed by FTIR to confirm the presence of the different species on the mesostructured zeolite even after thorough washing (see FIG. 22). FIG. 22 depicts the FTIR spectra of a) H-Y[MCM-41], b) $NH_4$-Y[MCM-41], c) $NH_2(CH_2)_2NMe_3Cl$, d) $NH_2(CH_2)_2NMe_3$-Y[MCM-41], d) $Rh(PPh_3)_3Cl$, and e) $Rh(PPh_3)_3NH_2(CH_2)_2NMe_3$-Y[MCM-41].

Example 7

Synthesis of Zeolitic NanoRods (ZNRs)

In a synthesis of nanostructured zeolites, 0.36 g of NaOH are dissolved in 30 ml of water to produce a basic solution with a pH measuring 13.5. Thereafter 1 g of H-Y (Zeolyst CBV 720) with an original Si/Al ratio of ~15 is added to the basic solution. After a 12 hours of stirring at room temperature, the zeolite and base mixture had a pH measuring 11.5. Thereafter, 0.5 g of CTAB (cetyl-trimethyl ammonium bromide) was added to the zeolite and base mixture to produce a cloudy suspension. The cloudy suspension was transferred into teflon-lined stainless steel autoclaves and treated hydrothermally at 150° C. under autogeneous pressure. The samples were collected at different times, washed, dried and analyzed by X-ray Difraction, IR Spectroscopy, TEM, $N_2$ adsorption at 77K, TGA and Elemental Analysis. In a similar synthesis procedure H-ZSM-5[ZNR] was produced using H-Y (Zeolyst Si/Al~80).

INCORPORATION BY REFERENCE

All of the patents and publications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:
1. A composition comprising:
a biological catalyst selected from the group consisting of enzymes, biomolecules, proteins, supramolecular species, and combinations thereof; and
a crystalline inorganic mesostructured material selected from the group consisting of metal oxides, zeolites, zeotypes, aluminophosphates, gallophosphates, zincophosphates, titanophosphates, and combinations thereof, wherein the crystalline inorganic material comprises a crystalline mesostructure that defines a plurality of mesopores within the volume of the crystalline mesostructure, and wherein the crystalline inorganic material is present in the composition in an amount in the range of from about 0.05 to about 100 weight percent, based on the combined weight of the crystalline inorganic material and the biological catalyst.

2. The composition of claim 1, wherein the biological catalyst comprises an enzyme.

3. The composition of claim 1, wherein the crystalline inorganic material is present in the composition in an amount in the range of from about 1 to about 10 weight percent, based on the combined weight of the crystalline inorganic material and the biological catalyst.

4. The composition of claim 3, wherein the crystalline inorganic material is present in the composition in an amount in the range of from about 2 to about 3 weight percent, based on the combined weight of the crystalline inorganic material and the biological catalyst.

5. The composition of claim 1, wherein the plurality of mesopores have a hexagonal pore arrangement of MCM-41, a cubic pore arrangement of MCM-48, a lamellar pore arrangement of MCM-50, or a hexagonal pore arrangement of SBA-015.

6. The method of claim 1, wherein the plurality of mesopores are organized in a foam arrangement.

7. The composition of claim 1, wherein the pore volume of the crystalline mesostructure is in the range of from about 0.05 cc/g to about 2 cc/g.

8. The composition of claim 1, wherein the mean pore diameter within the crystalline mesostructure is in the range of from about 2 nm to about 5 nm.

9. The composition of claim 1, wherein the wall thickness of the crystalline mesostructure is in the range of from about 1 nm to about 5 nm.

* * * * *